US012661777B1

(12) United States Patent
Zhang et al.

(10) Patent No.: US 12,661,777 B1
(45) Date of Patent: Jun. 23, 2026

(54) MODULARIZED HOME ROBOT

(71) Applicant: Trifo, Inc., Santa Clara, CA (US)

(72) Inventors: Zhe Zhang, Sunnyvale, CA (US); Zhongwei Li, Beijing (CN)

(73) Assignee: Trifo, Inc., Santa Clara, CA (US)

( * ) Notice: Subject to any disclaimer, the term of this patent is extended or adjusted under 35 U.S.C. 154(b) by 530 days.

(21) Appl. No.: 16/840,175

(22) Filed: Apr. 3, 2020

Related U.S. Application Data

(60) Provisional application No. 62/830,293, filed on Apr. 5, 2019.

(51) Int. Cl.
| | |
|---|---|
| *B25J 9/00* | (2006.01) |
| *B25J 9/16* | (2006.01) |
| *B25J 11/00* | (2006.01) |
| *G06N 3/045* | (2023.01) |

(52) U.S. Cl.
CPC ............. *B25J 9/0003* (2013.01); *B25J 9/161* (2013.01); *B25J 9/163* (2013.01); *B25J 9/1666* (2013.01); *B25J 9/1697* (2013.01); *B25J 11/003* (2013.01); *B25J 11/009* (2013.01); *G06N 3/045* (2023.01)

(58) Field of Classification Search
CPC .......... G06N 3/0454; G06N 3/08; G06N 3/02; G06N 20/00; B25J 9/163; B25J 9/161; B25J 9/1697; B25J 9/1664; B25J 9/1602; B25J 9/1679; B25J 9/0003; B25J 9/1666; B25J 5/007; B25J 11/003; B25J 11/009; G05B 13/027; G05B 19/4183; G05B 2219/35001; G05D 1/0221; G05D 1/0088; G05D 1/0246; G06T 2207/20084; G06T 2207/20081
See application file for complete search history.

(56) References Cited

U.S. PATENT DOCUMENTS

| | | | | |
|---|---|---|---|---|
| 2013/0245937 A1* | 9/2013 | DiBernardo | ............ | G01S 17/48 701/514 |
| 2013/0338525 A1* | 12/2013 | Allen | ..................... | A61B 5/742 600/534 |
| 2015/0234398 A1* | 8/2015 | Harris | ........................ | B25J 5/00 700/250 |
| 2017/0196196 A1* | 7/2017 | Trottier | ................ | A01K 15/027 |
| 2017/0251633 A1* | 9/2017 | Womble | .................. | A01K 5/02 |

(Continued)

FOREIGN PATENT DOCUMENTS

WO      WO-2015063119 A1 *   5/2015   ......... G01N 33/0009

OTHER PUBLICATIONS

Zhang et al., ShuffleNet: An Extremely Efficient Convolutional Neural Network for Mobile Devices, dated Dec. 7, 2017, 9 pages.

(Continued)

*Primary Examiner* — Nhi Q Bui
(74) *Attorney, Agent, or Firm* — Haynes Beffel & Wolfeld LLP; Andrew L. Dunlap; Paul A. Durdik

(57) ABSTRACT

Implementations of a fully configurable, modularized home robot are described that implement trained neural network classifiers to solve problems of providing home health care and monitoring of the elderly and/or infirm, providing entertainment for the family, providing environmental and safety monitoring coupled with mechanisms to clean the air and remedy indoor climates such as humidity and temperature, and provide a mechanism for caring for pets left at home when the owner is away based upon sensory input.

20 Claims, 46 Drawing Sheets

(56) References Cited

U.S. PATENT DOCUMENTS

| | | | | |
|---|---|---|---|---|
| 2018/0012411 | A1* | 1/2018 | Richey | G06T 19/006 |
| 2018/0075403 | A1* | 3/2018 | Mascorro Medina | B25J 9/1697 |
| 2018/0289579 | A1* | 10/2018 | Agrawal | A61H 3/008 |
| 2018/0317725 | A1* | 11/2018 | Lee | B25J 11/0085 |
| 2019/0102667 | A1* | 4/2019 | Bashkirov | G06V 20/20 |
| 2019/0156944 | A1* | 5/2019 | Eriksson | G06F 18/2411 |
| 2019/0377349 | A1* | 12/2019 | van der Merwe | G05D 1/0257 |
| 2020/0156255 | A1* | 5/2020 | Soltani Bozchalooi | B25J 9/1697 |

OTHER PUBLICATIONS

Lin et. al., Network in Network, in Proc. of ICLR, 2014.

Sifre, Rigid-motion Scattering for Image Classification, Ph.D. thesis, 2014.

Sifre et. al., Rotation, Scaling and Deformation Invariant Scattering for Texture Discrimination, in Proc. of CVPR, 2013.

Chollet, Xception: Deep Learning with Depthwise Separable Convolutions, in Proc. of CVPR, 2017. 8 pages.

He et. al., Deep Residual Learning for Image Recognition, in Proc. of CVPR, 2016.

Xie et. al., Aggregated Residual Transformations for Deep Neural Networks, in Proc. of CVPR, 2017.

Howard et. al., Mobilenets: Efficient Convolutional Neural Networks for Mobile Vision Applications, 2017.

Sandler et. al., MobileNetV2: Inverted Residuals and Linear Bottlenecks, 2018.

Qin et. al., FD-MobileNet: Improved MobileNet with a Fast Downsampling Strategy, 2018.

Oord et al., Wavenet: A Generative Model for Raw Audio, dated Sep. 19, 2016, 15 pages.

Arik et al., Deep Voice: Real-time Neural Text-to-Speech, dated 2017, 17 pages.

Yu et al., Multi-Scale Context Aggregation by Dilated Convolutions, ICLR 2016, dated Apr. 30, 2016, 13 pages.

He et. al., Deep Residual Learning for Image Recognition, 2015.

Srivastava et al., Highway Networks, dated 2015, 6 pages.

Huang et al., Densely Connected Convolutional Networks, dated Aug. 17, 2017, 9 pages.

Szegedy et. al., Going Deeper with Convolutions, dated 2014, 12 pages.

Ioffe et al., Batch Normalization Accelerating Deep Network Training by Reducing Internal Covariate Shift, dated 2015, 11 pages.

Piqueras, Autoregressive Model Based on a Deep Convolutional Neural Network for Audio Generation, Tampere University of Technology, dated 2016, 58 pages.

Wu, Introduction to Convolutional Neural Networks, Nanjing University, dated 2017, 31 pages.

Goodfellow et al., Chapter 9—Convolutional Networks, Deep Learning, MIT Press, dated 2016, 41 pages.

Gu et. al., Recent Advances in Convolutional Neural Networks, dated Jan. 5, 2017, 37 pages.

Srivastava, Dropout A Simple Way to Prevent Neural Networks from Overfitting, 2014, 30 pages.

Chaubard et al., CS224D: Deep Learning for NLP, Lecture Notes Part 1, Spring 2015, Stanford University, 11 pages.

Chaubard et al., CS224D: Deep Learning for NLP, Lecture Notes Part 2, Spring 2015, Stanford University, 11 pages.

Chaubard et al., CS224D: Deep Learning for NLP, Lecture Notes Part 3, Spring 2015, Stanford University, 14 pages.

Chaubard et al., CS224D: Deep Learning for NLP, Lecture Notes Part 4, Spring 2015, Stanford University, 12 pages.

Chaubard et al., CS224D: Deep Learning for NLP, Lecture Notes Part 5, Stanford University, Spring 2015, 6 pages.

* cited by examiner

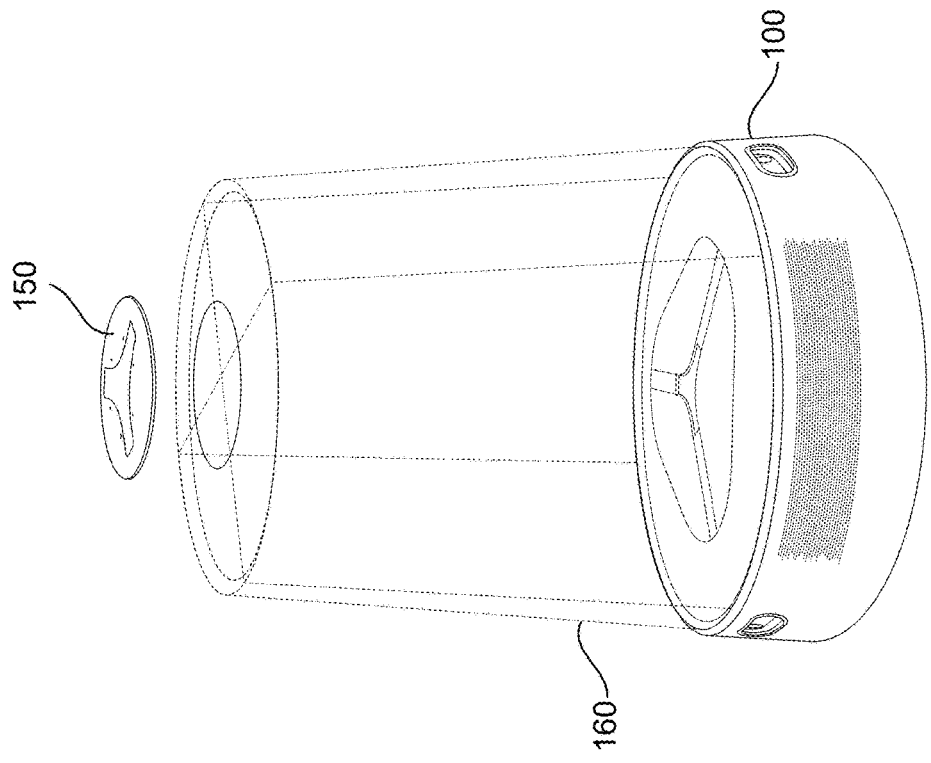
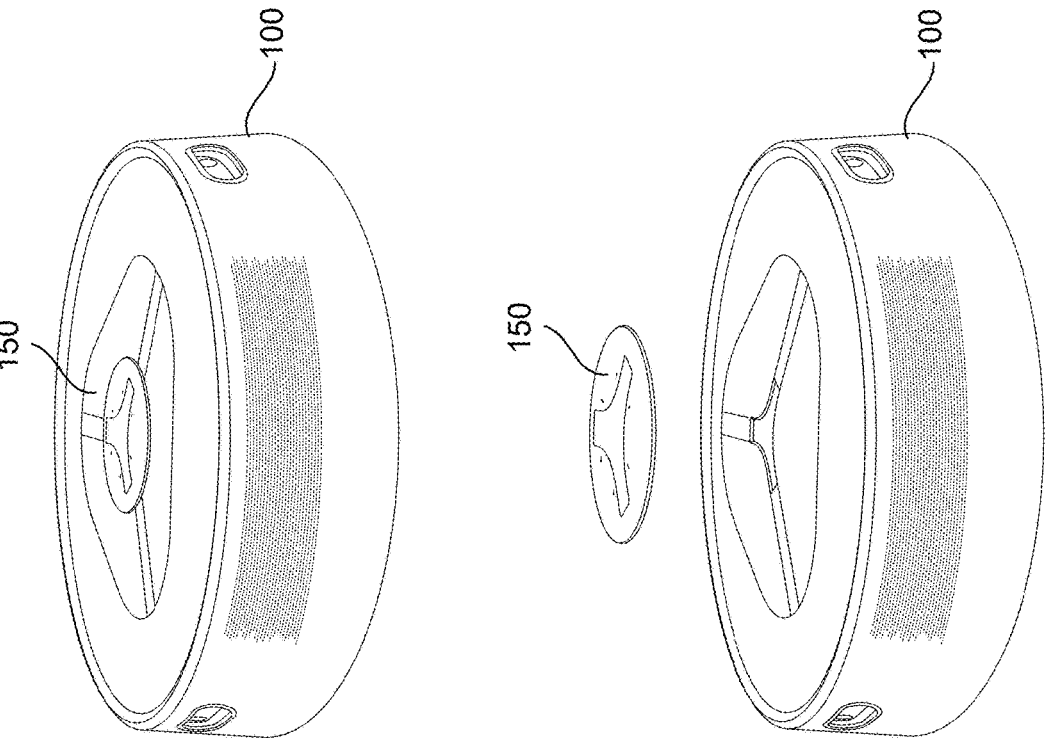
FIG. 1D

300

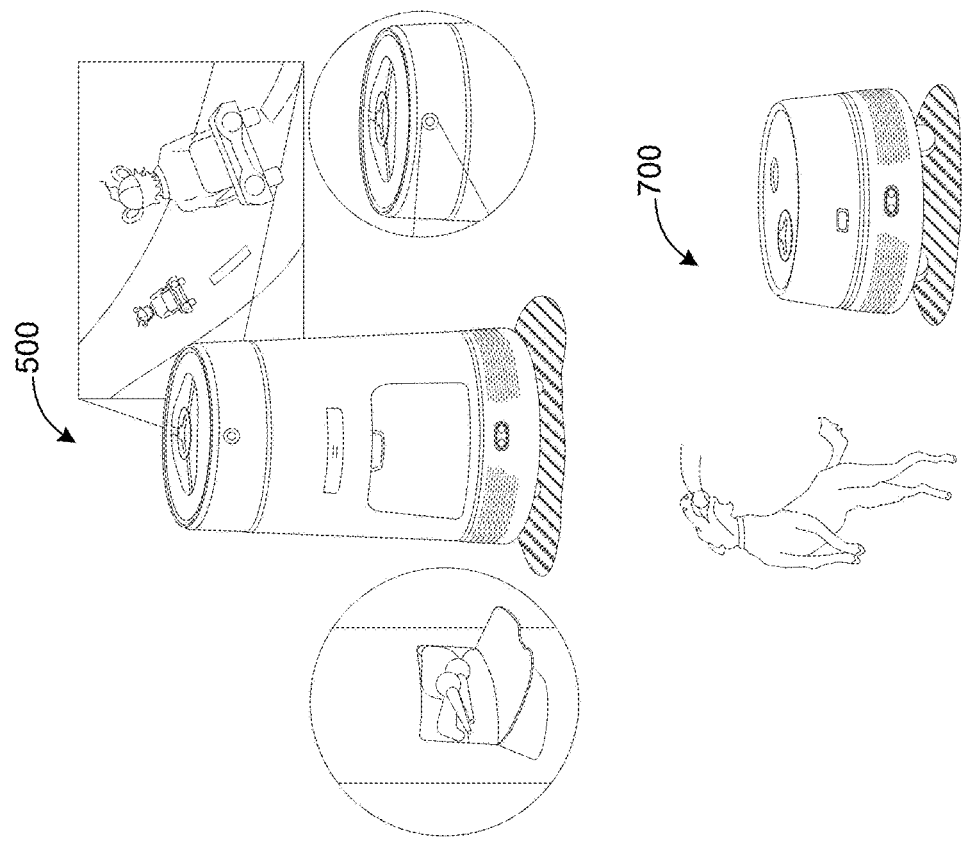
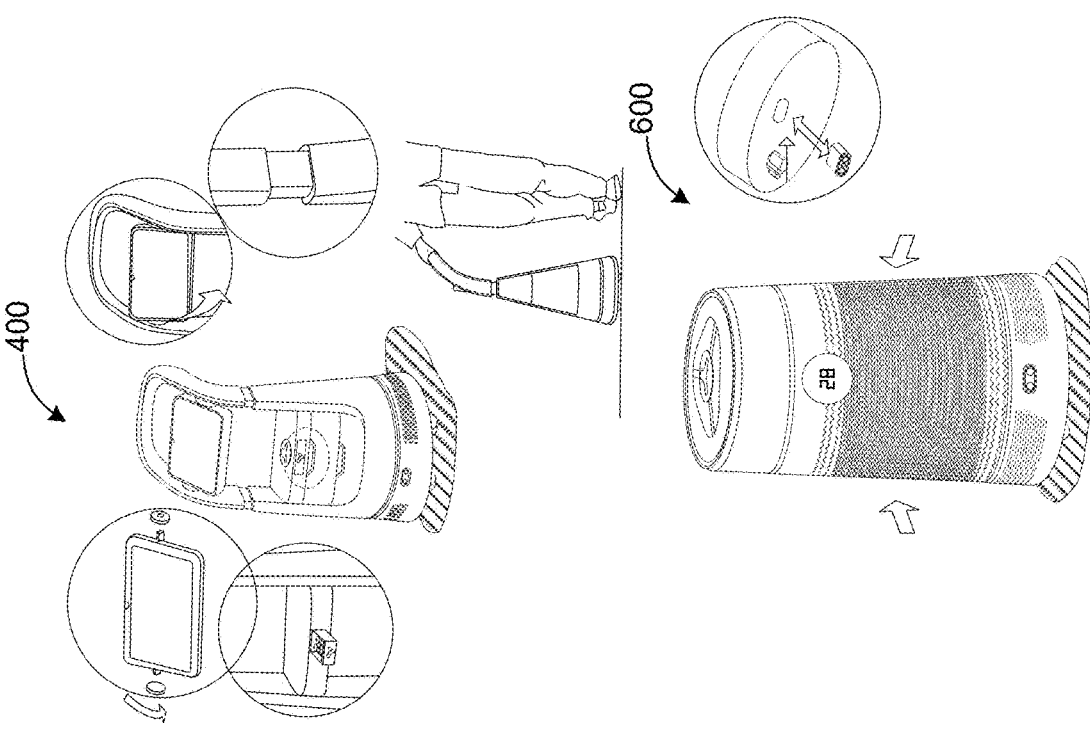
FIG. 3A

400

410

406

401

100

Right quarting perspecive view

Right side view

Tracking
Notification
Communications
Monitoring and Alerts

401

Video calling via wireless network

401

Entertainment via wireless network } 400

500

501

100

Right side view

Right quarting perspecive view

Front view

Left quartering perspective view

600

601

Automated environmental monitoring and maintenance

Autodetect:
Dust, Smoke, Odors
Trigger remedial actions:
Alarms,
Communicate with smart-home thermostat
Contact help via wireless internet

601

700

701

Right quarting perspecive view

Right side view

More features o Built-in camera to view and record remotely o 2-way speaker and microphone to hear and be heard o Precise positioning to track your pet's activities

800A

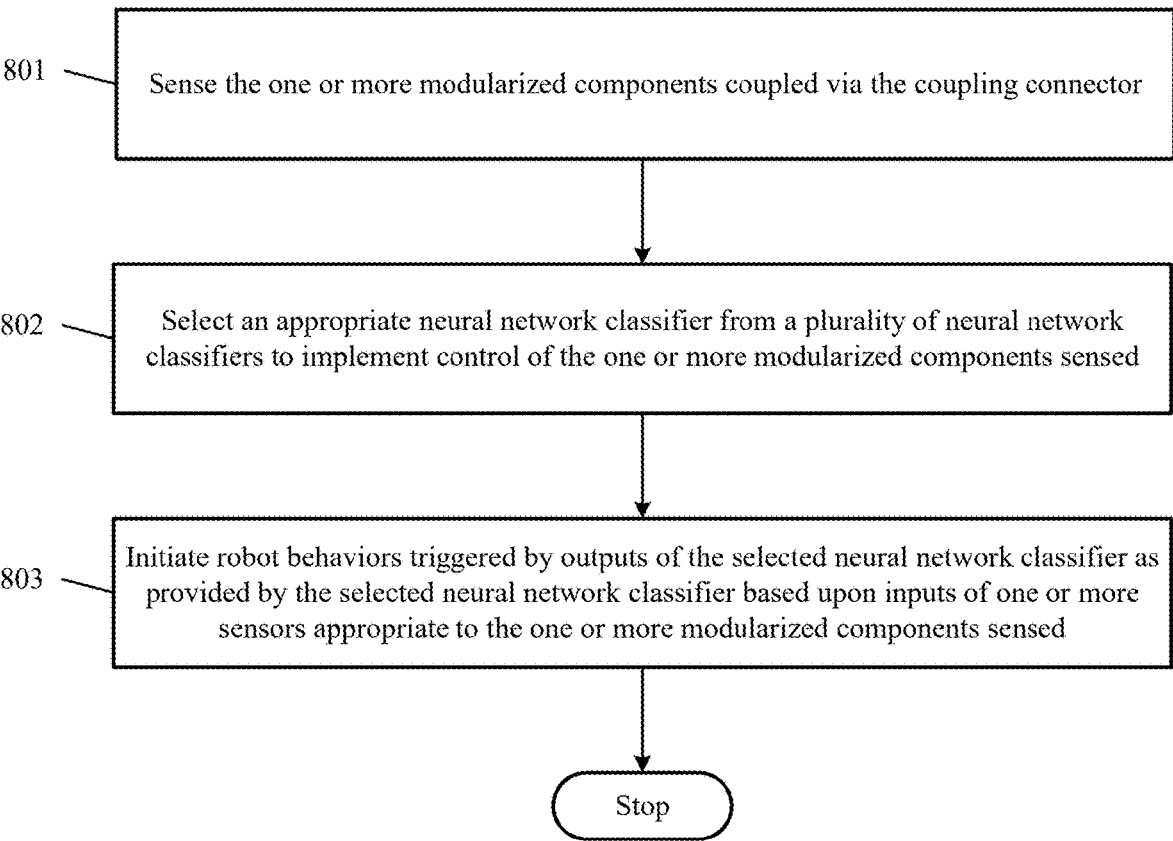

801 — Sense the one or more modularized components coupled via the coupling connector 802 — Select an appropriate neural network classifier from a plurality of neural network classifiers to implement control of the one or more modularized components sensed 803 — Initiate robot behaviors triggered by outputs of the selected neural network classifier as provided by the selected neural network classifier based upon inputs of one or more sensors appropriate to the one or more modularized components sensed Stop

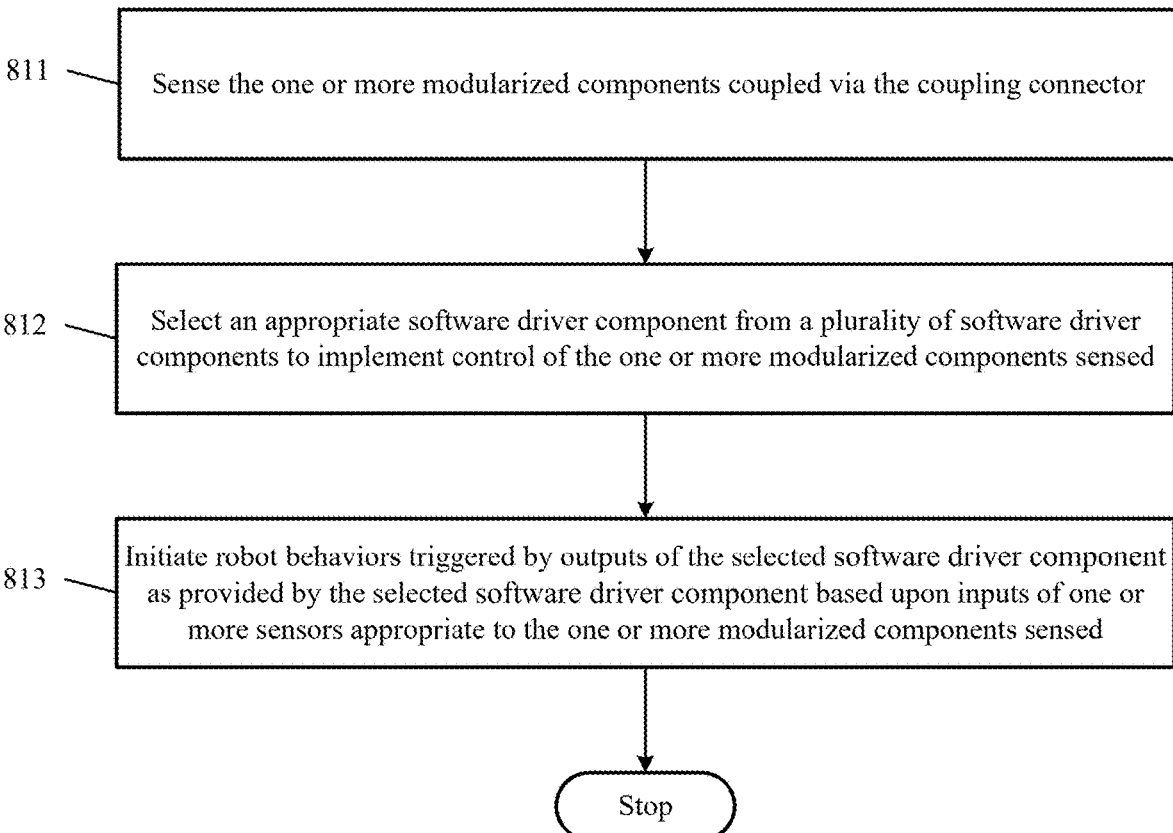

811 — Sense the one or more modularized components coupled via the coupling connector 812 — Select an appropriate software driver component from a plurality of software driver components to implement control of the one or more modularized components sensed 813 — Initiate robot behaviors triggered by outputs of the selected software driver component as provided by the selected software driver component based upon inputs of one or more sensors appropriate to the one or more modularized components sensed Stop

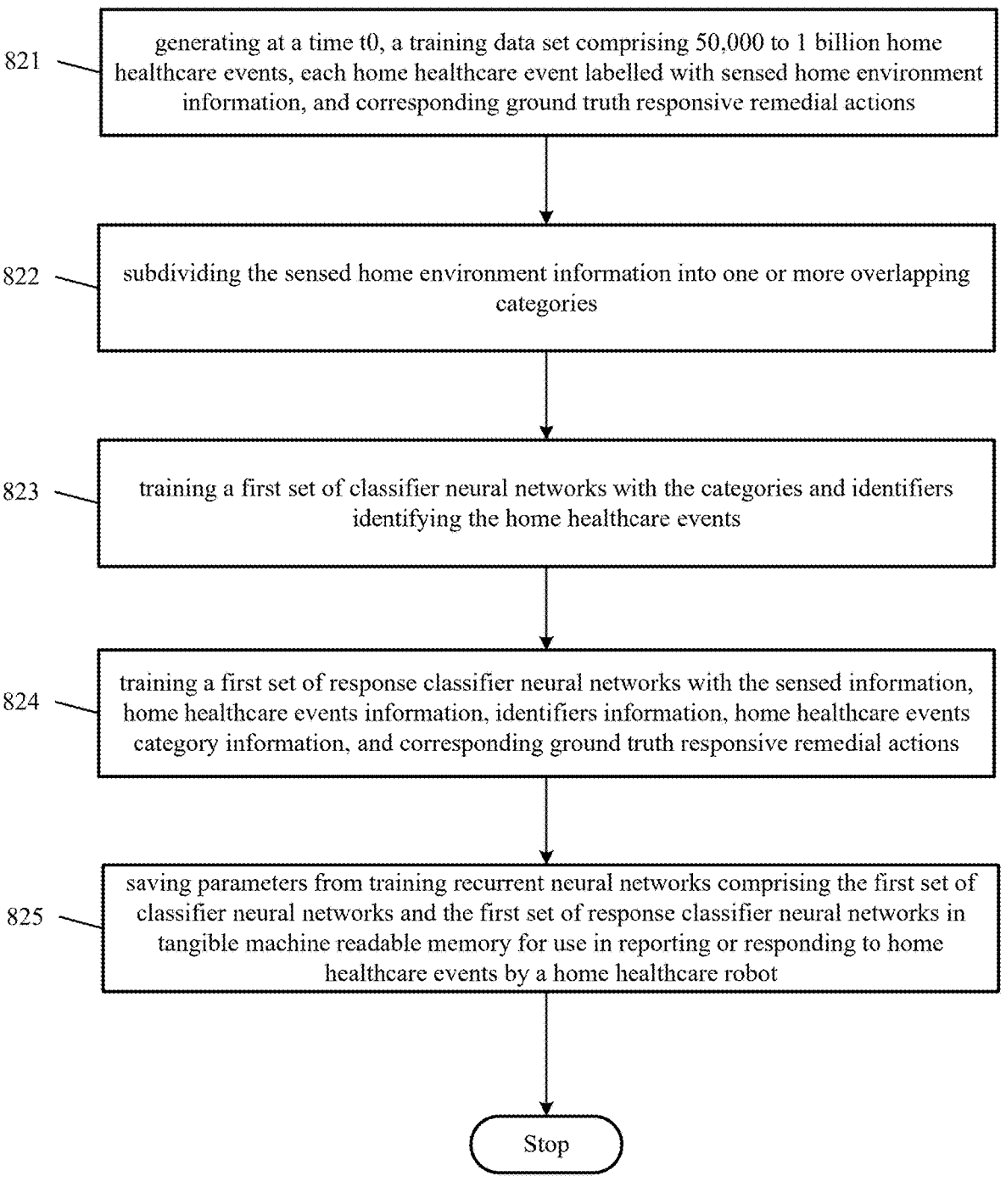

821 — generating at a time t0, a training data set comprising 50,000 to 1 billion home healthcare events, each home healthcare event labelled with sensed home environment information, and corresponding ground truth responsive remedial actions 822 — subdividing the sensed home environment information into one or more overlapping categories 823 — training a first set of classifier neural networks with the categories and identifiers identifying the home healthcare events 824 — training a first set of response classifier neural networks with the sensed information, home healthcare events information, identifiers information, home healthcare events category information, and corresponding ground truth responsive remedial actions 825 — saving parameters from training recurrent neural networks comprising the first set of classifier neural networks and the first set of response classifier neural networks in tangible machine readable memory for use in reporting or responding to home healthcare events by a home healthcare robot Stop

FIG. 8C

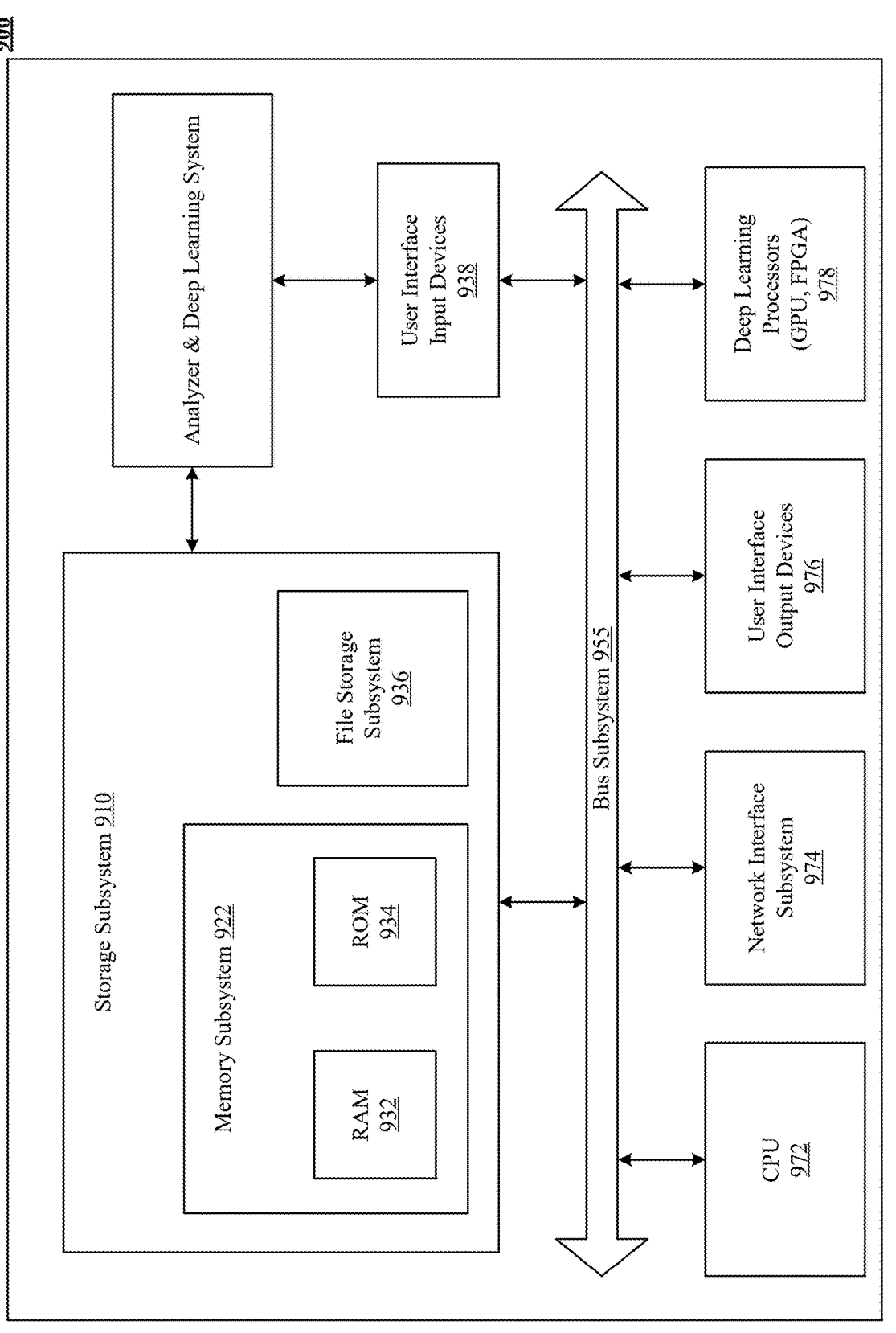
FIG. 9A – Computer System

Convolutional Neural Network

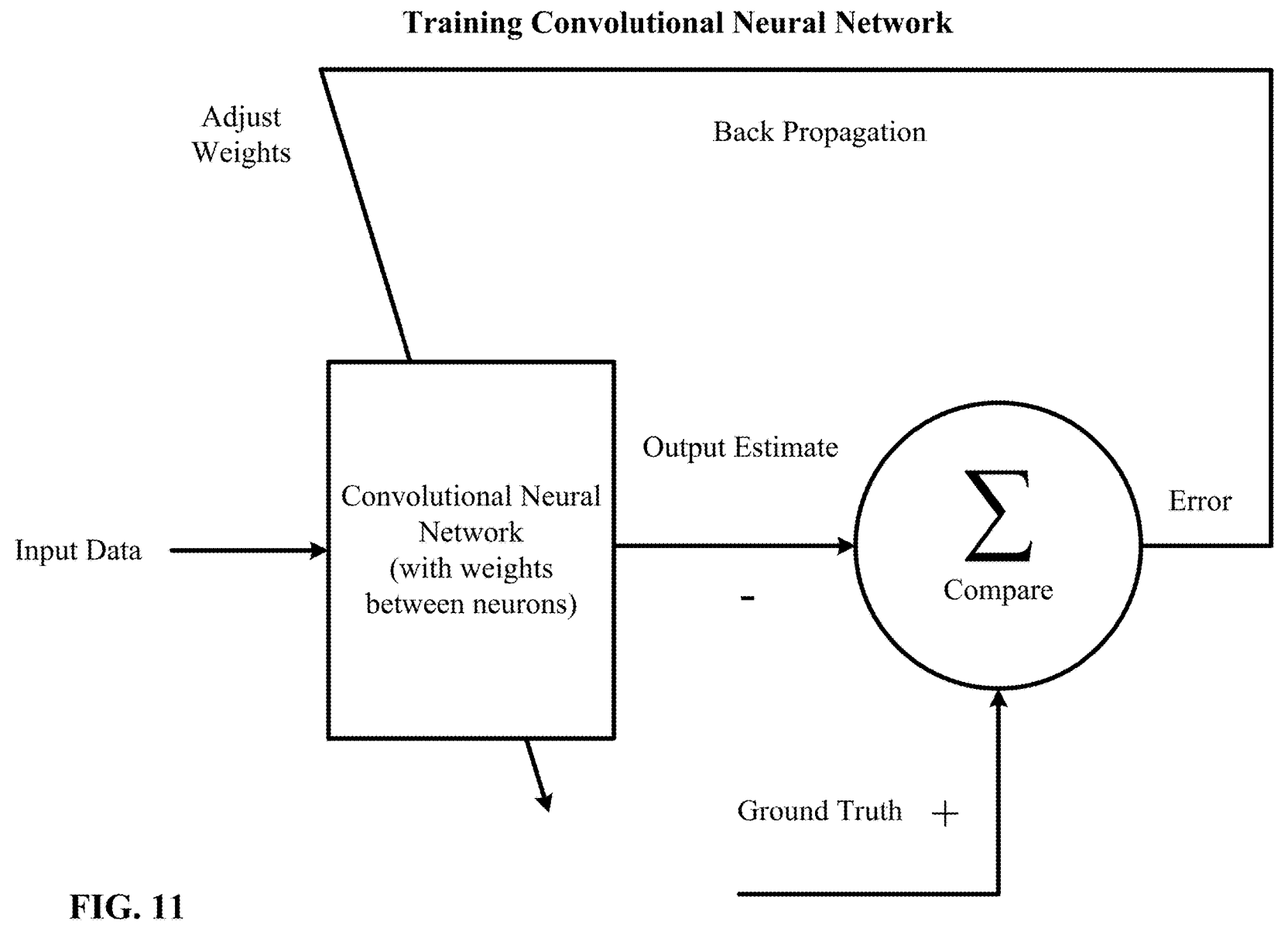

Training Convolutional Neural Network

Back Propagation

Adjust Weights

Error

Compare

Ground Truth   +

Output Estimate

Convolutional Neural Network (with weights between neurons)

Input Data

FIG. 11

Non-Linear Layers of Convolutional Neural Networks

| 100 | 0 | 76 | 0 |
|---|---|---|---|
| 0 | 0 | 40 | 21 |
| 0 | 44 | 1 | 0 |
| 221 | 64 | 41 | 23 |

0,0

| 100 | -43 | 76 | -21 |
|---|---|---|---|
| -90 | -10 | 40 | 21 |
| -19 | 44 | 1 | -35 |
| 221 | 64 | 41 | 23 |

ReLU Activation Function

FIG. 12

Sub-Sampling Layers of Convolutional Neural Networks

Convolution Layers of Convolutional Neural Networks

Residual Connections used in Convolutional Neural Networks

Residual Block and Skip-Connections used in
Convolutional Neural Networks

Batch Normalization Forward Pass with Convolutional
Neural Networks $$\mu_B = \frac{1}{n} \sum_{i=1}^{n} x_i^{(\ell-1)}$$

$$\sigma_B^2 = \frac{1}{n} \sum_{i=1}^{n} (x_i^{(\ell-1)} - \mu_B)^2$$

$$\hat{x}^{(\ell-1)} = \frac{x^{(\ell-1)} - \mu_B}{\sqrt{\sigma_B^2 + \epsilon}}$$

$$x^{(\ell)} = \gamma^{(\ell)} \hat{x}^{(\ell-1)} + \beta^{(\ell)}$$

FIG. 19

Batch Normalization – Inference with Convolutional
Neural Networks $$\hat{x}^{(\ell-1)} = \frac{x^{(\ell-1)} - \mu_{\mathcal{D}}}{\sqrt{\sigma_{\mathcal{D}}^2 + \epsilon}}$$

$$x_i^{(\ell)} = \gamma^{(\ell)} \hat{x}_i^{(\ell-1)} + \beta^{(\ell)}$$

FIG. 20

Batch Normalization Backward Pass with Convolutional Neural Networks $$\nabla_{\gamma^{(\ell)}}\mathcal{L} = \sum_{i=1}^{n}\left(\nabla_{x^{(\ell+1)}}\mathcal{L}\right)_i \cdot \hat{x}_i^{(\ell)}$$

$$\nabla_{\beta^{(\ell)}}\mathcal{L} = \sum_{i=1}^{n}\left(\nabla_{x^{(\ell+1)}}\mathcal{L}\right)_i$$

FIG. 21

Batch Normalization in Convolution Layers

```
conv_model.add(layers.Conv2D(32, 3, activation='relu'))
conv_model.add(layers.BatchNormalization())          <------ After a Conv layer dense_model.add(layers.Dense(32, activation='relu'))
dense_model.add(layers.BatchNormalization())          <------ After a Dense layer
```

FIG. 22

1D Convolution used in Convolutional Neural Networks

MODULARIZED HOME ROBOT

PRIORITY

This application claims the benefit of U.S. Provisional Application No. 62/830,293, entitled "MODULARIZED HOME ROBOT," filed Apr. 5, 2019, which provisional application is hereby incorporated by reference in its entirety for all purposes.

INCORPORATIONS

The following materials are incorporated herein by reference in their entirety for all purposes:

U.S. patent application Ser. No. 15/250,393, filed Aug. 29, 2016, entitled "Visual-Inertial Positional Awareness for Autonomous and Non-Autonomous Tracking,";

U.S. patent application Ser. No. 15/250,581, filed Aug. 29, 2016, entitled "Visual-Inertial Positional Awareness for Autonomous and Non-Autonomous Mapping,";

U.S. patent application Ser. No. 15/942,348, filed Mar. 30, 2018, entitled "Visual-Inertial Positional Awareness for Autonomous and Non-Autonomous Tracking,";

U.S. patent application Ser. No. 15/658,279, filed Jul. 24, 2017, entitled "Fault Tolerance to Provide Robust Tracking for Autonomous and Non-Autonomous Positional Awareness,";

U.S. patent application Ser. No. 15/648,372, filed Jul. 12, 2017, entitled "Mapping Optimization in Autonomous and Non-Autonomous Platforms,";

U.S. patent application Ser. No. 15/623,106, filed Jun. 14, 2017, entitled "Monocular Modes for Autonomous Platform Guidance Systems with Auxiliary Sensors,";

U.S. patent application Ser. No. 15/727,417, filed Oct. 6, 2017, entitled "High-Precision Large-Scale Deep Visual Mapping System for Autonomous Vehicles,";

U.S. patent application Ser. No. 16/197,329, filed Nov. 20, 2018, entitled "Autonomous Platform Guidance Systems with Auxiliary Sensors and Task Planning,";

U.S. patent application Ser. No. 16/197,330, filed Nov. 20, 2018, entitled "Autonomous Platform Guidance Systems with Auxiliary Sensors and Obstacle Avoidance,";

U.S. patent application Ser. No. 16/724,087, filed Dec. 20, 2019, entitled "Autonomous Platform Guidance Systems with Unknown Environment Mapping,";

X. Zhang, X. Zhou, M. Lin, and J. Sun, "ShuffleNet: An Extremely Efficient Convolutional Neural Network for Mobile Devices," in arXiv: 1707.01083, 2017;

A. G. Howard, M. Zhu, B. Chen, D. Kalenichenko, W. Wang, T. Weyand, M. Andreetto, and H. Adam, "Mobilenets: Efficient Convolutional Neural Networks for Mobile Vision Applications," in arXiv: 1704.04861, 2017;

M. Sandler, A. Howard, M. Zhu, A. Zhmoginov, and L. Chen, "MobileNetV2: Inverted Residuals and Linear Bottlenecks," in arXiv: 1801.04381v3, 2018;

Z. Qin, Z. Zhang, X. Chen, and Y. Peng, "FD-MobileNet: Improved MobileNet with a Fast Downsampling Strategy," in arXiv: 1802.03750, 2018;

K. He, X. Zhang, S. Ren, and J. Sun, "Deep Residual Learning for Image Recognition," in Proc. of CVPR, 2016;

K. He, X. Zhang, S. Ren, and J. Sun, "DEEP RESIDUAL LEARNING FOR IMAGE RECOGNITION," arXiv: 1512.03385, 2015;

J. Wu, "INTRODUCTION TO CONVOLUTIONAL NEURAL NETWORKS," Nanjing University, 2017;

I. J. Goodfellow, D. Warde-Farley, M. Mirza, A. Courville, and Y. Bengio, "CONVOLUTIONAL NETWORKS," Deep Learning, MIT Press, 2016;

F. Yu and V. Koltun, "MULTI-SCALE CONTEXT AGGREGATION BY DILATED CONVOLUTIONS," arXiv: 1511.07122, 2016;

R. K. Srivastava, K. Greff, and J. Schmidhuber, "HIGHWAY NETWORKS," arXiv: 1505.00387, 2015;

G. Huang, Z. Liu, L, van der Maaten and K. Q. Weinberger, "DENSELY CONNECTED CONVOLUTIONAL NETWORKS," arXiv: 1608.06993, 2017;

C. Szegedy, W. Liu, Y. Jia, P. Sermanet, S. Reed, D. Anguelov, D. Erhan, V. Vanhoucke, and A. Rabinovich, "GOING DEEPER WITH CONVOLUTIONS," arXiv: 1409.4842, 2014;

S. Ioffe and C. Szegedy, "BATCH NORMALIZATION: ACCELERATING DEEP NETWORK TRAINING BY REDUCING INTERNAL COVARIATE SHIFT," arXiv: 1502.03167, 2015;

Srivastava, Nitish, Hinton, Geoffrey, Krizhevsky, Alex, Sutskever, Ilya, and Salakhutdinov, Ruslan, "DROPOUT: A SIMPLE WAY TO PREVENT NEURAL NETWORKS FROM OVERFITTING," The Journal of Machine Learning Research, 15 (1): 1929-1958, 2014;

L. C. Piqueras, "AUTOREGRESSIVE MODEL BASED ON A DEEP CONVOLUTIONAL NEURAL NETWORK FOR AUDIO GENERATION," Tampere University of Technology, 2016;

J. Gu, Z. Wang, J. Kuen, L. Ma, A. Shahroudy, B. Shuai, T. Liu, X. Wang, and G. Wang, "RECENT ADVANCES IN CONVOLUTIONAL NEURAL NETWORKS," arXiv: 1512.07108, 2017;

M. Lin, Q. Chen, and S. Yan, "Network in Network," in Proc. of ICLR, 2014;

L. Sifre, "Rigid-motion Scattering for Image Classification, Ph.D. thesis, 2014;

L. Sifre and S. Mallat, "Rotation, Scaling and Deformation Invariant Scattering for Texture Discrimination," in Proc. of CVPR, 2013;

F. Chollet, "Xception: Deep Learning with Depthwise Separable Convolutions," in Proc. of CVPR, 2017;

S. Xie, R. Girshick, P. Dollár, Z. Tu, and K. He, "Aggregated Residual Transformations for Deep Neural Networks," in Proc. of CVPR, 2017;

F. Chaubard, R. Mundra, and R. Socher, "CS 224D: DEEP LEARNING FOR NLP, LECTURE NOTES: PART I," 2015;

F. Chaubard, R. Mundra, and R. Socher, "CS 224D: DEEP LEARNING FOR NLP, LECTURE NOTES: PART II," 2015;

F. Chaubard, R. Mundra, and R. Socher, "CS 224D: DEEP LEARNING FOR NLP, LECTURE NOTES: PART III," 2015;

F. Chaubard, R. Mundra, and R. Socher, "CS 224D: DEEP LEARNING FOR NLP, LECTURE NOTES: PART IV," 2015;

F. Chaubard, R. Mundra, and R. Socher, "CS 224D: DEEP LEARNING FOR NLP, LECTURE NOTES: PART V," 2015;

A. van den Oord, S. Dieleman, H. Zen, K. Simonyan, O. Vinyals, A. Graves, N. Kalchbrenner, A. Senior, and K. Kavukcuoglu, "WAVENET: A GENERATIVE MODEL FOR RAW AUDIO," arXiv: 1609.03499, 2016;

S. Ö. Arik, M. Chrzanowski, A. Coates, G. Diamos, A. Gibiansky, Y. Kang, X. Li, J. Miller, A. Ng, J. Raiman,

3

S. Sengupta and M. Shoeybi, "DEEP VOICE: REAL-TIME NEURAL TEXT-TO-SPEECH," arXiv: 1702.07825, 2017;

TECHNOLOGY DISCLOSED

The technology disclosed relates to a multi-purpose robot system and more specifically to modularized home robot system.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The personal robot companion that solves many problems vexing its human owner, long a familiar trope in science fiction novels and movies, has proved elusive in creation. Some limited inroads in this field can be attributable to a cleaning robots such as made commercially available by a number of manufacturers, but to date, these machines remain simple mechanical mobile vacuum cleaners, far from the personal assistant dreamed of by any science fiction lover. Many technical hurdles need to be overcome to make the robot capable of dealing with a variety of common problems facing its human owners before the robot can be considered a personal assistant, rather than today's simple vacuum cleaners. We address a number of these problems herein.

SUMMARY

Implementations of a fully configurable, modularized home robot are described that solve the problems of providing home health care and monitoring of the elderly and/or infirm, providing entertainment for the family, providing environmental and safety monitoring coupled with mechanisms to clean the air and remedy indoor climates such as humidity and temperature, and provide a mechanism for caring for pets left at home when the owner is away. Select embodiments implement deep learning trained classifiers to guide the robot's actions and responses to sensory input and commands.

By way of example and without limitation, one representative robot system includes a mobile base having a platform. Platforms can be substantially round, e.g., circular, semi-circular, or elliptical or combinations thereof, substantially triangular, or quadrilateral in shape. A drive mechanism is mounted to the platform. A housing is coupled to the platform. Two or more sensors are rigidly coupled to the platform and directed outwardly from the platform to detect obstacles present. One or more of the sensors can be camera(s) operable in the infrared (IR), visible light (RGB) and or time of flight or depth sensing cameras. Some robots have a second camera positioned relative to the camera of the at least one of the two sensors to form a pair of cameras capable of stereoscopic imaging. One or more gaps in the housing permit light to pass through to the camera(s). A communications interface sends and receives information using a wireless network. A coupling mechanism that includes an electrical connector accepts one or more modularized components implementing specific functions. The modularized components are selected from among an elderly care component, an entertainment component, an environment component and a pet sitter component. The robot system also includes a controller having one or more processors coupled to a memory storing instructions that when executed by the processor perform sensing the one or more modularized components coupled via the coupling connector, selecting an appropriate neural network classifier from a plurality of neural network classifiers to implement control of the one or more modularized components sensed; and initiating robot behaviors triggered by outputs of the selected neural network classifier as provided by the selected neural network classifier based upon inputs of one or more sensors appropriate to the one or more modularized components sensed.

Some robots include a third sensor, wherein three sensors positioned approximately 120 degrees apart from one another around directed outward from a center of the platform; thereby providing sensory input around the robot substantially contemporaneously. Some robots have a microphone and speaker configured to collect audio and speech from users for input to the selected neural network classifier and output audio and speech from the neural network classifier respectively, and some input and output can be received from or transmitted to applications and devices via a wireless network. Some robots will convey sensory data collected to, and obtain results from, processing by neural network classifiers at a host resident application(s) via wireless network(s).

One robot system implementation includes a couple-able elderly care component having an adjustable height handle, that when coupled to the base and controlled by the controller, an elderly person can hold while the robot system under control of instructions based upon output from the selected neural network classifier guides the elderly person. Further, some implementations will include a medication dispenser and monitor for dispensing medication to the elderly person and monitoring that the elderly person has taken their medication. This can also be controlled based upon output of the selected neural network classifier.

One robot system implementation includes a couple-able entertainment component having a projection mechanism, that when coupled to the base and controlled by the controller under control of instructions based upon output from the selected neural network classifier, projects augmented reality presentations and to sense bodily motions of users and reflect the bodily motions sensed in changes to the augmented reality presentations. Further, some implementations include projecting presentations selected from a set comprising of games, movies, educational activities, entertainment activities. This can also be controlled based upon output of the selected neural network classifier.

One robot system implementation includes a couple-able environmental component having an air quality sensor, a humidification system and purification system, that when coupled to the base and controlled by the controller under control of instructions based upon output from the selected neural network classifier, senses air quality parameters including humidity and pollution and activate the humidification system when humidity sensed is outside a settable level and activate the purification system when pollution sensed is outside a settable level. Further some implementations include the robot system under control of instructions based upon output from the selected neural network classifier, travelling from room to room substantially contemporaneously with sensing air quality, activating the humidification system when humidity sensed is outside a settable level and activating the purification system when pollution sensed is outside a settable level.

One robot system implementation includes a couple-able pet sitter component having a pet food dispenser to dispense food that and a pet toy launcher to launch a toy, that when coupled to the base and controlled by the controller under control of instructions based upon output from the selected neural network classifier, administers food to the pet and launches a toy into space to entertain the pet. Further, some implementations of the robot system track position and motions of the pet. This can also be controlled based upon output of the selected neural network classifier.

Implementations provide substantial improvements over conventional robot systems. Greater modularity can be achieved. Increased flexibility in use can be provided by implementations. Improved healthcare, safety, greater capability in remote contact and home control and remote sensing and monitoring and other benefits can be provided by practice of certain embodiments. Other aspects and advantages of the present invention can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 1D illustrates robot base 100 interconnecting with remote-able internet microphone and speaker unit 150 in two configurations, a direct to base 100 attachment on the left and attachment to top of an added component 160 on the right in examples of a modularized home robot implementations.

FIGS. 3A and 3B illustrate a plurality of configurations for modularized home robot implementations.

FIGS. 6A, 6B, 6C, 6D, and 6E illustrate various views of a home environment/safety monitoring configuration for a modularized home robot implementation.

FIGS. 8A, 8B are flowcharts depicting representative processes for automated configuring a modular robot implementation.

FIG. 8C is a flowchart depicting representative processes for training a classifier in a supervised or semi-supervised machine learning robot implementation.

FIG. 9A illustrates one implementation of a computer system that can be used to implement the technology disclosed.

FIG. 11 depicts a block diagram of training a convolutional neural network in accordance with one implementation of the technology disclosed.

FIG. 12 shows one implementation of a ReLU non-linear layer in accordance with one implementation of the technology disclosed.

FIG. 19 shows the batch normalization forward pass.

FIG. 20 illustrates the batch normalization transform at test time.

FIG. 21 shows the batch normalization backward pass.

FIG. 22 depicts use of a batch normalization layer with convolutional or densely connected layer.

DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

A fully configurable, modularized home robot described with reference to particular implementations that solve the problems of providing home health care and monitoring of the elderly and/or infirm. Some implementations provide entertainment for the family. Some implementations provide environmental and safety monitoring coupled with mechanisms to clean the air and remedy indoor climates such as humidity and temperature. Further, some implementations can provide a mechanism for caring for pets left at home when the owner is away.

Figures 1A, 1B:
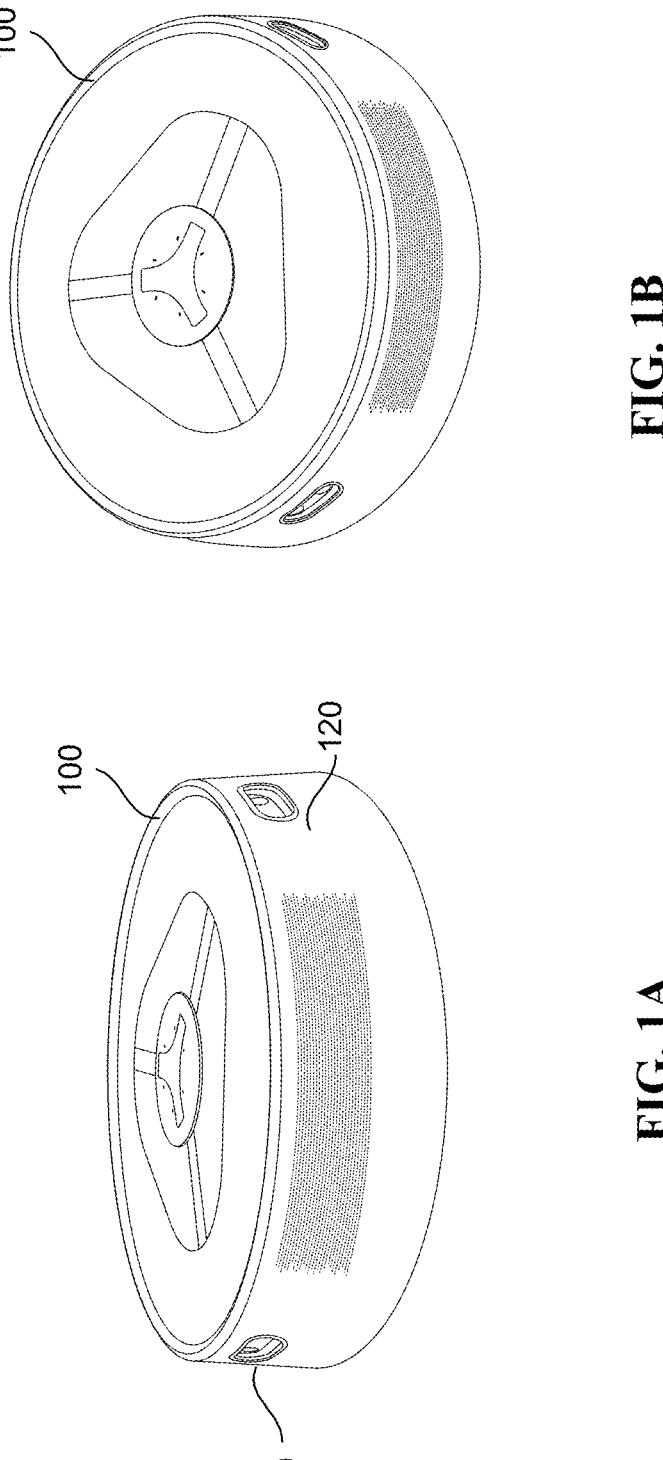
FIG. 1A illustrates a left front view of a modularized home robot implementation.
FIGS. 1B and 1C illustrate an elevation view from the left front perspective of a modularized home robot implementation.
Figure 3B:
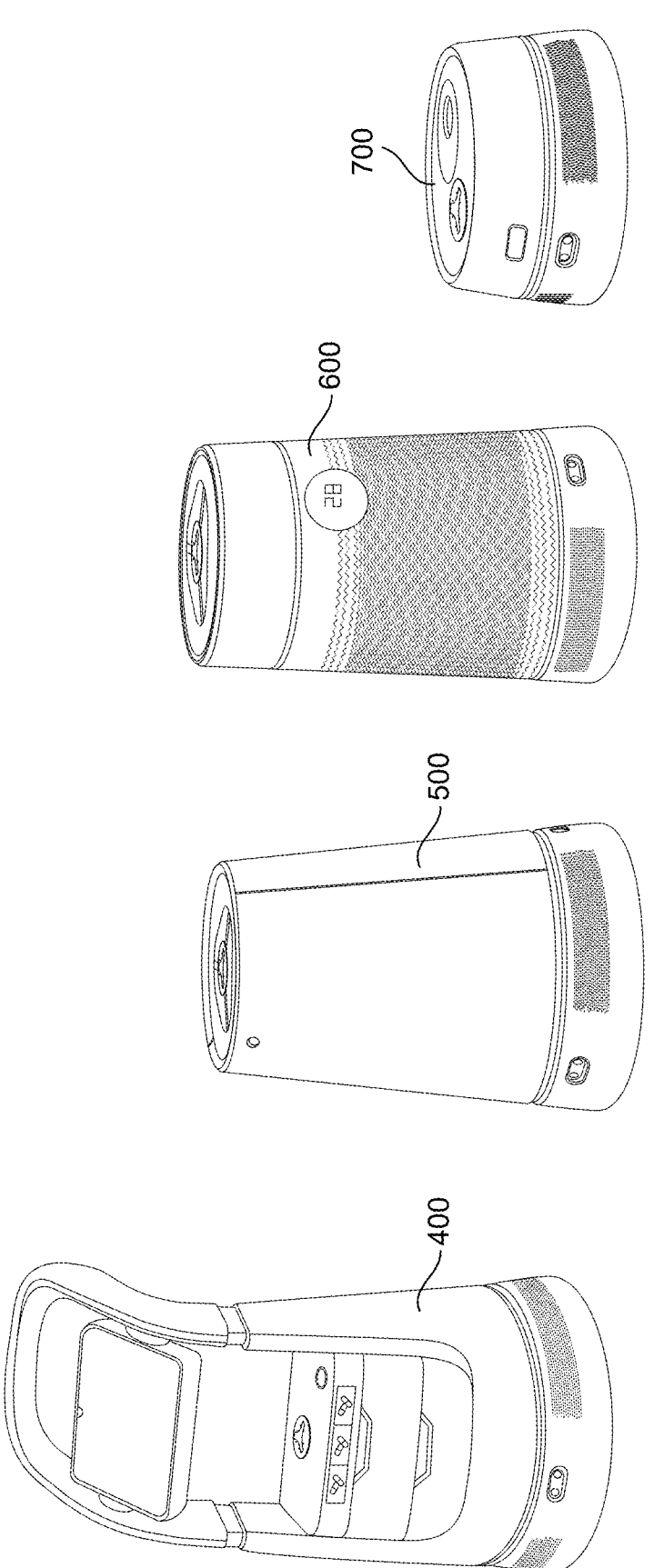
Figure 4A:
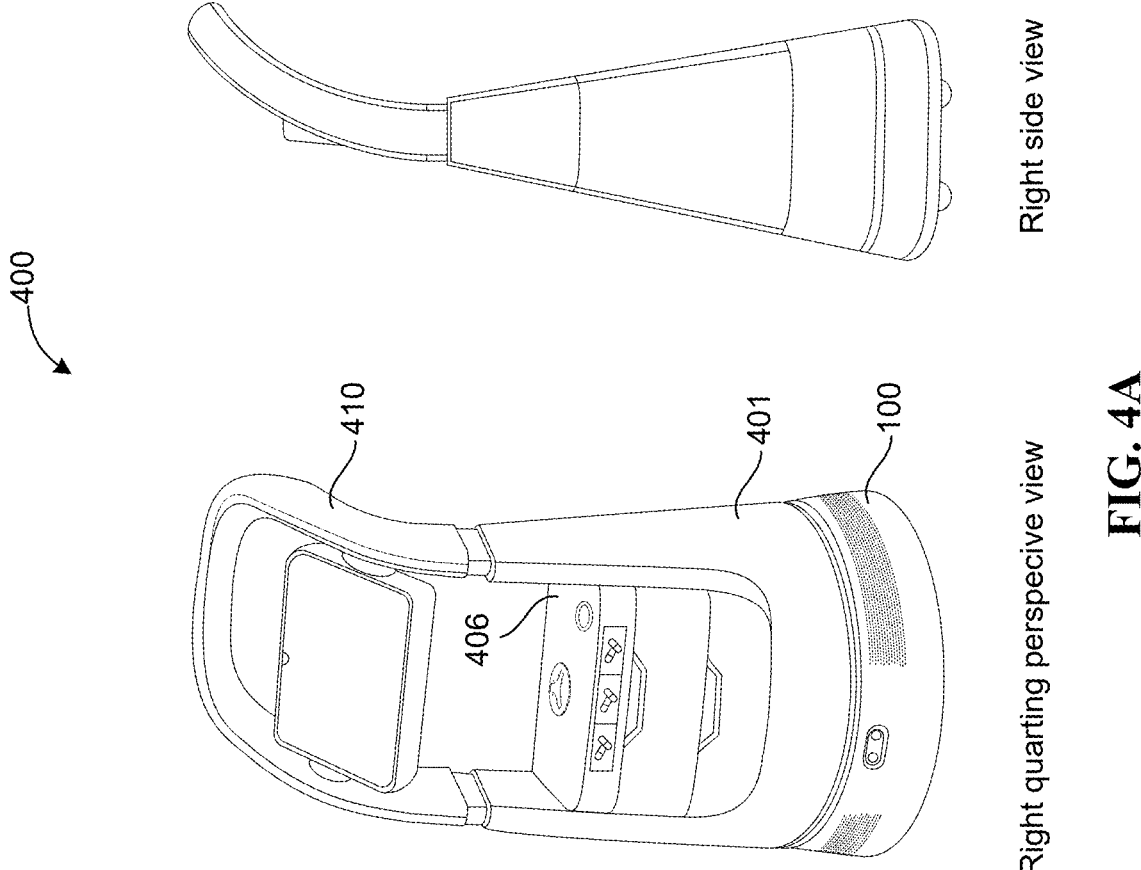
FIGS. 4A, 4B, 4C, 4D, 4E, and 4F illustrate various views of a home care configuration for a modularized home robot implementation.

FIG. 1A illustrates a left front view of a modularized home robot implementation. A robot system includes a mobile base 100 having a platform. While described herein with reference to a round platform, robot base 100 can be round, triangular, quadrilateral, pentagonal, hexagonal, heptagonal, octagonal, and nonagonal or other shape. A drive mechanism (omitted from FIG. 1A for clarity sake, but shown in FIG. 4A) is mounted to the platform. Drive mechanisms are configured to drive wheels, which may be omnidirectional, tractor or tank treads or combinations. A housing is coupled to the platform forming the "sides" of robot base 100. Two or more sensors are rigidly coupled to the platform and directed outwardly, peering through the housing via camera/sensor ports 110, 120 to detect obstacles present. Some robot configurations can have omnidirectional perception capability using at least two (2) sets of Red Green Blue and Depth (RGB-D) perception sensors. A communications interface (not shown in FIG. 1A for clarity but shown in FIG. 2A) sends and receives information using a wireless network. A coupling mechanism that includes an electrical connector accepts one or more modularized components implementing specific functions. With reference to FIGS. 3A and 3B, the modularized components are selected from among an elderly care component 400, an entertainment component 500, an environment component 600 and a pet sitter component 700.

Figure 2A:
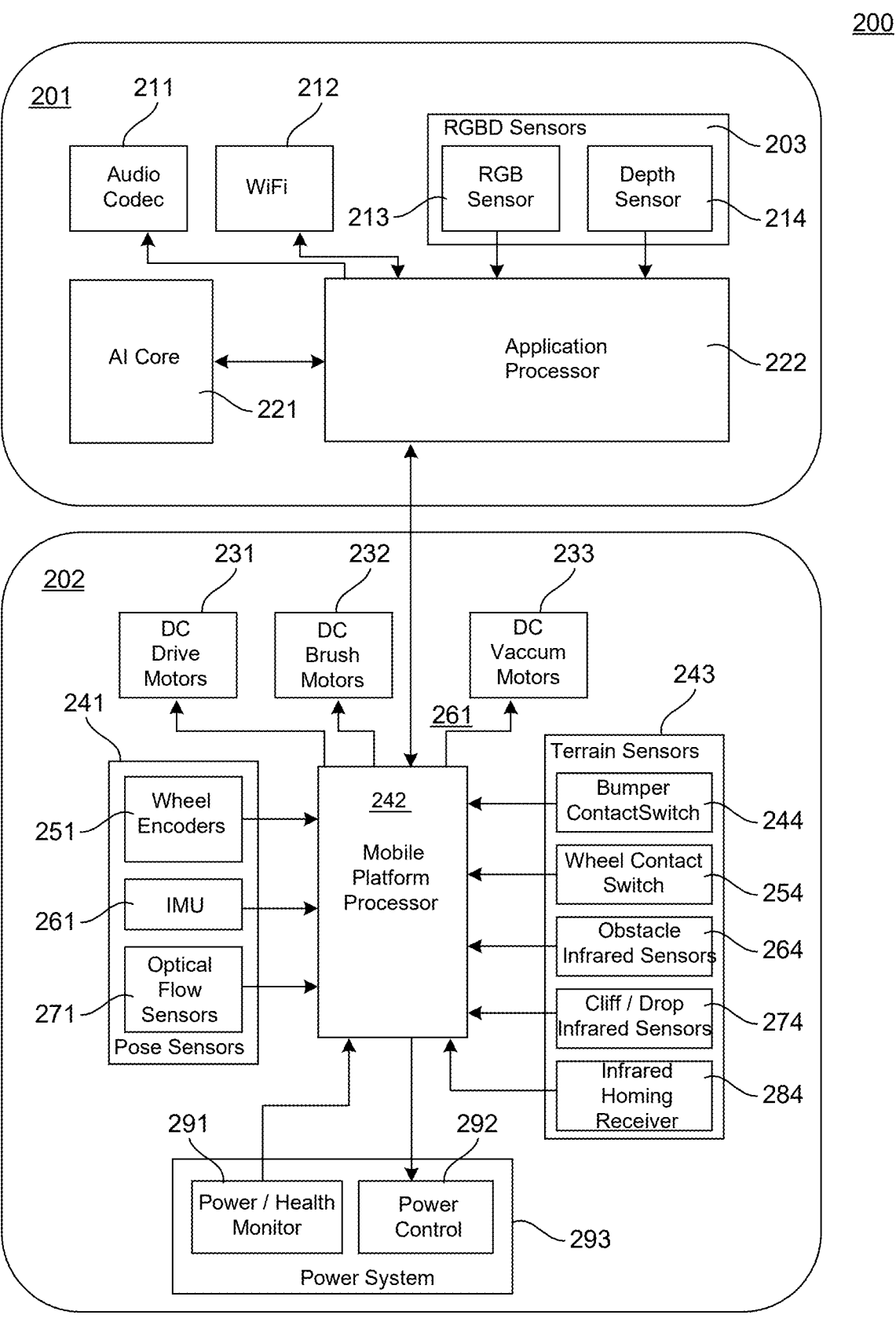
FIGS. 2A and 2B illustrate representative system diagrams for a system in which a modularized home robot may be embodied.
Figure 2B:
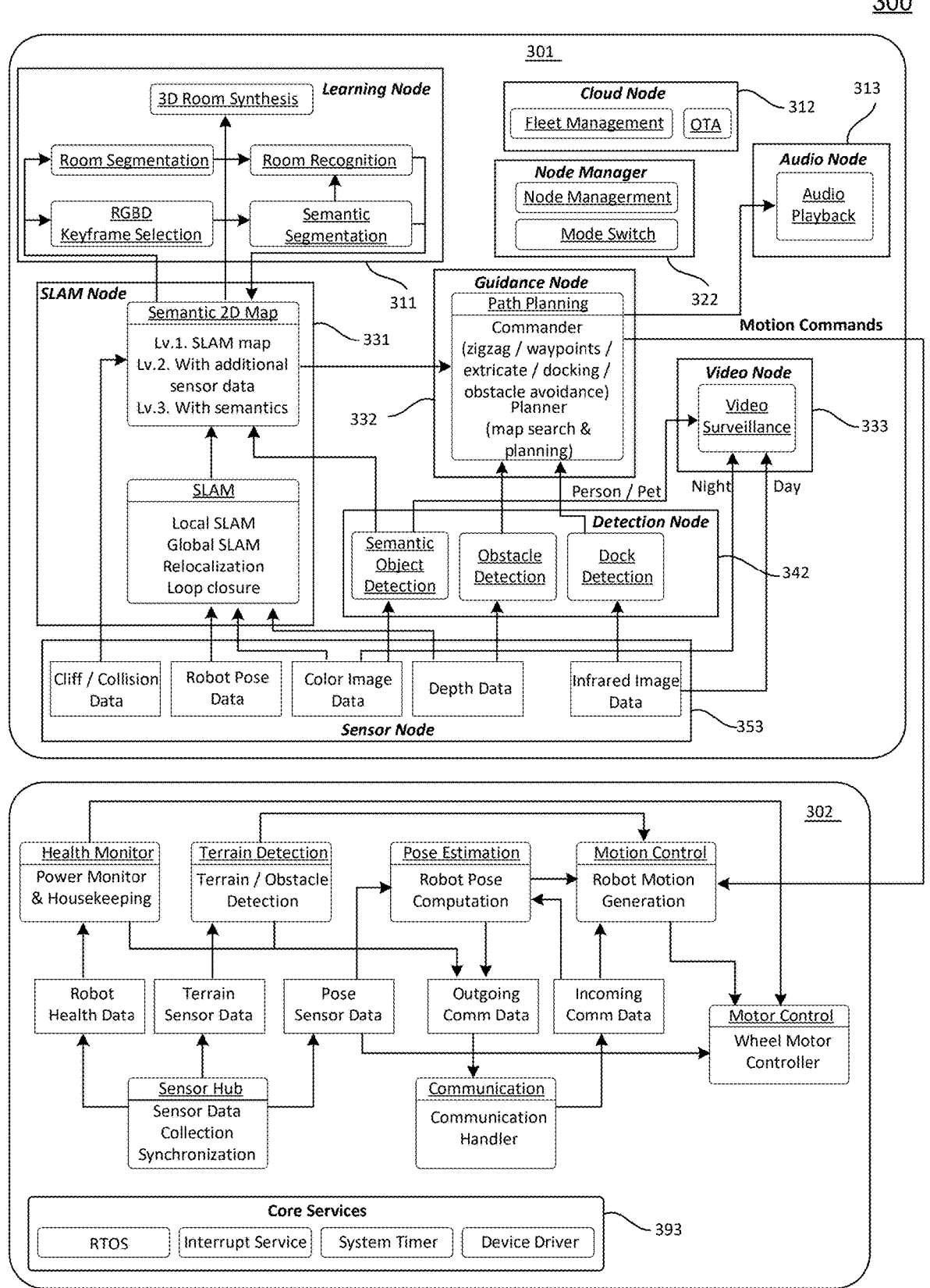

Now with reference to FIGS. 2A, 2B the robot system also includes a controller having one or more processors coupled to a non-transitory memory storing instructions that when executed by the processor perform a process for configuring a modularized robot. Example processing for automated configuring a modularized robot will be described in greater detail below with reference to FIGS. 8A-8B.

Figure 1C:
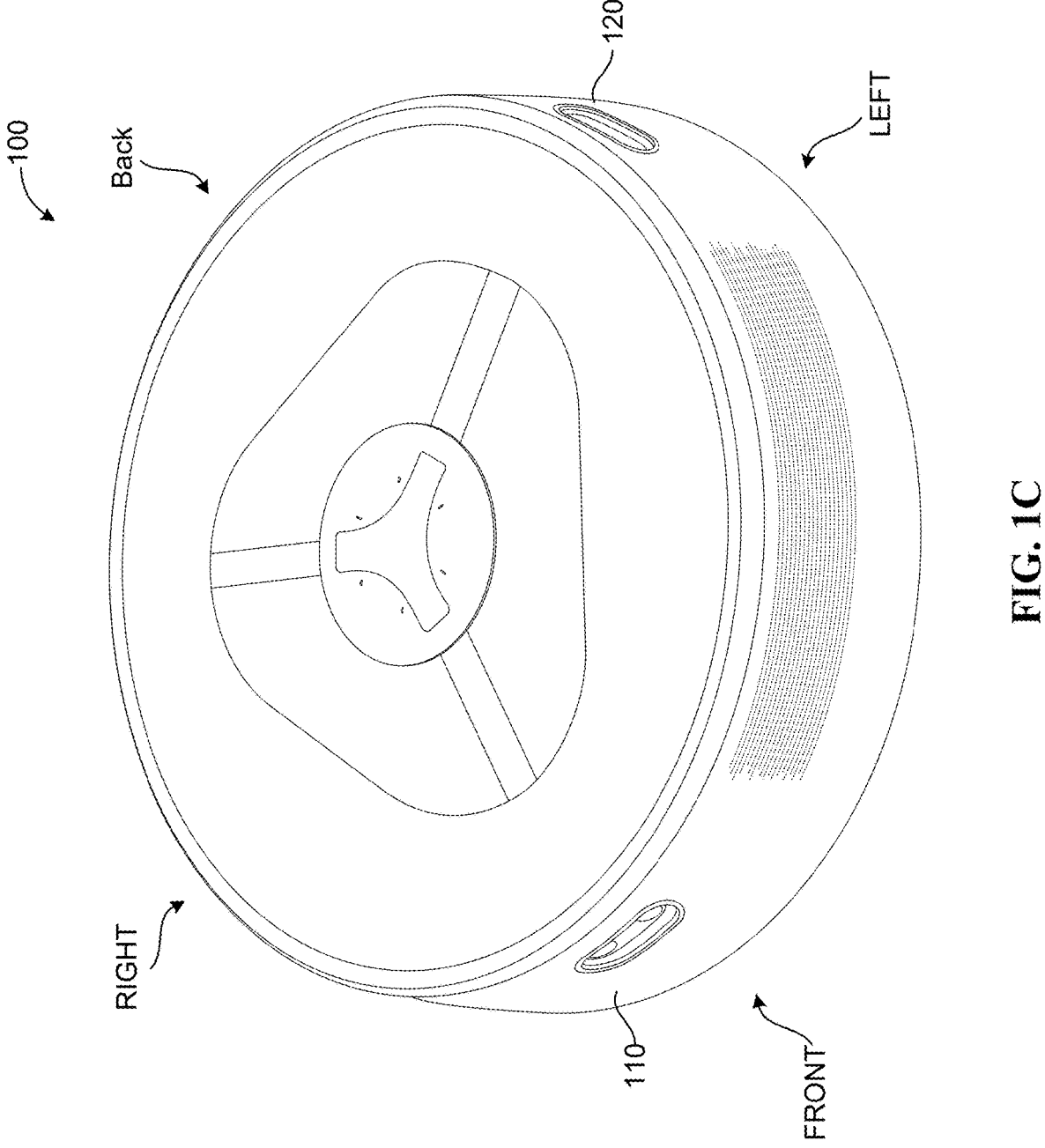

FIGS. 1B and 1C illustrate an elevation view from the left front perspective of a modularized home robot implementation. As depicted by FIGS. 1A-1C, a robot base 100 includes three (3) camera/sensor ports 110, 120, and 130 (not shown in FIGS. 1A-1C for clarity sake) spaced approximately equidistant about the robot base 100, enabling the robot to gather information about its environment in multiple directions substantially contemporaneously. In one implementation, sensors comprising depth of field imaging sensors, optionally coupled with RGB (red green blue) color imaging cameras are used to comprise one or more of the three (3) sensors at sensor ports 110, 120, and 130. Some implementations may use time of flight cameras, black and white or greyscale cameras, IR (infrared) cameras or various combinations thereof for imaging, ultrasonic or sonic sensors or various combinations thereof for depth or position sensing, in order to realize one or more of the three (3) sensors at sensor ports 110, 120, and 130. Of course, some implementations will use greater than three (3) sensors, while other implementations may be realized with fewer than three (3) sensors without departing from the spirit and scope of the disclosed technology. While illustrated by FIGS. 1A-1C as being mounted in robot base 100, some implementations will position cameras in other locations, such as on a platform, surface or otherwise supported in a plane above the base 100, such as atop added component 160 depicted by FIG. 1D.

FIG. 1D illustrates robot base 100 interconnecting with remote-able internet microphone and speaker unit 150 in two configurations, a direct to base 100 attachment on the left and attachment to top of an added component 160 on the right in examples of a modularized home robot implementations. In one embodiment, microphone and speaker unit 150 implements voice-enabled connection to the internet using the Alexa Voice Service (AVS) of Amazon™.

FIGS. 2A and 2B illustrate representative system diagrams for a system in which a modularized home robot may be embodied. FIG. 2A depicts a representative robot architecture 200 suitable for implementing a modularized home robot. Architecture 200 includes a higher level cognitive level processor system 201 cooperatively coupled with a utility level processor system 202. Cognitive processor system 201 is preferably equipped to process nodes of one or more deep neural networks trained with responses to sensed inputs (e.g., 241, 251, 261, 271, 243, 244, 254, 264, 274, 284) from the robot's environment and commands from human or other supervisory users. The neural networks in which the deep learning system can be realized are discussed in further detail hereinbelow with reference to FIGS. 9A-24.

Cognitive processor system 201 includes an application processor 222 coupled to an AI core 221, audio codec 211, WiFi system 212 and a set of RGBD Sensors 203. RGBD Sensors 203 include nominally one or more Red Green Blue (RGB) visual range cameras configured to capture images of the environment surrounding the robot and one or more depth sensors 214 to capture distance information to obstacles and objects in the environment surrounding the robot. Other types of sensors, such as infrared (IR) sensitive cameras not shown in FIG. 2A for clarity sake can also be included. Application processor 222, in conjunction with AI core 221, gathers information including images captured from RGBD sensors 203, network messages communicated via WiFi system 212, audio information from audio codec 211, and status updates from utility processor system 202. Application processor 222 and AI core processor 221 process these information inputs to utilize it to understand the environment surrounding the robot, the robot's own internal operations and health, and desires and requests being made of the robot by its human companion and makes output of commands to utility processor system 202 to control the robot's own functions, output via WiFi system 212 of network messages and requested or otherwise deemed necessary to communicate to the human companion, or other robots or systems, output via audio codec 211 speech or sounds to communicate to the human companion, pets or other humans and animals. In some implementations, AI core processor 221 implements selected ensemble neural networks implementing trained classifiers to determine a situation state of the environment encountered by the robot using sensory input of the robot and training of the classifiers. Implementations may use supervised machine learning (i.e., the machine learning task of learning a function that maps an input to an output based on example input-output pairs), un-supervised machine learning (i.e., the system discovers features of the input population without a prior set of categories defined), or combinations thereof to train classifiers. Portions of AI core processor 221 functionality may be remoted to host processors (e.g., in the cloud) via cloud interface 312, for example, enabling classifier functionality to be offloaded from robot platform 100. In some implementations, the classifier is selected in the cloud and downloaded to the AI core processor 221 for processing locally. Collecting outcome information enables AI core processor 221 to provide new training scenarios to re-train neural network classifiers enabling the robot to learn from experience. Cloud node 312 provides an interface enabling experience data gathered by AI core processor 221 to be shared via a training system (e.g., 900B of FIG. 9B) with other robots.

Utility processor system 202 includes a mobile platform processor 242 coupled to a set of pose sensors 241, a set of terrain sensors 243, power system 293 and a set of motor drivers (not shown in FIG. 2A for clarity sake) that in turn drive various motors and actuators. In one representative example in which robot is equipped with an integrated cleaning system, processor 242 can control Drive motors 231, and cleaning system motors including brush motors 232 and vacuum motors 233. Some implementations of robot base 100 will not include cleaning system components. While other implementations will include different actuators and drives than those illustrated by FIG. 2A.

Pose sensors 241 include wheel encoders 251 that sense turns of drive wheels used to move the robot base 100. Some implementations will use treads or other drive mechanisms instead of wheels and will accordingly use different types of encoder sensors to determine drive tread travel. Pose sensor 241 also includes an Inertial measurement Unit (IMU) 261 to detect acceleration and deceleration of the robot platform. IMU 261 can be solid state and can be implemented using one or more gyroscopic sensors. Optical flow sensors 271 are used to sense changes in pose of the robot and function by capturing changes in optical information being sensed and determining therefrom changes in the robot's pose. Not all implementations will use all of the pose sensors of pose sensor set 241. Some implementations will use various numbers of sensors or different types and combinations. Other types of sensors not shown in FIG. 2A can also provide pose information to processor 241.

Terrain sensors 243 include contact switches 244 that detect an occurrence of actual physical contact by the robot with an object in the environment. Wheel contact switches 254 detect occurrence of contact by the wheels of the robot with a solid surface. Obstacle infrared sensors 264 detect an imminent collision by the robot with an obstacle in the environment. Cliff or drop sensors 274 detect a cliff or a drop-off of the surface on which the robot base 100 resides, such as encountering a stairway or pit. An infrared homing receiver 284 detects presence of an infrared source to which the robot may be commanded to home. Not all implementations will use all of the terrain sensors of terrain sensor set 243. Some implementations will use various numbers of sensors or different types and combinations. Other types of sensors not shown in FIG. 2A can also provide pose information to processor 241.

FIG. 2B depicts a representative robot architecture 300 suitable for implementing a modularized home robot. Architecture 300 includes higher-level cognitive processes 301 cooperatively interacting with utility-level processes 302. Cognitive processes 301 include a learning node 311, a cloud node 312, an audio node 313, a node manager 322, a SLAM node 331, providing Simultaneous Localization and Mapping (SLAM), a guidance node 332, a video node 333, a detection node 342, and a sensor node 353. Learning node 311 includes processing components comprising executable instructions that when executed by a processor perform 3D room synthesis, room segmentation, room recognition, RBFD keyframe selection, and semantic selection.

In some implementations, learning node 311 implements a deep learning system to enable the robot 100 to learn to recognize objects in images, recognize speech in the environment, and recognize non-speech sounds or sensory inputs signifying danger (e.g., sirens, heat, smoke, etc.). In one deep learning system implementation, a training stage of a deep neural network that trains the deep neural network to submit hundreds of training sensory input samples to multiple sensory input recognition engines and determine how sensory state recognition error rates of the sensory input recognition engines vary with image, sound and other sensor characteristics of the training sensory input samples.

The deep learning system further comprises an input stage of the trained deep neural network that feeds information from imaging sensors, audio channels and other environmental sensors, as well as robot internal status indicators and internal condition sensors (e.g., over voltage, temperature, power available, etc.) to the trained deep neural network for processing.

The deep learning system further comprises an output stage of the trained deep neural network that provides sensory states recognized as outputs to other processes that make decisions and implement actions of the robot responsive to recognizing a sensory state.

In one implementation, the deep neural network can be a feed-forward neural network. The deep neural network can be a recurrent neural network, including a long short-term memory (LSTM) network and a gated recurrent unit (GRU). The deep neural network can be a convolutional neural network (CNN).

The deep neural network can be trained using backpropagation. The deep neural network can be trained using reinforcement learning. The neural networks in which the deep learning system can be realized are discussed in further detail hereinbelow with reference to FIGS. 9A-24. Learning node 311 provides output to SLAM node 331.

SLAM node 331 includes process components including executable instructions that implement maintaining a semantic 2D map and implementing Simultaneous Location and Mapping (SLAM). SLAM node 331 takes as input cliff and collision data, robot pose data, color image data and depth data from sensor node 353 and provides output to learning node 311 and guidance node 332. For a detailed description of the semantic map and SLAM techniques, reference can be had to U.S. patent application Ser. No. 15/250,281, entitled "Visual-Inertial Positional Awareness for Autonomous and Non-Autonomous Mapping", filed Aug. 29, 2016 which is incorporated herein in its entirety for all purposes.

Guidance node 332 includes process components including executable instructions that implement conducting path planning using the semantic 2D map received from SLAM node 331, obstacle detection and dock detection information from detection node 342. Guidance node 332 provides output of robot commands to utility-level processes 302 based upon the path that it has planned as well as audio output to audio node 313. For a detailed description of the semantic map and path planning techniques, reference can be had to U.S. patent application Ser. No. 16/197,329, entitled "Autonomous Platform Guidance Systems with Auxiliary Sensors and Task Planning", filed Nov. 20, 2018 and U.S. patent application Ser. No. 16/197,330, entitled "Autonomous Platform Guidance Systems with Auxiliary Sensors and Obstacle Avoidance", filed Nov. 20, 2018 which are incorporated herein in their entirety for all purposes.

Detection node 342 includes process components including executable instructions that implement receiving from sensor node 353 color image data, depth data and infrared image data, conducting obstacle detection and dock detection, and providing obstacle detection and dock detection information to Guidance node 332.

Sensor node 353 collects sensory information about the robot environment from sensors coupled to the sensor node 353 and provides the collected sensory data including for example and without limitation cliff and collision data, robot pose data, color image data and depth data.

Video node 333 provides video surveillance application that makes use of images captured by imaging sensors and received from sensor node 353. Audio node 313 provides audio playback application of sounds generated by path planning processes in guidance node 332. A cloud node 312 provides interface with and access to cloud-based applications such as fleet management and OTA. A node manager 322 provides node management and mode switching.

Continuing with FIG. 2B, utility-level processes 302 provide health monitoring, terrain detection, pose estimation, motion control, sensor data collection and synchronization, communications and motor control and others. For a detailed description of the pose estimation, sensor data collection and synchronization techniques, reference can be had to U.S. patent application Ser. No. 15/250,393, entitled "Visual-Inertial Positional Awareness for Autonomous and Non-Autonomous Tracking", filed Aug. 29, 2016 which is incorporated herein in its entirety for all purposes.

FIGS. 3A and 3B illustrate a plurality of configurations for modularized home robot implementations. Addition of modularized robot components enable the robot base 100 to be configured as a home care robot 400, a home entertainment companion 500, a home environment monitor 600 and a pet sitter 700. These configurations will next be described with reference to example implementations. Robot components include hardware such an electronic interface, sensors, and actuators, mechanical, hydraulic, electrical and others. Custom hardware can be included in some components. For example, humidifier hardware, image projection hardware, and the like. In some component implementations, a processor and memory storing executable instructions will be included within the module. In other components, processing is offloaded to host processors (e.g., "in the cloud") via cloud node 312 using wireless network connections. Robot components can be controlled using outputs of select deep neural networks such as the deep neural networks comprising Cognitive processor system 201.

FIGS. 4A, 4B, 4C, 4D, 4E, and 4F illustrate various views of a home care configuration for a modularized home robot implementation. A home care robot 400 depicted in FIG. 4A realized by addition of a robot home care component 401 to robot base 100 enables the modularized home care robot 400 to be a companion to older adults, home bound persons under disability and persons who otherwise are in need of round-the-clock care with a human touch. One robot system implementation includes a couple-able elderly care robot home care component 401 having an adjustable height handle 410, that when coupled to the base and controlled by the controller, an elderly user can hold while the robot system guides the elderly person. Further, some robot home care component 401 implementations will include a medication dispenser 406 and monitor 402 application for controlling dispensing medication to the elderly person and monitoring that the elderly person has taken their medication under control of one or more processors executing instructions based upon output of one or more deep neural networks discussed in further detail hereinbelow with reference to FIGS. 9A-24.

Figure 4B:
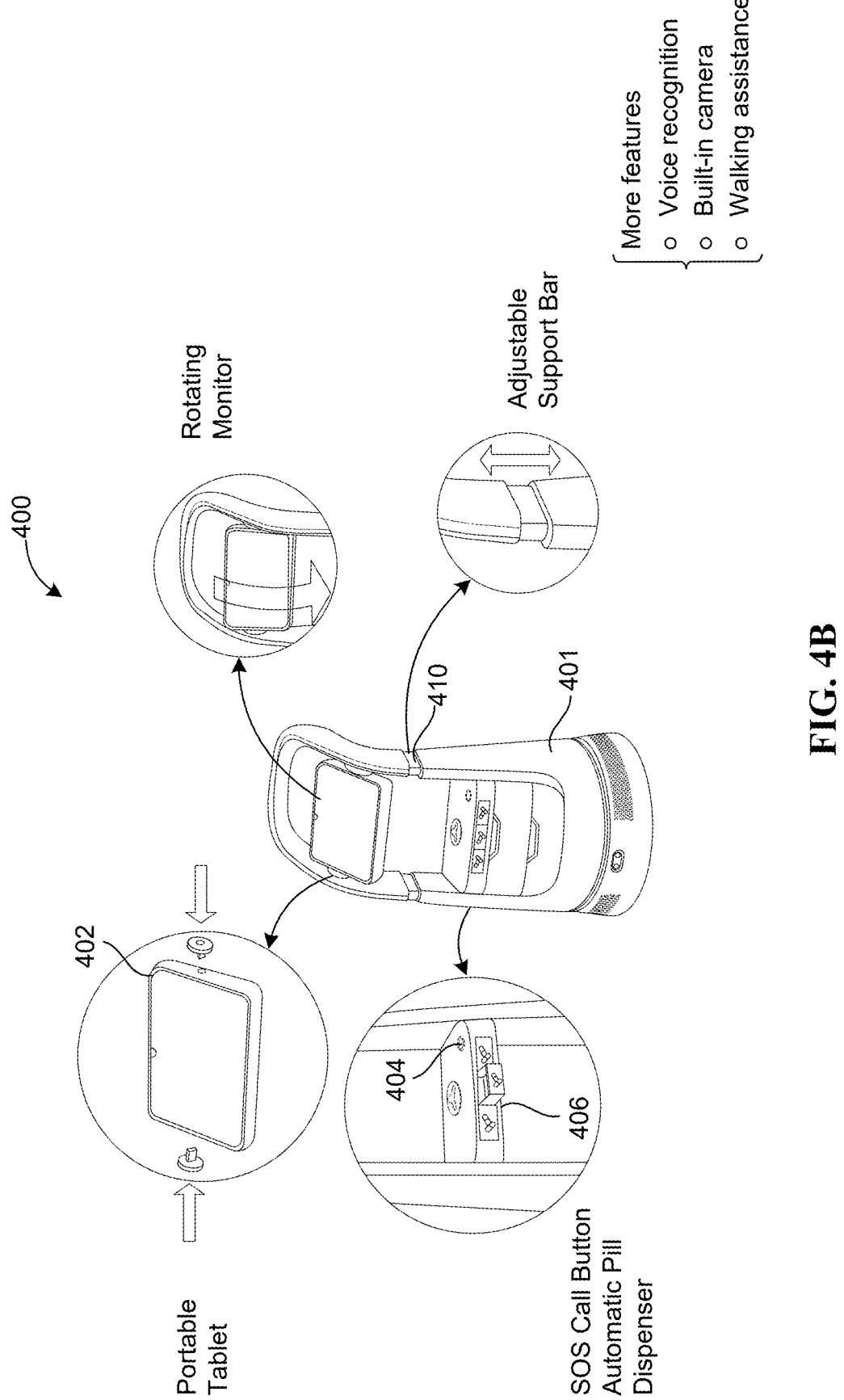

Now with reference to FIG. 4B, using connectivity to the internet and supplementing the interface provided by microphone and speaker unit 150 with further sensors such as a display screen 402 that may be a portable tablet interface, the robot home care component 401 is configured to provide connectivity with aging users or users in quarantine. Display screen 402 may rotate for ease of use. Further, robot home care component 401 can include an SOS emergency call button 404 enabling the cared for companion to call for help. A pill dispenser 406 can enable the robot home care component 401 to dispense medication and track whether its companion is taking the medication. A handle 410 includes an adjustable height mechanism, enabling the robot home care component 401 and robot base 100 configuration to guide the cared for human around, preventing falls and using the sensory capabilities of the home care robot 400 to detect obstacles out of view of the cared for human and to guide the cared for human around the obstacles, reducing the risk of falls. Deep neural network implementations such as described herein below with reference to FIGS. 9A-24 enable the home care robot 400 to provide voice recognition of commands and speakers. Coupled with a build in camera (s), the home care robot 400 can provide guidance.

Figure 4C:
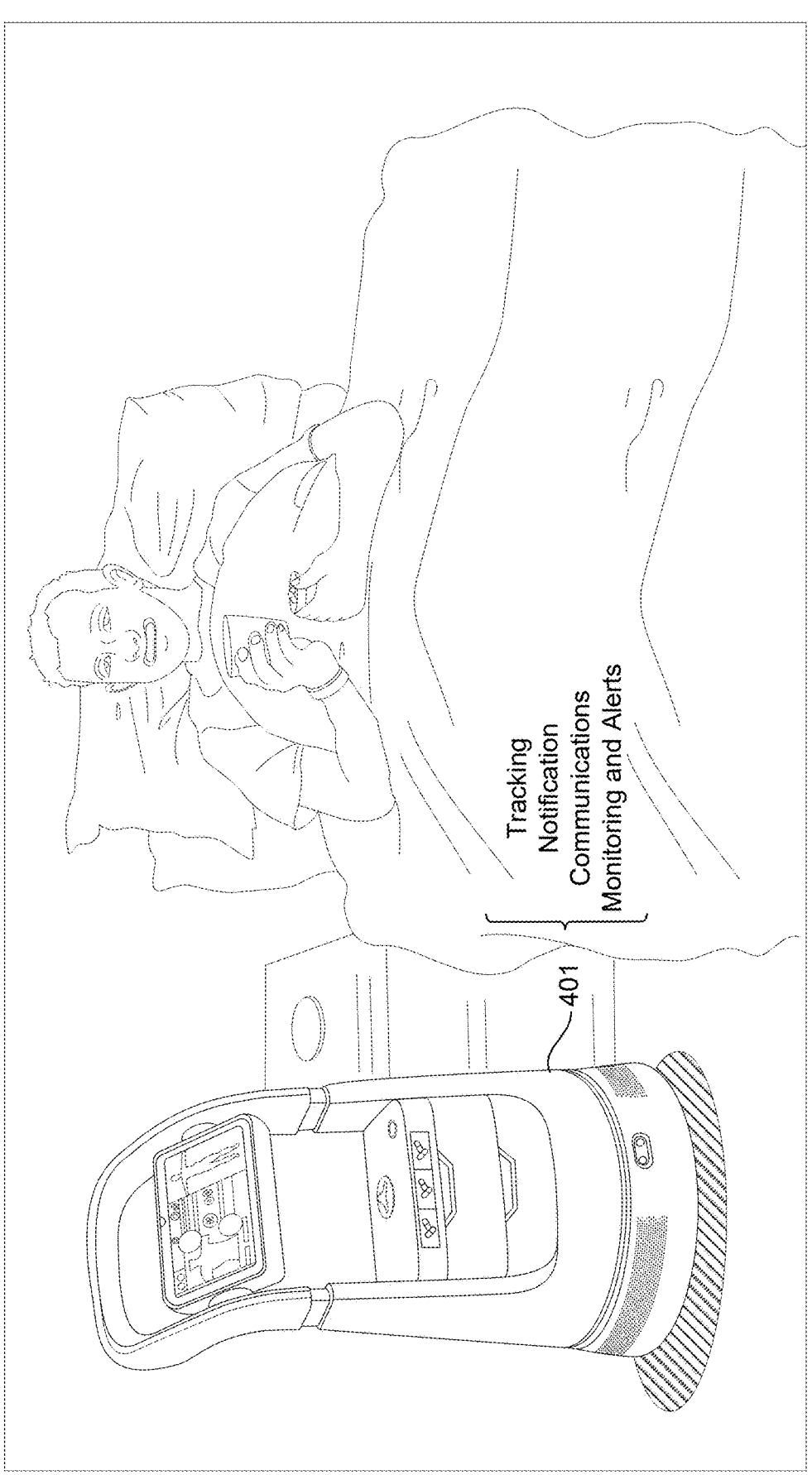
Figure 4D:
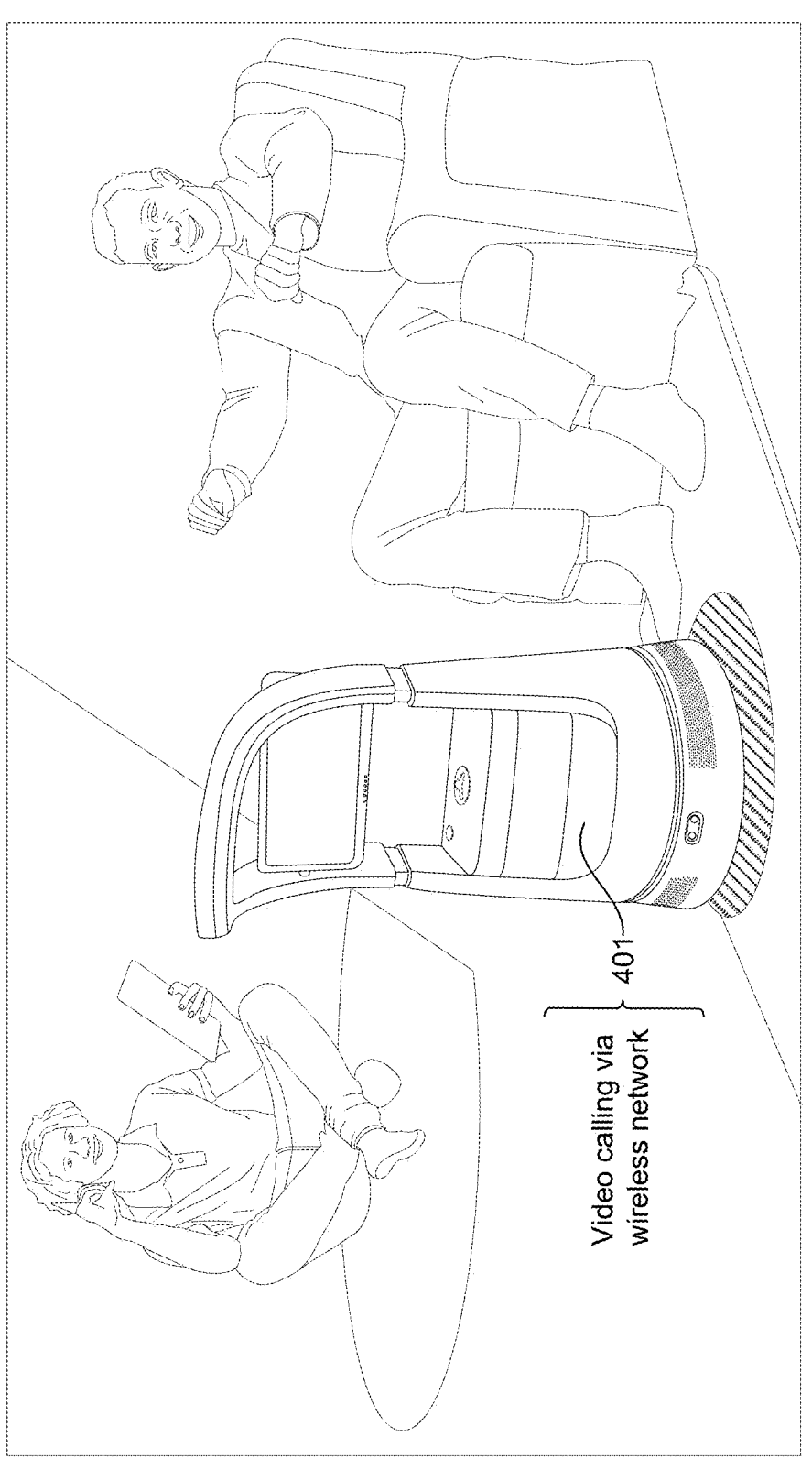
Figure 4E:
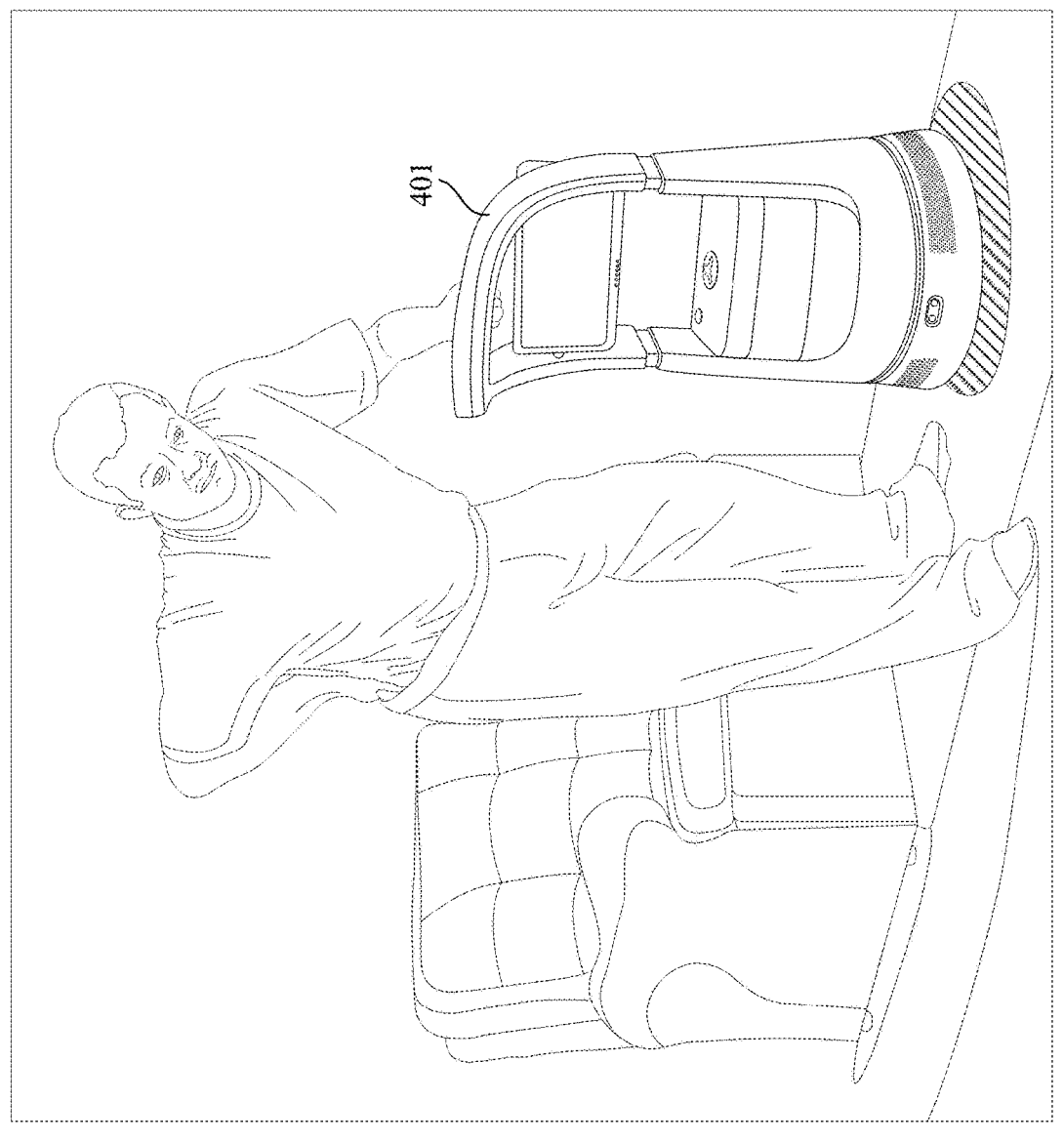
Figure 4F:
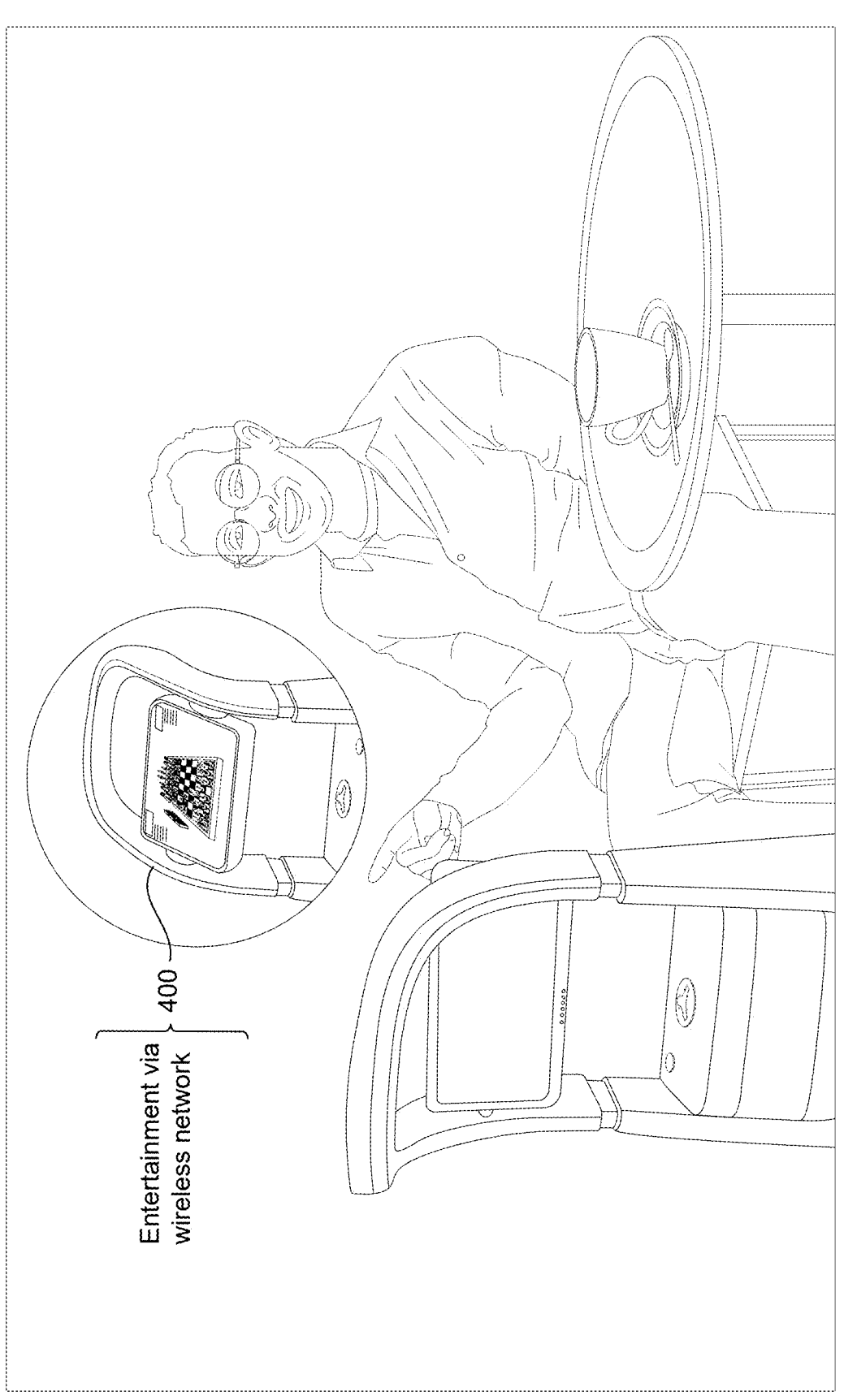

As shown in FIG. 4C, one implementation of the robot home care component 401 enables remote connections enabling the home care robot 400 to provide monitoring and access to aging family members, patients in quarantine or remote medical facilities by maintaining a personal health record, dispensing medicines at the right time, and notifying others such as medical care-givers, family members, and the like by sending out alerts. As shown in FIG. 4D, one implementation of the home care robot 400 enables older adults to stay socially active. By making and receiving video calls on the portable tablet, older adults, or the home bound can reach out to their close friends or share special occasions with family anytime, anywhere. As shown in FIG. 4E, one implementation of the home care robot 400 can assist individuals experiencing mobility issues, enabling these individuals to move around and enjoy some autonomy, reducing sedentary living. Home care robot 400 further can provide sensory guidance to individuals experiencing limited vision. As shown in FIG. 4F, one implementation of the home care robot 400 provides AI based learning and games, such as chess, puzzles, word games, Scrabble™ and so forth.

Figure 5A:
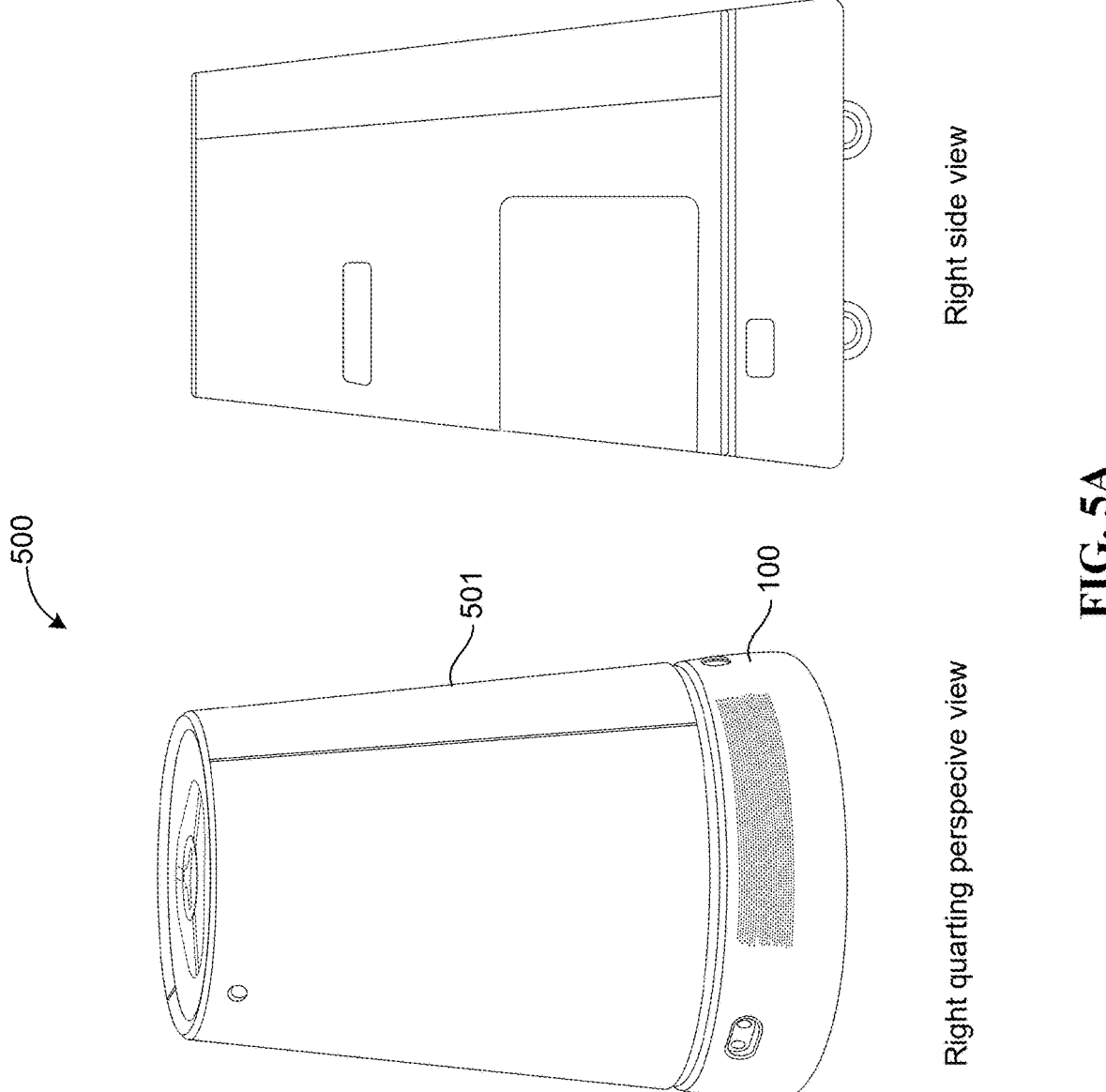
FIGS. 5A, 5B, 5C, and 5D illustrate various views of a home entertainment configuration for a modularized home robot implementation.
Figure 5B:
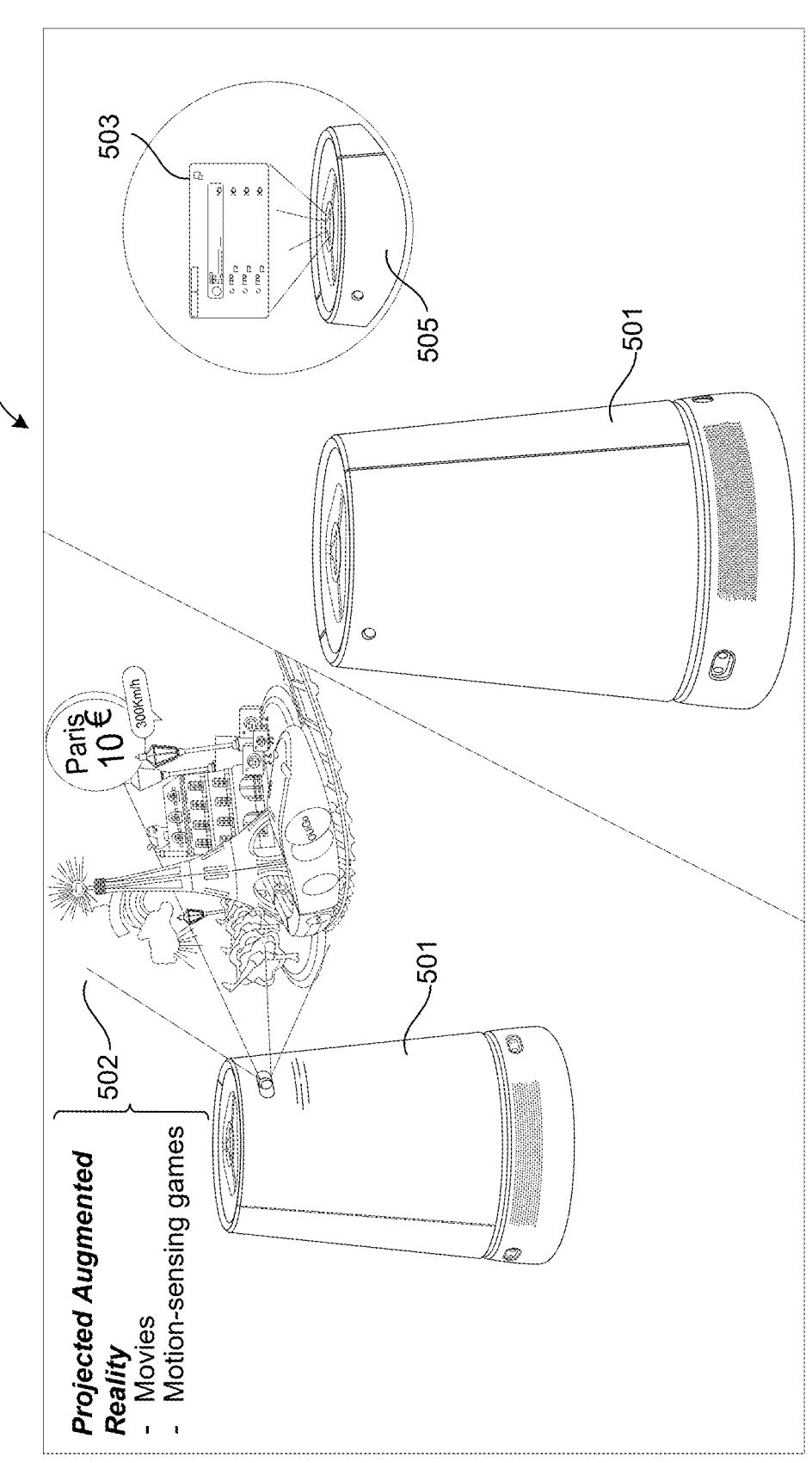
Figure 5C:
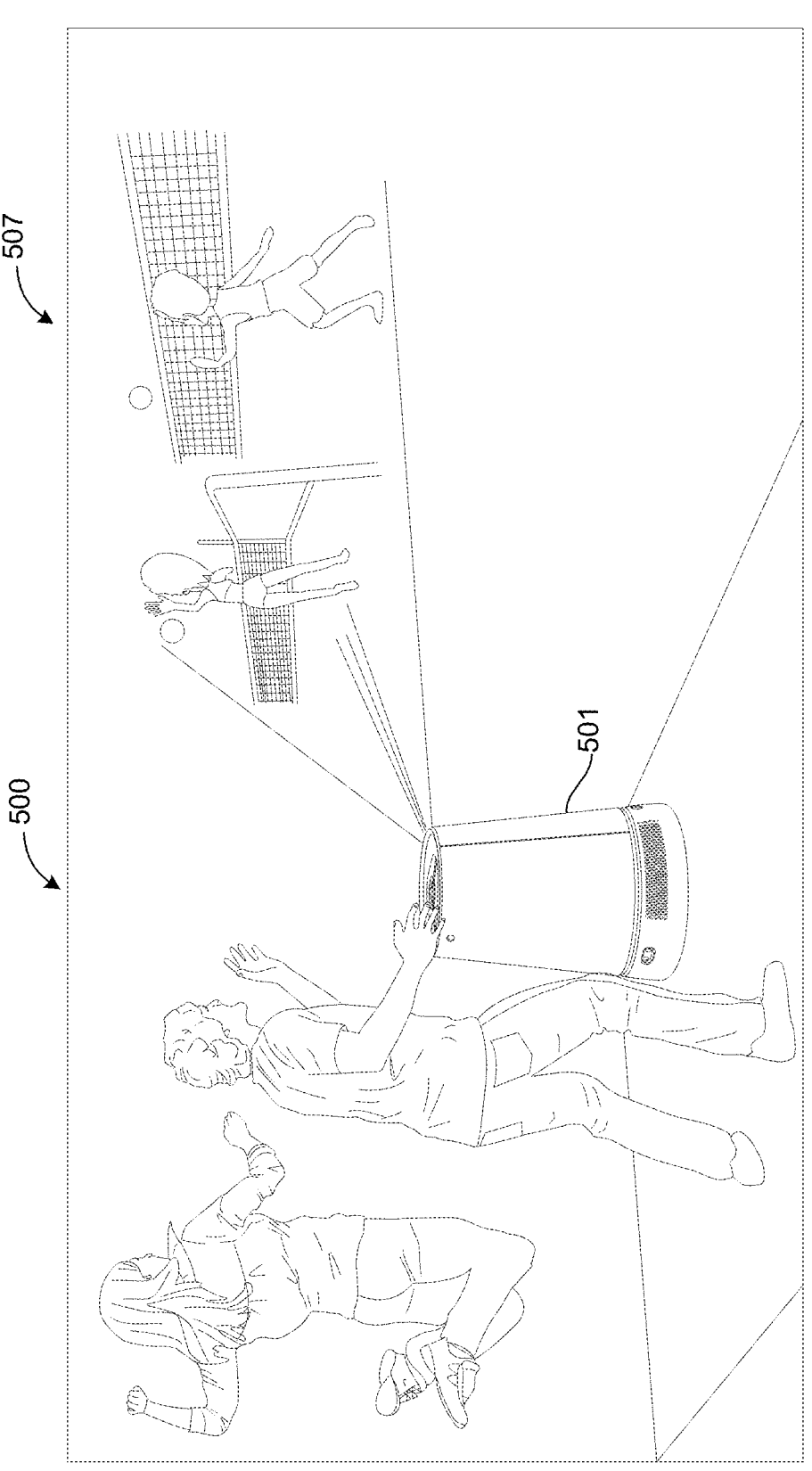
Figure 5D:
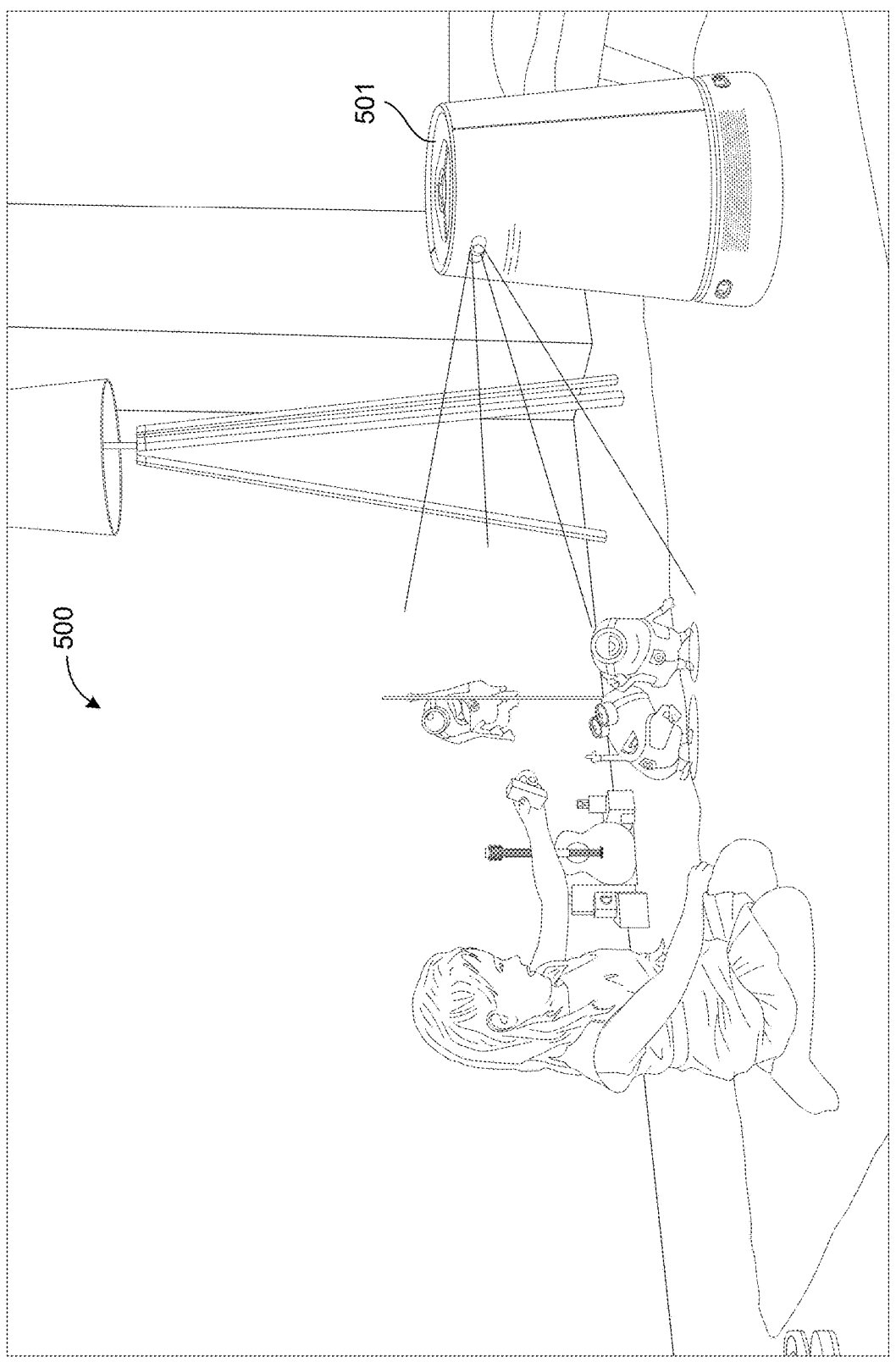

FIGS. 5A, 5B, 5C, and 5D illustrate various views of a home robot with entertainment configuration 500 for a modularized home robot implementation. A home entertainment configuration depicted in FIG. 5A realized by addition of a robot entertainment component 501 to robot base 100 enables the modularized home robot 500 to be a companion to children as well as adults by providing games, augmented reality presentations and programming in the comfort and convenience of one's own home. As shown in FIG. 5B, one implementation of the home entertainment robot 500 provides movies and/or motion sensing games using an interactive touch screen that can be projected for the viewer/user. In one implementation, the robot entertainment component 501 projects presentations 502 for the users onto a nearby wall or screen, thereby creating an augmented reality experience. In one implementation, projection capabilities of the robot entertainment component 501 provide an interactive touch screen or other virtualized input presentation 503. The robot entertainment component 501 can be equipped with hand tracking 505 technology such as provided by Ultraleap, Inc. of Bristol, UK, in order to detect inputs of the user's hand without requiring an actual touch surface. As shown in FIG. 5C, one implementation of the robot entertainment component 501 provides headset-free augmented reality (AR) gaming 507 using front and rear cameras to detect user interaction and superimpose images onto the wall, and/or on the gamers themselves, enabling gamers to see an augmented view without the need for special glasses or headsets and eliminating potentially troublesome voltages near to the user's face and head. As shown in FIG. 5D, one implementation of the home entertainment robot 500 turns children's rooms into a movie they can watch by projecting images in greater than 120 degrees of view from the robot 500; encouraging children to interact with the characters as they like. The entertainment configured robot 500 becomes a family-friendly augmented reality platform can provide fun edutainment activities for all ages.

FIGS. 6A, 6B, 6C, 6D, and 6E illustrate various views of a home environment/safety monitoring configuration 600 for a modularized home robot implementation. A home entertainment configuration 600 depicted in FIG. 6A realized by addition of a robot environmental component 601 to robot base 100 enables the modularized home robot to be a mobile promoter of a more comfortable living environment by monitoring air quality and purity parameters (e.g., humidity, temperature, pollution such as allergens, particulates, molds, spores and so forth) and taking actions to make the air more comfortable for human beings to breath.

Figure 6A:
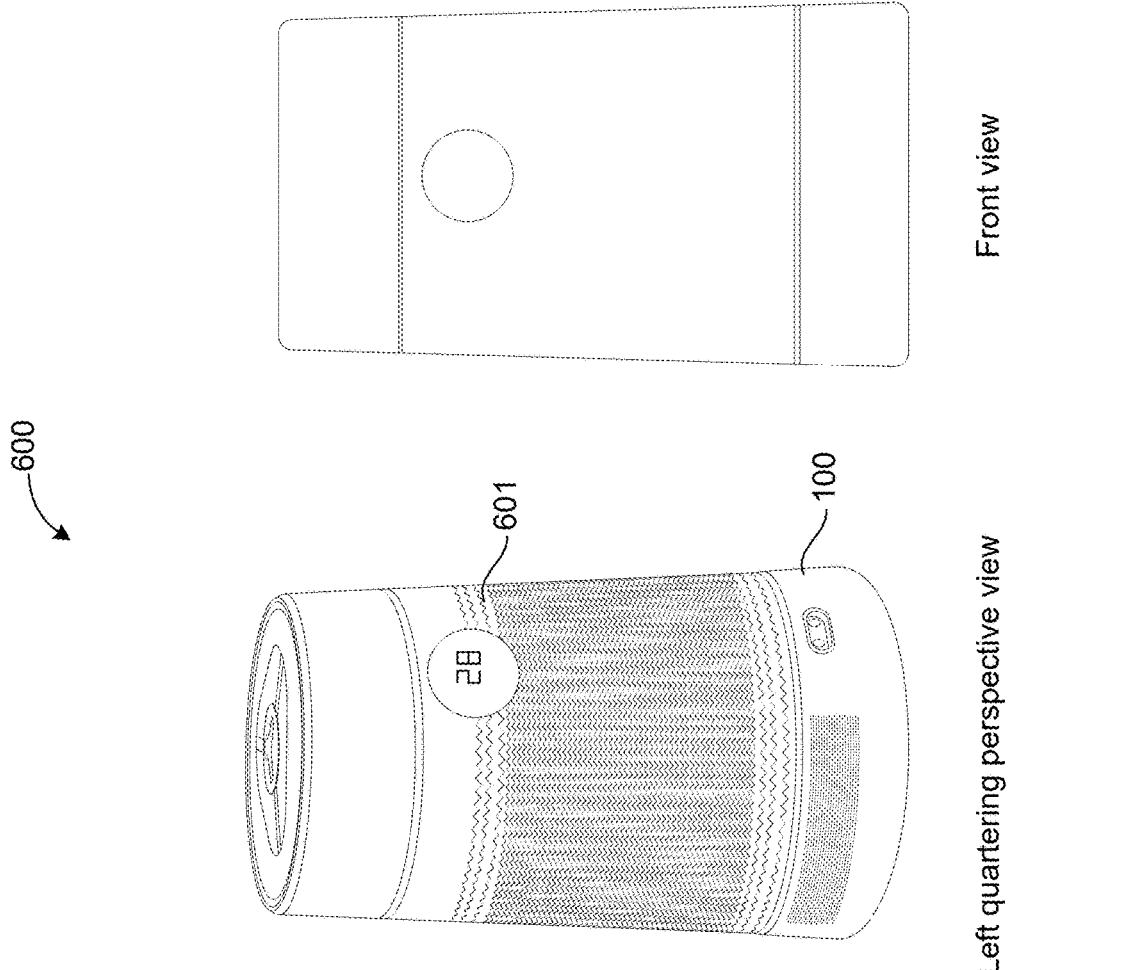
Figure 6B:
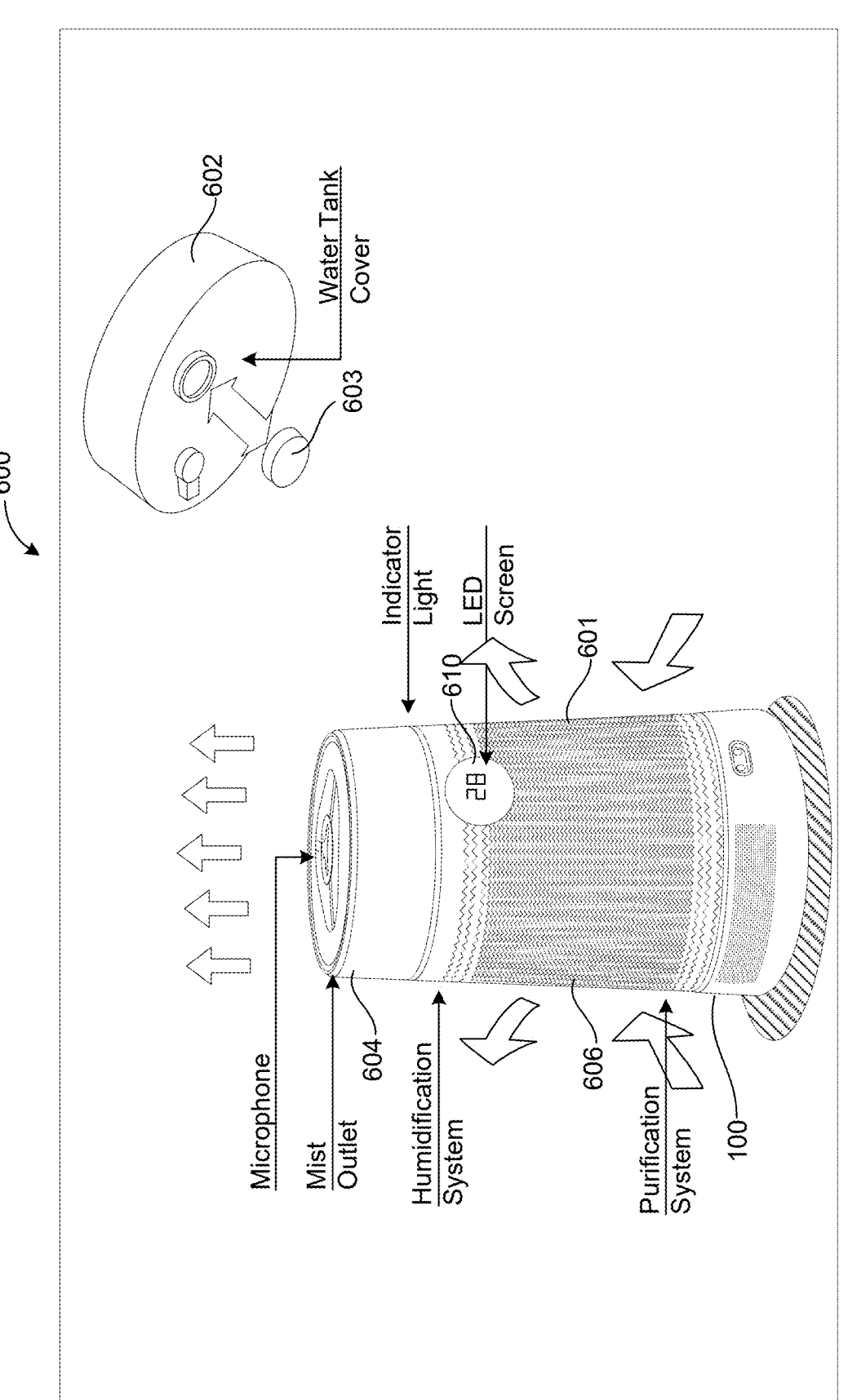
Figure 6C:
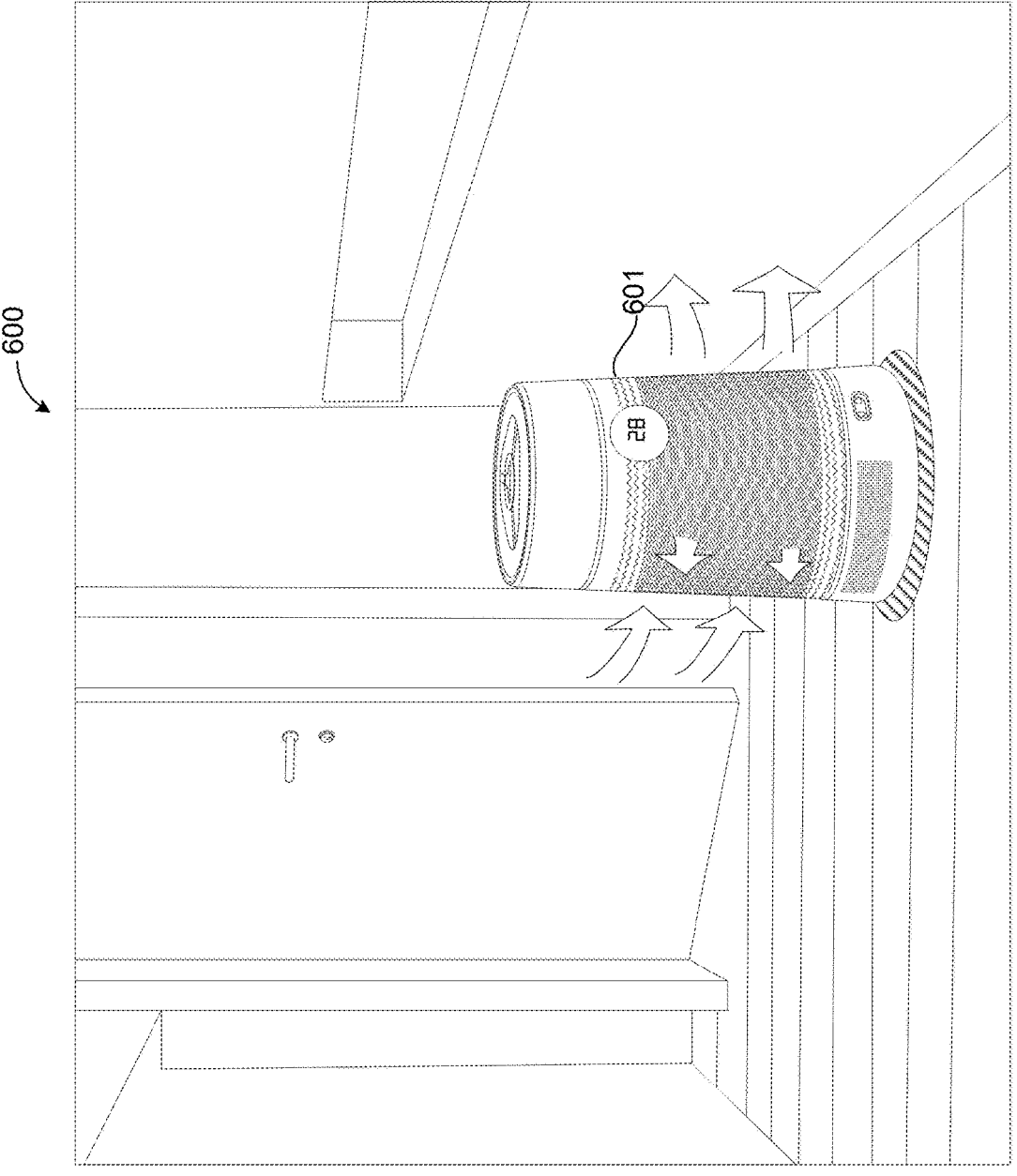
Figure 6D:
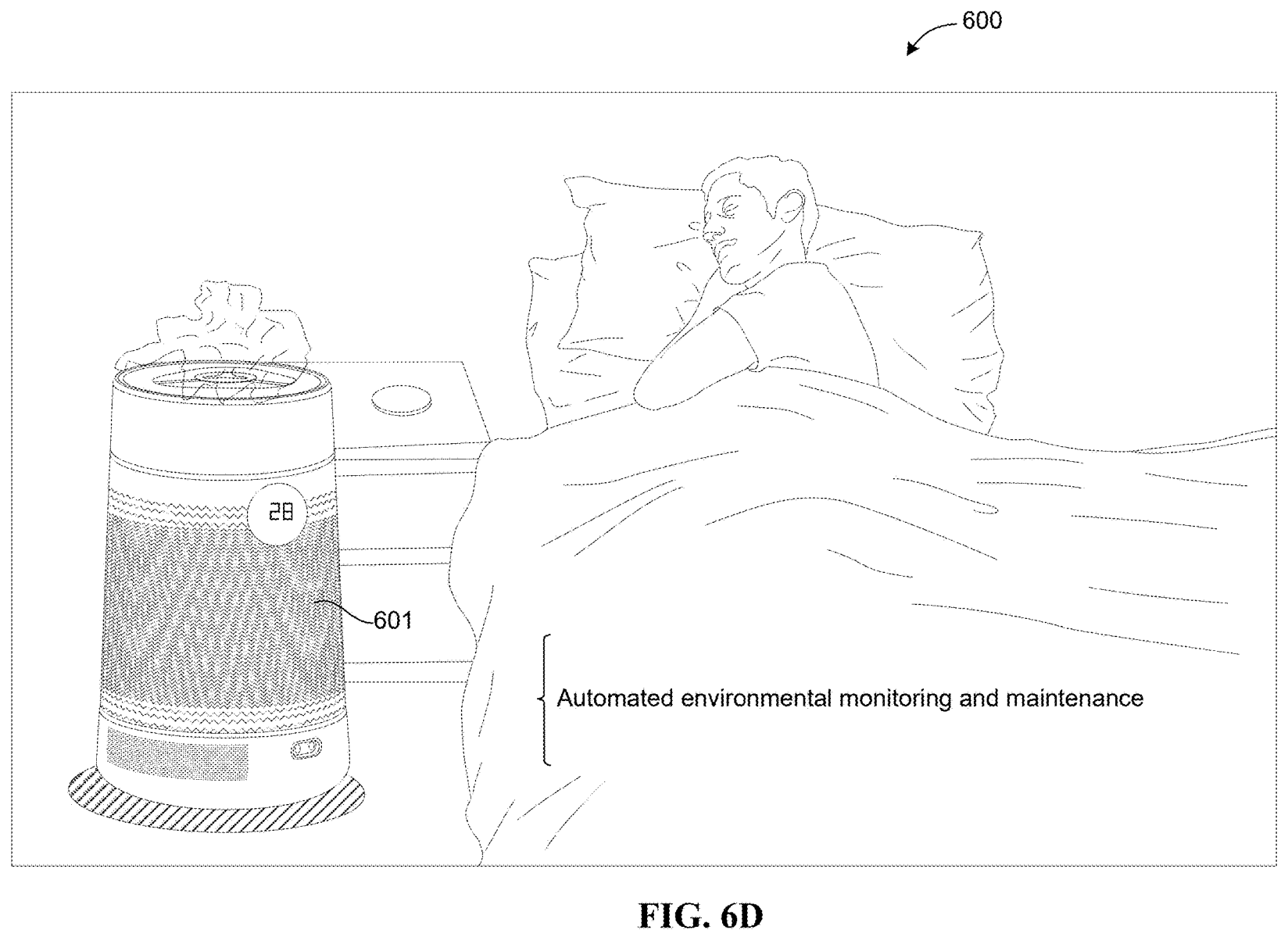
Figure 6E:
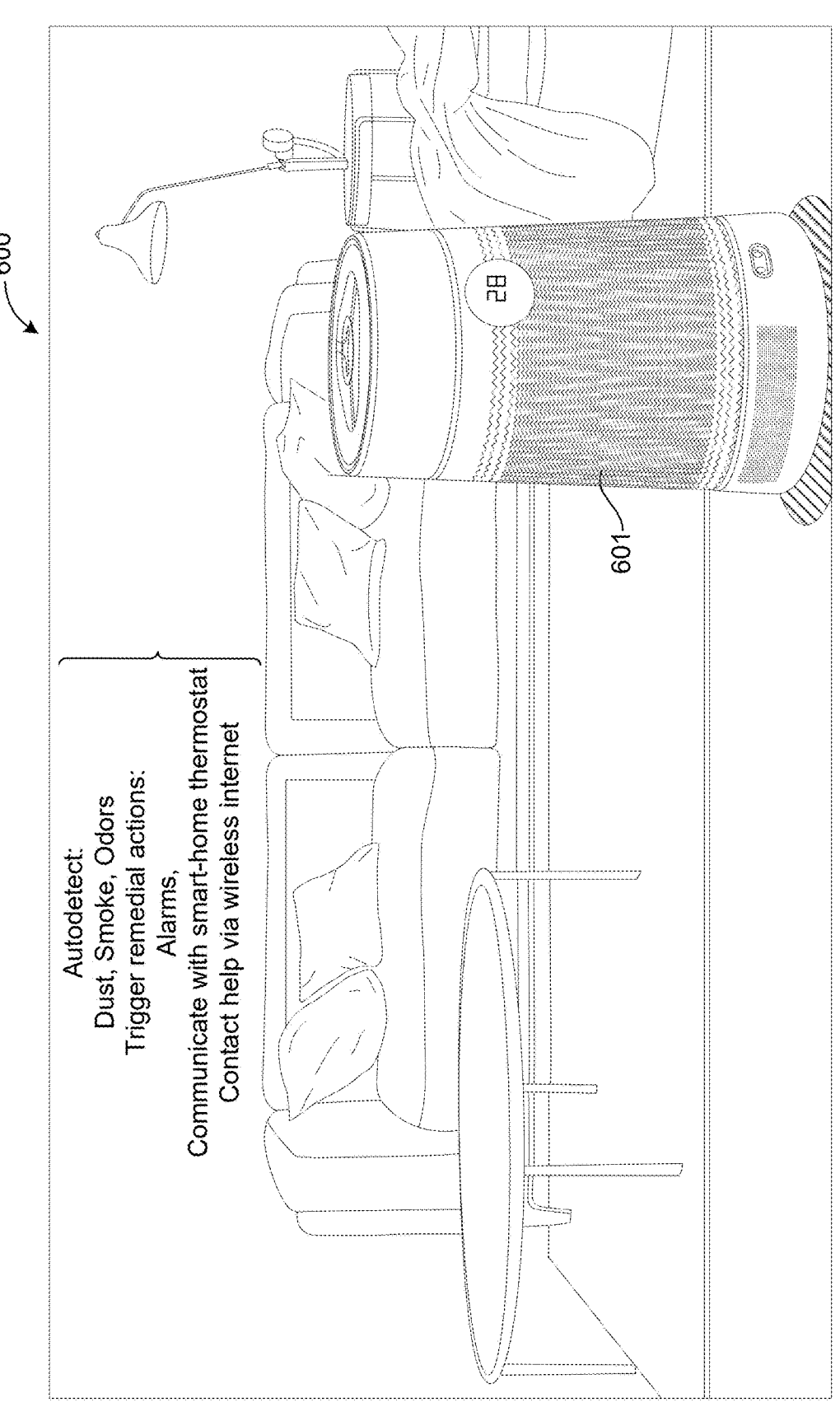

As shown in FIG. 6B, one implementation of the environment/safety monitoring robot 600 provides air quality monitoring and improvement. Robot environmental component 601 includes a water tank 602 and cover 603 to hold water that can be added to the air via a humidification system 604. A purification system 606 provides air filtration and is triggered when a pollution monitoring sensor (not shown in FIG. 6B for clarity sake) detects presence of dangerous pollution and/or levels of pollution that are outside of a settable/configurable limit. Limits can be thresholds, ranges, or combinations thereof. As shown in FIG. 6C, one implementation of the environment/safety monitoring robot 600 travels from room to room substantially contemporaneously with the robot environmental component 601 sensing air quality, activating its humidification system when humidity sensed is outside a settable level and activating the purification system when pollution sensed is outside a settable level. While not shown in FIG. 6C for clarity sake, de-humidification can also be implemented in robot environmental component 601 to remove excess humidity from the air and store the removed humidity in tank 602. As shown in FIG. 6D, one implementation of the environment/safety monitoring robot 600 comprises one or more hygrometers that enable the robot environmental component 601 to monitor humidity levels, and automatically release more vapor whenever the indoor humidity drops below a desired level. The desired level can be settable/configurable limit. Limits can be thresholds, ranges, or combinations thereof. The robot 600 can be configured to work during specific hours of the day, such as only at nighttime in order to provide environmental monitoring while users are asleep. As shown in FIG. 6E, one implementation of the environment/safety monitoring robot 600 safeguards human occupants by auto-detecting dust, smoke, and odors or potentially dangerous pollution levels and can trigger alarms or take remedial actions (e.g., contacting help via the Internet or wireless telephone, communicating with automated thermostats or other smart appliances to activate to remedy the condition sensed, and various combinations thereof).

Figure 7A:
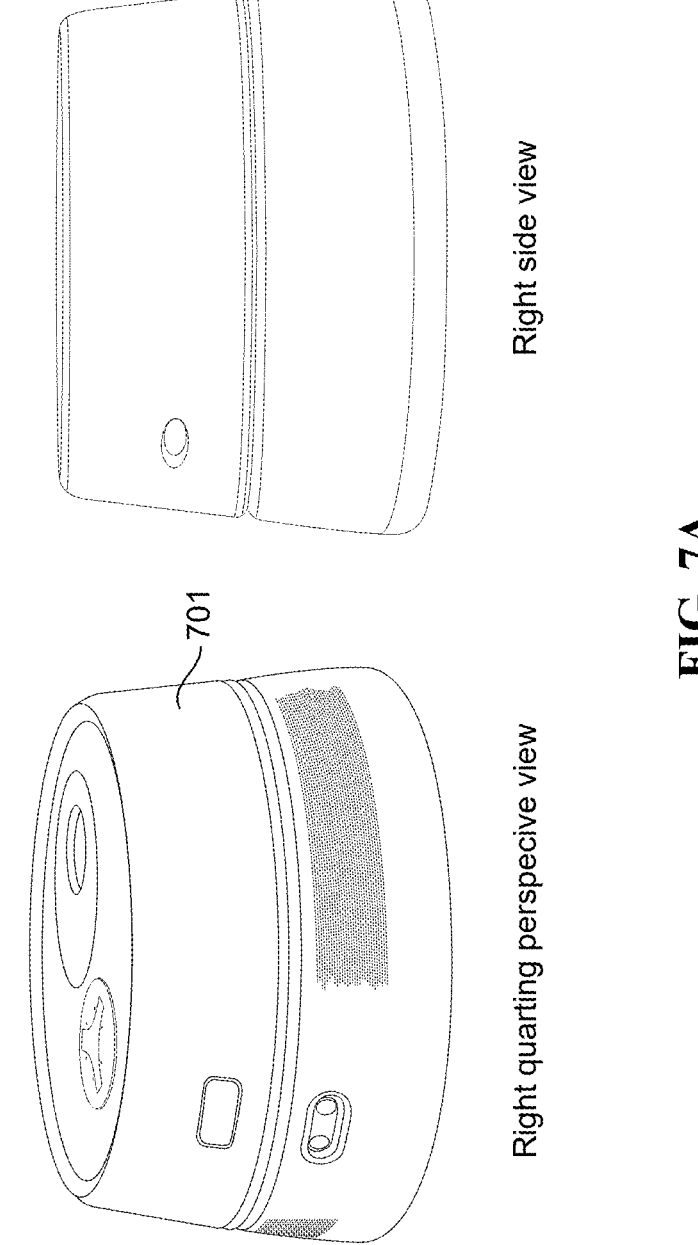
FIGS. 7A, 7B, 7C, and 7D illustrate various views of a pet sitter configuration for a modularized home robot implementation.

FIGS. 7A, 7B, 7C, and 7D illustrate various views of a pet sitter configuration 700 for a modularized home robot implementation. As shown in FIG. 7A, one implementation of the pet sitter robot component 701 provides care, and 24 hour pet care and a pet-cam to watch, enabling the robot 700 to look after your pet even when the user is unavailable or absent.

Figure 7B:
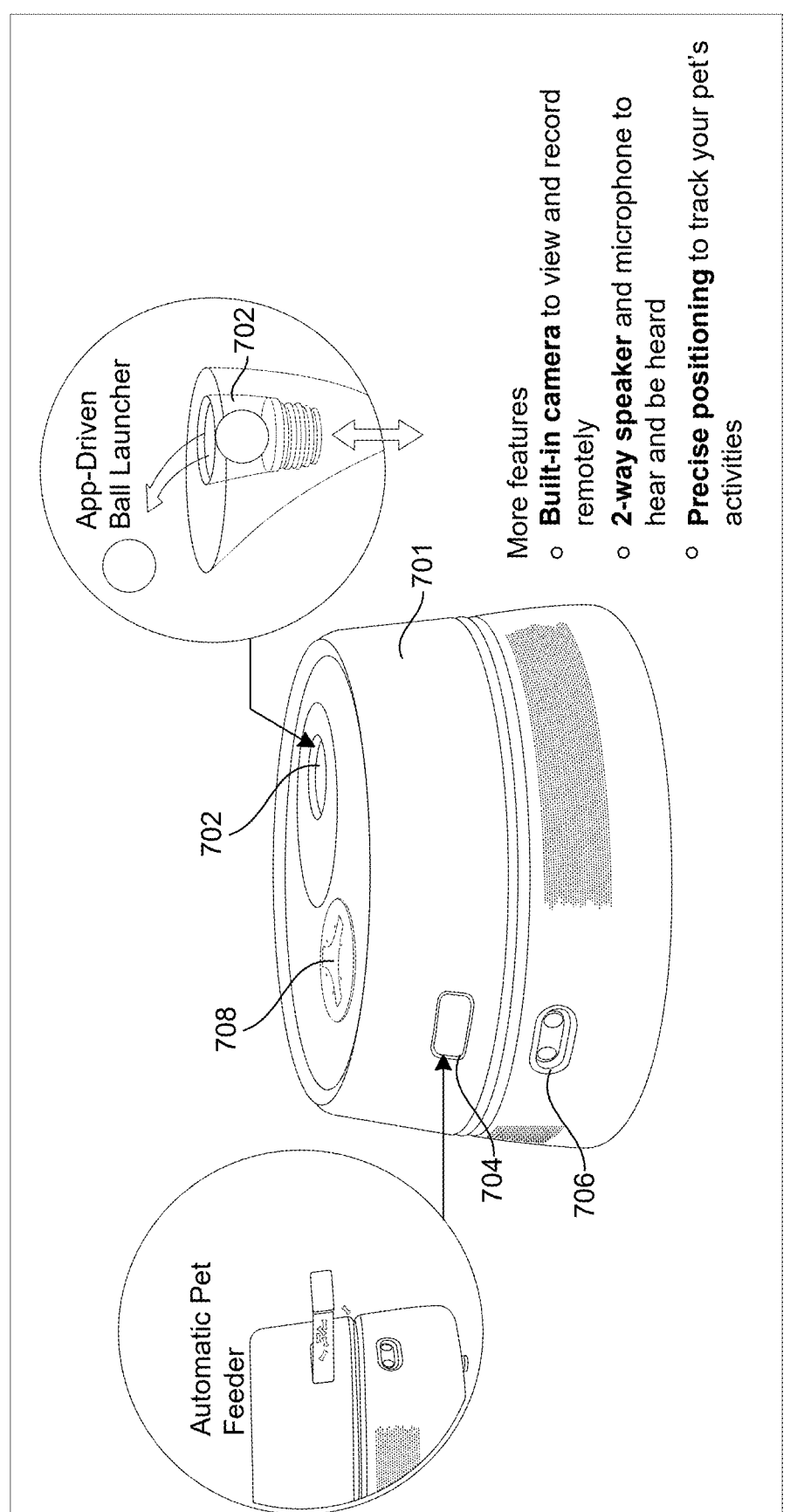
Figure 7C:
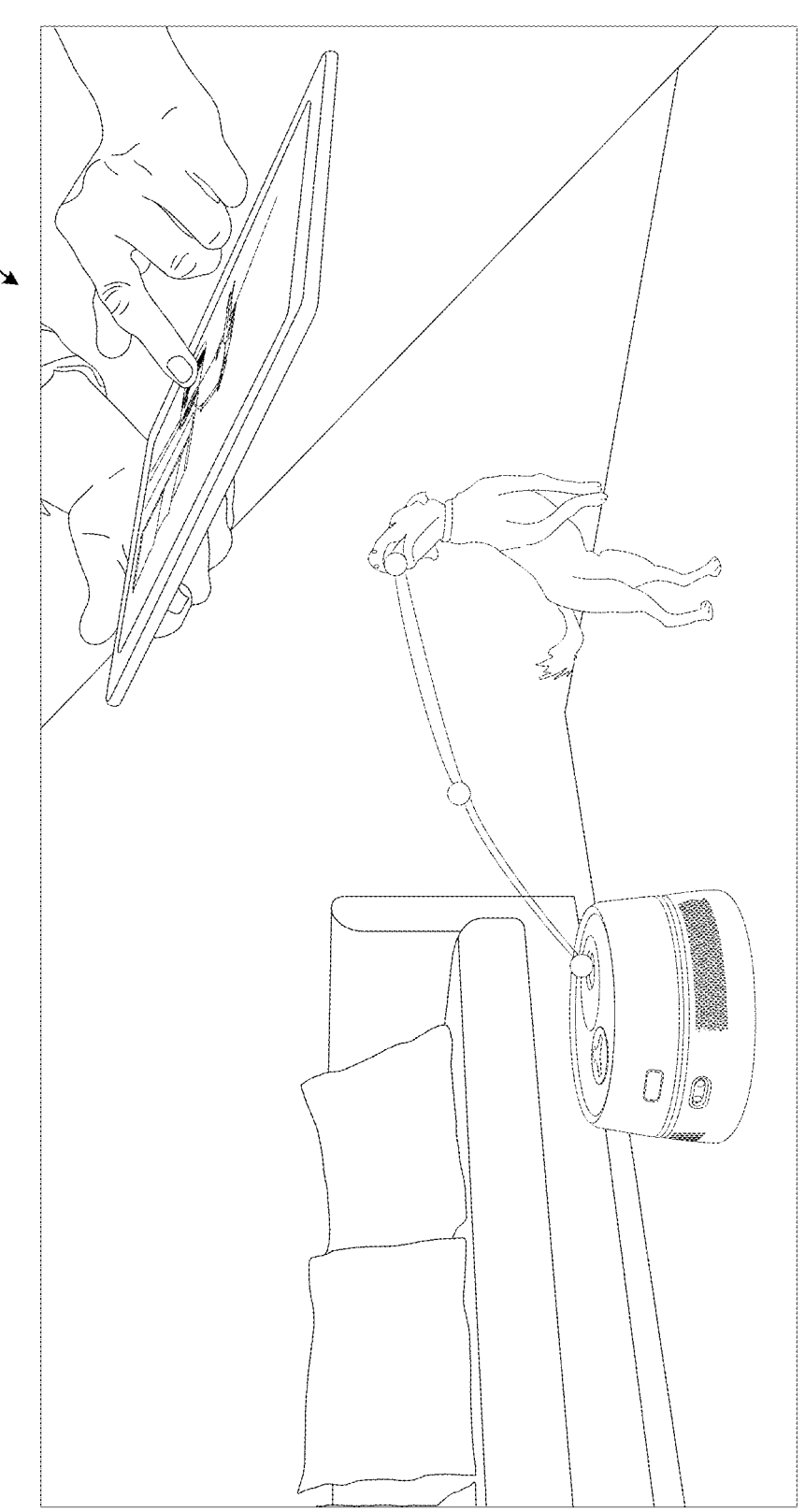
Figure 7D:
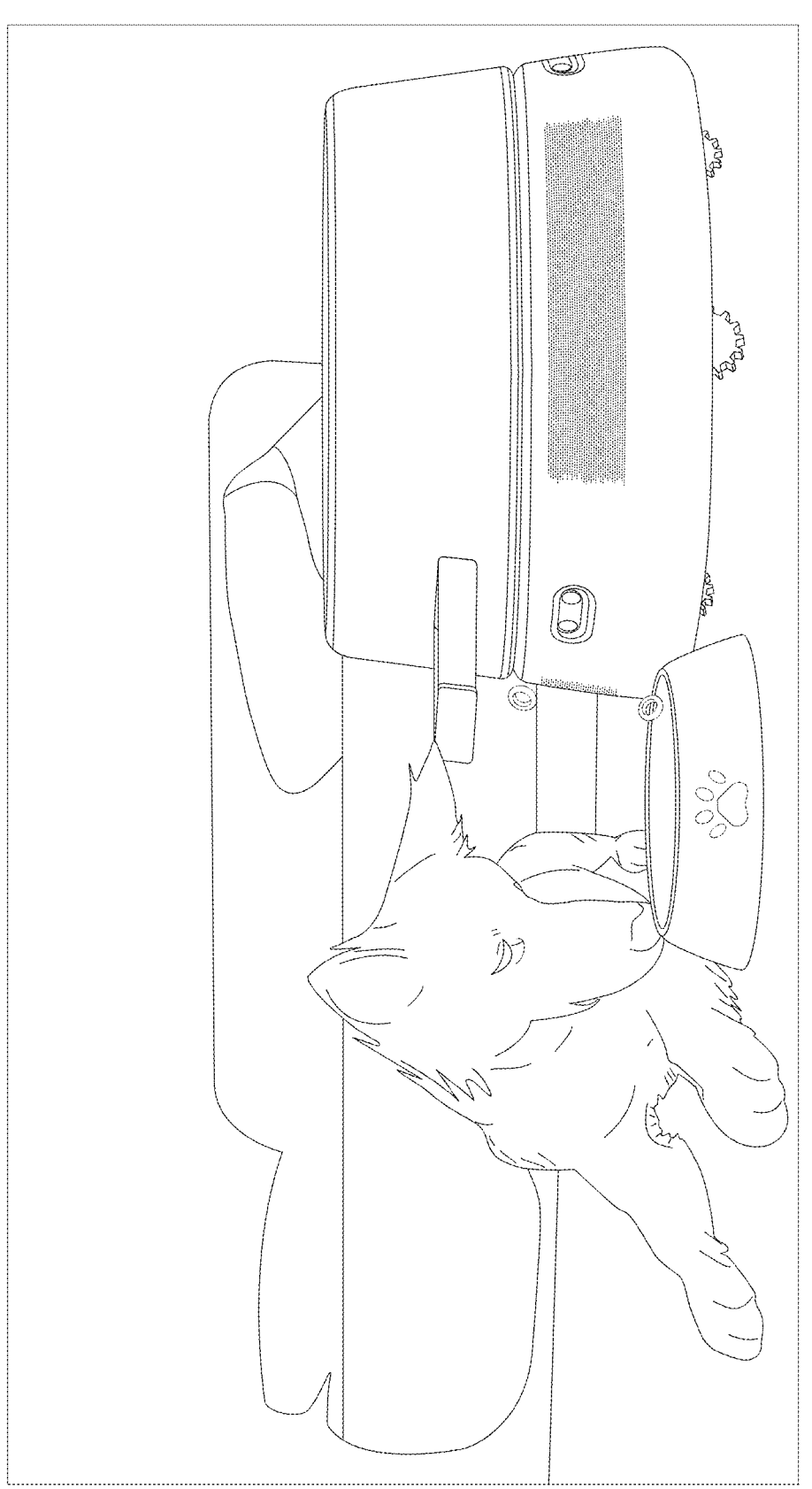

As shown in FIG. 7B, one implementation of the pet sitter robot component 701 provides a toy launcher 702 that launches a ball to entertain a pet under application control. Further, a pet food dispenser 704 provides automatic feeding of the pet. A built-in camera 706 provides capability to view and record remotely. A 2-way speaker and microphone 708 provide capability to hear and be heard. Precise positioning using the robot's own guidance systems and sensors provides capability to track your pet's activities. As shown in FIG. 7C, one implementation of the pet sitter robot component 701 provides a remote interface enabling a user to access functionality using a portable device such as a tablet for example, to play fetch with the pet using the app-controlled ball launcher 702 from a tablet or phone. Recording capability allow the user to record the play. Internet access enables the user to share recordings with others. As shown in FIG. 7D, one implementation of the pet sitter robot component 701 provides capability to set scheduled feedings or toss treats when to pets using a remote connected application. Pets can be cared for and played with even when the owner is unexpectedly stuck in traffic or at the office.

FIG. 8A is a flowchart 800A depicting a representative process for automated configuring of a modular robot implementation. Flowchart 800A can be implemented at least partially with a computer, application specific integrated circuit (ASIC), programmable controller or other data processing system; that is, by one or more processors configured to receive or retrieve information, process the information, store results, and transmit the results. FIG. 8A begins with action 801, in which the sensing the one or more modularized components coupled via the coupling connector (block 801). Action 802 includes selecting an appropriate neural network classifier from a plurality of neural network classifiers to implement control of the one or more modularized components sensed (block 802). Action 803 includes initiating robot behaviors triggered by outputs of the selected neural network classifier as provided by the selected neural network classifier based upon inputs of one or more sensors appropriate to the one or more modularized components sensed (block 803).

FIG. 8B is a flowchart 800B depicting a representative process for automated configuring of a modular robot implementation. Flowchart 800B can be implemented at least partially with a computer, ASIC, programmable controller or other data processing system; that is, by one or more processors configured to receive or retrieve information, process the information, store results, and transmit the results. FIG. 8B begins with action 811, in which sensing the one or more modularized components coupled via the coupling connector (block 811). Action 812 includes selecting an appropriate software driver component from a plurality of software driver components to implement control of the one or more modularized components sensed (block 812). Action 813 includes initiating robot behaviors triggered by outputs of the selected software driver component as provided by the selected software driver component based upon inputs of one or more sensors appropriate to the one or more modularized components sensed (block 813).

FIG. 8C is a flowchart 800C depicting representative processes for training a classifier in a supervised or semi-supervised machine learning robot implementation. Flowchart 800C can be implemented at least partially with a computer, ASIC, programmable controller or other data processing system; that is, by one or more processors configured to receive or retrieve information, process the information, store results, and transmit the results. FIG. 8C begins with action 821, in which at a time t0, a training data set is generated comprising 50,000 to 1 billion home healthcare events. Each home healthcare event labelled with sensed home environment information, and corresponding ground truth responsive remedial actions (block 821). Action 822 includes subdividing the sensed home environment information into one or more overlapping categories (block 822). Action 823 includes training a first set of classifier neural networks with the categories and identifiers identifying the home healthcare events (block 823). Action 824 includes training a first set of response classifier neural networks with the sensed information, home healthcare events information, identifiers information, home healthcare events category information, and corresponding ground truth responsive remedial actions (block 824). Action 825 includes saving parameters from training recurrent neural networks comprising the first set of classifier neural networks and the first set of response classifier neural networks in tangible machine readable memory for use in reporting or responding to home healthcare events by a home healthcare robot (block 825).

Other implementations may perform the actions in different orders and/or with different, fewer or additional actions than those illustrated in FIGS. 8A, 8B and 8C. The actions of FIGS. 8A, 8B and 8C can be performed by different processors from one another and may be implemented across multiple platforms in some configurations. Multiple actions can be combined in some implementations. For convenience, this flowchart is described with reference to a system which includes one or more security servers that implement an authentication platform controlling users' devices to gather authentication information as well as evidence of fraudulent activity, and safely store this gathered data for review by authorized partner users. For convenience, this flowchart is described with reference to the system that carries out a method. The system is not necessarily part of the method.

Computer System

FIG. 9A illustrates one implementation of a computer system 900A that can be used to implement the technology disclosed. Computer system 900A includes at least one central processing unit (CPU) 972 that communicates with a number of peripheral devices via bus subsystem 955. These peripheral devices can include a storage subsystem 910 including, for example, memory devices and a file storage subsystem 936, user interface input devices 938, user interface output devices 976, and a network interface subsystem 974. The input and output devices allow user interaction with computer system 900. Network interface subsystem 974 provides an interface to outside networks, including an interface to corresponding interface devices in other computer systems. The analyzer and deep learning system can be communicably linked to the storage subsystem 910 and the user interface input devices 938.

User interface input devices 938 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 900A.

User interface output devices 976 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 900A to the user or to another machine or computer system.

Storage subsystem 910 stores programming and data constructs that provide the functionality of some or all of the modules and methods described herein. These software modules are generally executed by deep learning processors 978.

Deep learning processors 978 can be graphics processing units (GPUs) or field-programmable gate arrays (FPGAs). Deep learning processors 978 can be hosted by a deep learning cloud platform such as Google Cloud Platform™, Xilinx™, and Cirrascale™. Examples of deep learning processors 978 include Google's Tensor Processing Unit (TPU)™, rackmount solutions like GX4 Rackmount Series™, GX2 Rackmount Series™, NVIDIA DGX-1™, Microsoft' Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, and others.

Memory subsystem 922 used in the storage subsystem 910 can include a number of memories including a main random access memory (RAM) 932 for storage of instructions and data during program execution and a read only memory (ROM) 934 in which fixed instructions are stored. A file storage subsystem 936 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 936 in the storage subsystem 910, or in other machines accessible by the processor.

Bus subsystem 955 provides a mechanism for letting the various components and subsystems of computer system 900A communicate with each other as intended. Although bus subsystem 955 is shown schematically as a single bus, alternative implementations of the bus subsystem can use multiple busses.

Computer system 900A itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 900A depicted in FIG. 9A is intended only as a specific example for purposes of illustrating the preferred embodiments of the present invention. Many other configurations of computer system 900A are possible having more or less components than the computer system depicted in FIG. 9A.

Deep Neural Networks

Classifier Inputs and Outputs

An exemplary deep neural network implementation selects an appropriate classification from a set of environmental conditions using a set of inputs to the neural network based classifier(s). Inputs whether structured or unstructured data type data points, can be encoded into fields of a vector (or tensor) representation. Implementations will employ various levels of abstraction in configuring, classification and anomaly detection tasks, e.g., in an elder home care application, data can be selected to describe detected condition of the cared for person, potentially medically significant changes to the cared for person, emergency as well as non-emergency changes to the environment and so forth.

In one example, a neural network ensemble can implement a set of classifiers that are trained to classify situation states according to input data gathered from robot's sensors and to trigger learned behaviors based upon the situation state classification. An appropriate selection of trained classifier(s) can be selected automatically based upon detected component mated to the robot base 100. Robots equipped with appropriately trained classifiers can find use in applications such as elderly home care, home entertainment, home environment maintenance, and pet entertainment applications, without limitation that the trained classifier(s) are suited. In one implementation, trained classifier(s) are disposed remotely, in a server or set of servers accessible by the robot via wireless or other network(s).

For example, an elderly home robot can include classifier(s) once trained on a training dataset to determine a Classification of Condition (Obstacle encountered, Obstacle with stall condition encountered, Medication not taken, Status change notification, Status alert (fall) notification, External danger) for a particular situation state. The exemplary deep neural network implementation as trained selects an appropriate classification based upon sensory input from the robot's sensors among other inputs and triggers appropriate learned behaviors.

| Determined Condition(s) | Sensory Input (Sub-) Classifications | Remedial Actions/ Behavior(s) Triggered |
|---|---|---|
| Obstacle encountered | Sensory input from camera(s), contact sensors indicates an obstacle is encountered. | Guide cared person around obstacle. |
| Obstacle with stall condition encountered | Sensory input from motor current sensors, contact sensors indicate an obstacle is blocking the robot from continuing. | Capture images, transmit images to recipient over wireless network and/or accept human guidance from cared person or person with oversight remotely. |
| Medication not taken | Detect presence of medication left in pill drawer using sensor and/or captured images of patient when medication was administered. | Report cared for person not in compliance with scheduled medication via wireless network to person with remote oversight. |
| Status change notification | Camera(s) and microphone(s) detect change in amount or type of activity of cared for person. | Notify person with remote oversight such as medical care-givers, family members, and the like by sending out reports. |
| Status alert notification | Camera(s) and microphone(s) detect apparent fall of cared for person. | Notify person with remote oversight such as medical care-givers, family members, and the like by sending out alerts. |
| External danger | Smoke detection sensor, CO detection sensor detect dangerous condition/ potential fire. | Notify emergency response persons such as fire department, police, ambulance and the like by sending out alerts. |

In another configuration, a home entertainment robot can include classifier(s) that once trained on a training dataset to determine a Classification of Condition (Children request play, Children appear bored, Status change notification, Status alert (fall) notification, External danger) for a particular situation state.

| Determined Condition(s) | Sensory Input (Sub-) Classifications | Remedial Actions/ Behavior(s) Triggered |
|---|---|---|
| Children request play | Receive command from child. | Provide game or movie appropriate to the selection and child |
| Children appear bored or misbehaving | Camera(s) and microphone(s) detect change in amount or type of activity of children. | Trigger response offering child options to play game or watch movie. |
| Status change notification | Camera(s) and microphone(s) detect change in amount or type of activity of children indicating woke up from nap, ready for nap, etc . . . | Notify person with remote oversight such as medical care-givers, family members, and the like by sending out reports. |
| Status alert notification | Camera(s) and microphone(s) detect apparent fall or accident during play. | Notify person with remote oversight such as medical care-givers, family members, and the like by sending out alerts. |
| External danger | Smoke detection sensor, CO detection sensor detect | Notify emergency response persons such as fire |

18

-continued

| Determined Condition(s) | Sensory Input (Sub-) Classifications | Remedial Actions/ Behavior(s) Triggered |
|---|---|---|
| | dangerous condition/ potential fire. | department, police, ambulance and the like by sending out alerts. |

In a further configuration, a home environment robot can include classifier(s) that once trained on a training dataset to determine a Classification of Condition (Cared for person requests environmental change, Cared for person appears uncomfortable, Status change notification, Status alert (window left open, etc.) notification, External danger) for a particular situation state.

| Determined Condition(s) | Sensory Input (Sub-) Classifications | Remedial Actions/ Behavior(s) Triggered |
|---|---|---|
| Cared for person requests environmental change | Receive command. | Message intelligent thermostat and/or other smart home controllers |
| Cared for person appears uncomfortable | Camera(s) and microphone(s) detect change in amount or type of activity or condition of cared for person. | Trigger response offering to alter the environment (e.g., turn on/off heat, etc.), gather input from cared for person and message intelligent thermostat and/or other smart home controllers. |
| Status change notification | Humidity and temperature sensors detect change in environmental conditions indicating low/high temperature, low/high humidity, low/high particulates in atmosphere, etc . . . | Gather further information and attempt to remedy (e.g., run on-board or other (de-) humidifier), air purifier, , message intelligent thermostat and/or other smart home controllers), otherwise notify family member(s) with gentle (non-emergency) message, and the like. |
| Status alert notification | Humidity and temperature sensors detect rapid or large change (e.g., exceeding a threshold in amount or rate or time) in environmental conditions indicating power to heater is off, window is open, fireplace has gone out, etc . . . | Gather further information and attempt to remedy (e.g., close window, message intelligent thermostat and/or other smart home controllers), otherwise notify family member(s) with gentle (non-emergency) message, and the like. |
| External danger | Smoke detection sensor, CO detection sensor detect dangerous condition/potential fire. | Notify emergency response persons such as fire department, police, ambulance and the like by sending out alerts. |

In a yet further configuration, a pet care entertainment robot can include classifier(s) that once trained on a training dataset to determine a Classification of Condition (Pet request play, Pet appears bored, Status change notification, Status alert (fall) notification, External danger) for a particular situation state.

| Determined Condition(s) | Sensory Input (Sub-) Classifications | Remedial Actions/ Behavior(s) Triggered |
|---|---|---|
| Pet requests play | Receive command from remote user to initiate play with pet. | Provide game for pet and capture images of pet playing for transmission to remote user. |

-continued

| Determined Condition(s) | Sensory Input (Sub-) Classifications | Remedial Actions/ Behavior(s) Triggered |
|---|---|---|
| Pet appears bored/ misbehaving | Camera(s) and microphone(s) detect change in amount or type of activity of pet. | Trigger response offering pet options to play. |
| Status change notification | Camera(s) and microphone(s) detect change in amount or type of activity of pet indicating woke up from nap, ready for nap, etc . . . | Notify person with remote oversight such as owner, family members, vet, and the like by sending out reports. |
| Status alert notification | Camera(s) and microphone(s) detect apparent fall or accident. | Notify person with remote oversight such as owner, family members, vet, and the like by sending out alerts. |
| External danger | Smoke detection sensor, CO detection sensor detect dangerous condition/ potential fire. | Notify emergency response persons such as fire department, police, ambulance and the like by sending out alerts. |

In one exemplary implementation, some neural networks implementing AI core 221 are implemented as an ensemble of subnetworks trained using datasets widely chosen from appropriate conclusions about environmental conditions and incorrect conclusions about environmental conditions, with outputs including classifications of anomalies based upon the input sensed data, and/or remedial actions to be triggered by invoking downstream applications such as preparing and submitting reports to persons with oversight, alerts to emergency authorities, regulatory compliance information, as well as the capability to both cluster information and to escalate problems.

Figure 9B:
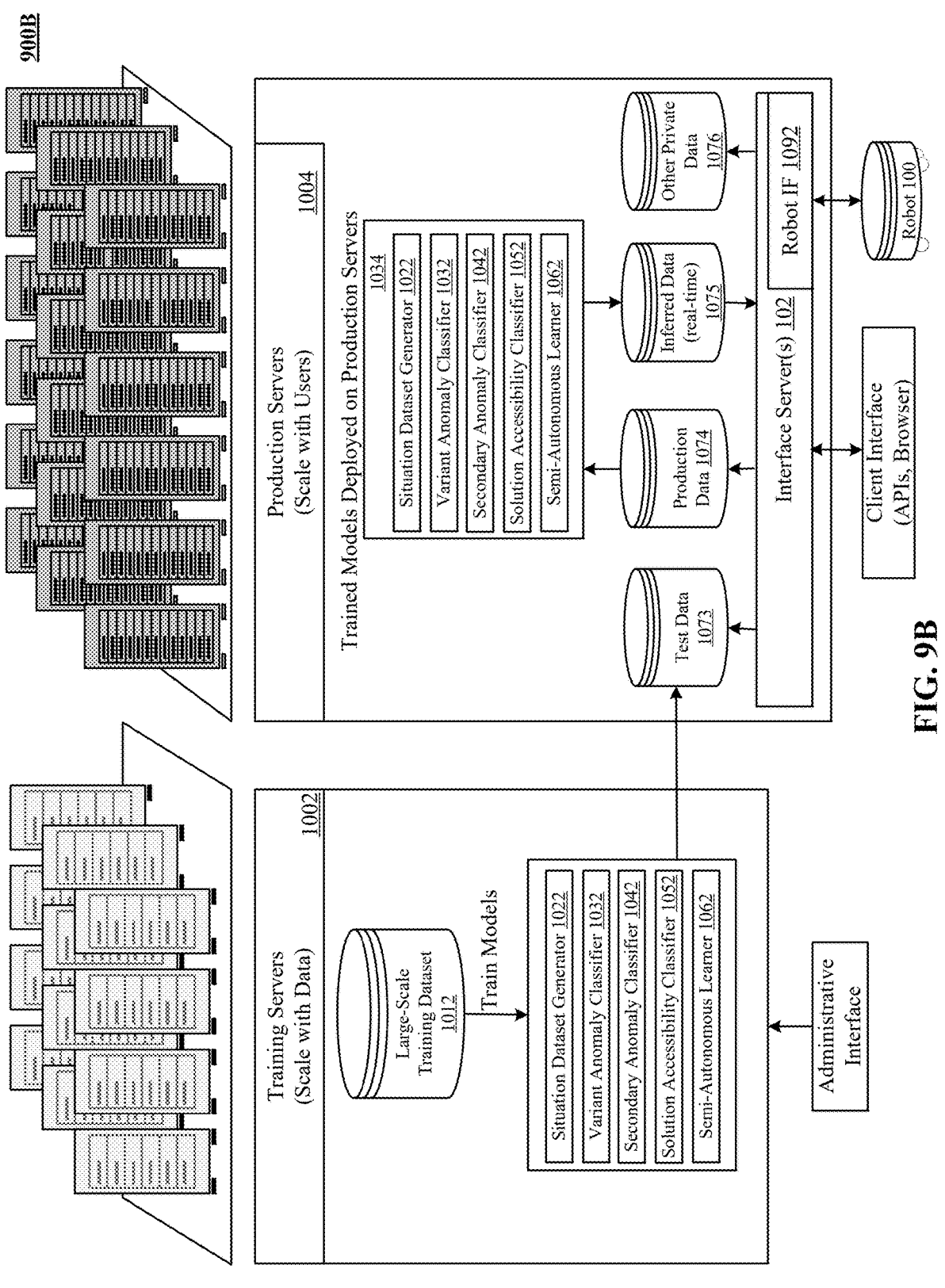
FIG. 9B illustrates a deep learning system in a supervised or semi-supervised implementation.
Figure 10:
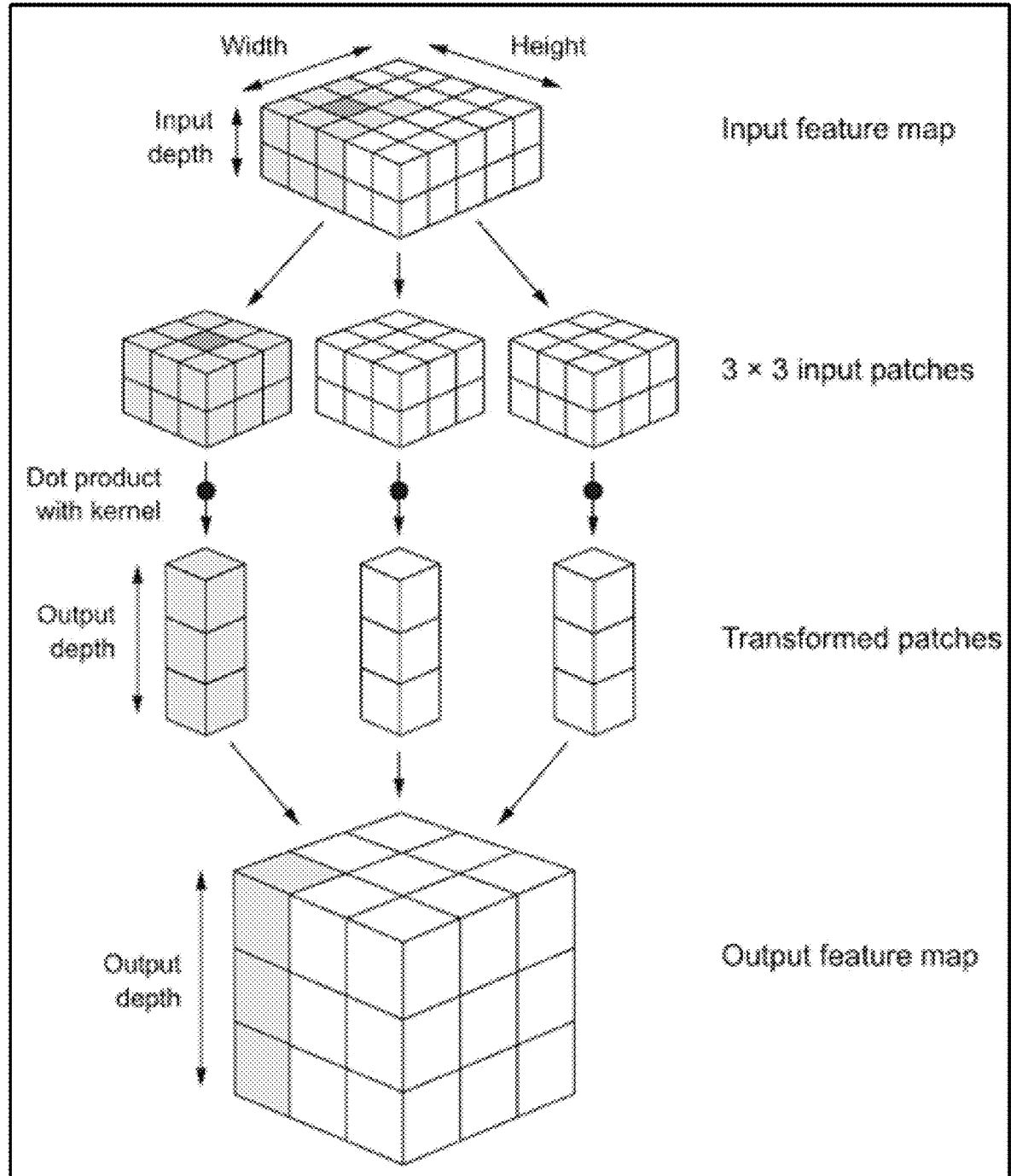
FIG. 10 depicts one implementation of workings of a convolutional neural network.

Having described neural network implementations, the discussion now turns to deep learning approaches.
Training System for Training Robot Neural Network Classifier(s) FIG. 9B illustrates a deep learning system in a supervised or semi-supervised implementation. As shown, deep learning system 900B includes training servers 1002 and production servers 1004. Large scale training dataset 1012 is accessible to training servers 1002 for training the deep convolutional neural network 1034. In an implementation, deep neural network 1034 includes a first anomaly subnetwork, and a second solution accessibility subnetwork that are trained on one or more training servers 1002. The trained deep neural network ensemble including the first trained anomaly subnetwork, and the trained second solution accessibility subnetwork are deployed on one or more production servers 1004 that receive input anomaly information from requesting client devices 122. The production servers 1004 process the input anomaly information through at least one of the deep neural network 1034, the first anomaly subnetwork, and the second solution accessibility subnetwork to produce outputs that are transmitted to the client devices 122.

Training servers 1002 conduct training using models and comprise a situation dataset generator 1022 includes a deep convolutional neural network based variant anomaly classifier, running on numerous processors coupled to memory that prepares training sets comprising data chosen from large scale training dataset 1012 to reflect one or more scenarios being trained, a variant anomaly classifier 1032 includes a deep convolutional neural network based variant anomaly classifier, running on numerous processors coupled to memory that is trained to recognize anomalous situations from sensed data using the scenarios prepared, an optional secondary classifier 1042 includes a deep convolutional neural network based secondary anomaly classifier, running on numerous processors coupled to memory that is trained to recognize special situation anomalies (e.g., radioactive spill, biohazard, etc.), a solution accessibility classifier 1052 includes a deep convolutional neural network based secondary anomaly classifier, running on numerous processors coupled to memory that is trained to recognize anomalies and output identifiers identifying remedial applications that are invoked to trigger remedial actions. A semi-autonomous learner 1062 includes a deep convolutional neural network based variant anomaly classifier, running on numerous processors coupled to memory that progressively augments a set size of the anomaly training set based on the trained ensemble's evaluation of a synthetic set or in implementations, input of live data from a real world scenario.

In one implementation, the neural networks such as situation dataset generator, variant anomaly classifier, secondary anomaly classifier, solution accessibility classifier, and semi-autonomous learner are communicably linked to the storage subsystem comprised of test data database 1073, production data database 1074, inferred data database 1075 and other private data database 1076 and user interface input devices.

In one implementation, data used in one or more of large scale training dataset 1012, test data database 1073, production data database 1074, inferred data database 1075 and other private data database 1076 is selectively obtained from multiple sources of data: (i) various medical and drug databases (e.g., the FDA, AMA, etc.) that enable the trained classifier to distinguish medicines, (ii) local or national directory databases of contact information for emergency services, repair services, catering services, and other service providers to the cared for person at home, (iii) lists of entertainment available online accessible to the robot and able to be rebroadcast to users, and (iv) user responses to deep learning driven follow-up questions selected by the solution accessibility classifier 1052 and semi-autonomous learner 1062 (allowing for live training and refinement).

Other implementations may include a non-transitory computer readable storage medium storing instructions executable by a processor to perform actions of the system described above. Yet another implementation may include a method performing actions of the system described above.

Having described deep learning approaches, the discussion now turns to Convolutional Neural Networks.
Convolutional Neural Networks A convolutional neural network is a special type of neural network. The fundamental difference between a densely connected layer and a convolution layer is this: Dense layers learn global patterns in their input feature space, whereas convolution layers learn local patters: in the case of images, patterns found in small 2D windows of the inputs. This key characteristic gives convolutional neural networks two interesting properties: (1) the patterns they learn are translation invariant and (2) they can learn spatial hierarchies of patterns.

Regarding the first, after learning a certain pattern in the lower-right corner of a picture, a convolution layer can recognize it anywhere: for example, in the upper-left corner. A densely connected network would have to learn the pattern anew if it appeared at a new location. This makes convolutional neural networks data efficient because they need fewer training samples to learn representations they have generalization power.

Regarding the second, a first convolution layer can learn small local patterns such as edges, a second convolution layer will learn larger patterns made of the features of the first layers, and so on. This allows convolutional neural networks to efficiently learn increasingly complex and abstract visual concepts.

A convolutional neural network learns highly non-linear mappings by interconnecting layers of artificial neurons arranged in many different layers with activation functions that make the layers dependent. It includes one or more convolutional layers, interspersed with one or more sub-sampling layers and non-linear layers, which are typically followed by one or more fully connected layers. Each element of the convolutional neural network receives inputs from a set of features in the previous layer. The convolutional neural network learns concurrently because the neurons in the same feature map have identical weights. These local shared weights reduce the complexity of the network such that when multi-dimensional input data enters the network, the convolutional neural network avoids the complexity of data reconstruction in feature extraction and regression or classification process.

Convolutions operate over 3D tensors, called feature maps, with two spatial axes (height and width) as well as a depth axis (also called the channels axis). For an RGB image, the dimension of the depth axis is 3, because the image has three color channels; red, green, and blue. For a black-and-white picture, the depth is 1 (levels of gray). The convolution operation extracts patches from its input feature map and applies the same transformation to all of these patches, producing an output feature map. This output feature map is still a 3D tensor: it has a width and a height. Its depth can be arbitrary, because the output depth is a parameter of the layer, and the different channels in that depth axis no longer stand for specific colors as in RGB input; rather, they stand for filters. Filters encode specific aspects of the input data: at a height level, a single filter could encode the concept "presence of a face in the input," for instance.

For example, the first convolution layer takes a feature map of size (28, 28, 1) and outputs a feature map of size (26, 26, 32): it computes 32 filters over its input. Each of these 32 output channels contains a 26×26 grid of values, which is a response map of the filter over the input, indicating the response of that filter pattern at different locations in the input. That is what the term feature map means: every dimension in the depth axis is a feature (or filter), and the 2D tensor output [:, :, n] is the 2D spatial map of the response of this filter over the input.

Convolutions are defined by two key parameters: (1) size of the patches extracted from the inputs—these are typically 1×1, 3×3 or 5×5 and (2) depth of the output feature map—the number of filters computed by the convolution. Often these start with a depth of 32, continue to a depth of 64, and terminate with a depth of 128 or 256.

A convolution works by sliding these windows of size 3×3 or 5×5 over the 3D input feature map, stopping at every location, and extracting the 3D patch of surrounding features (shape (window_height, window_width, input_depth)). Each such 3D patch is ten transformed (via a tensor product with the same learned weight matrix, called the convolution kernel) into a 1D vector of shape (output_depth). All of these vectors are then spatially reassembled into a 3D output map of shape (height, width, output_depth). Every spatial location in the output feature map corresponds to the same location in the input feature map (for example, the lower-right corner of the output contains information about the lower-right corner of the input). For instance, with 3×3 windows, the vector output [i, j, :] comes from the 3D patch input [i−1: i+1, j−1: J+1,:]. The full process is detailed in FIG. 10.

The convolutional neural network comprises convolution layers which perform the convolution operation between the input values and convolution filters (matrix of weights) that are learned over many gradient update iterations during the training. Let (m, n) be the filter size and W be the matrix of weights, then a convolution layer performs a convolution of the W with the input X by calculating the dot product W·x+b, where x is an instance of X and b is the bias. The step size by which the convolution filters slide across the input is called the stride, and the filter area (m x n) is called the receptive field. A same convolution filter is applied across different positions of the input, which reduces the number of weights learned. It also allows location invariant learning, i.e., if an important pattern exists in the input, the convolution filters learn it no matter where it is in the sequence.

Training a Convolutional Neural Network

FIG. 11 depicts a block diagram of training a convolutional neural network in accordance with one implementation of the technology disclosed. The convolutional neural network is adjusted or trained so that the input data leads to a specific output estimate. The convolutional neural network is adjusted using back propagation based on a comparison of the output estimate and the ground truth until the output estimate progressively matches or approaches the ground truth.

The convolutional neural network is trained by adjusting the weights between the neurons based on the difference between the ground truth and the actual output. This is mathematically described as:

$$\Delta w_i = x_i \delta$$

where δ=(ground truth)−(actual output)

In one implementation, the training rule is defined as:

$$w_{nm} \leftarrow w_{nm} + \alpha(t_m - \varphi_m)a_n$$

In the equation above: the arrow indicates an update of the value; $t_m$ is the target value of neuron m; $\varphi_m$ is the computed current output of neuron m; $a_n$ is input n; and xx is the learning rate.

The intermediary step in the training includes generating a feature vector from the input data using the convolution layers. The gradient with respect to the weights in each layer, starting at the output, is calculated. This is referred to as the backward pass, or going backwards. The weights in the network are updated using a combination of the negative gradient and previous weights.

In one implementation, the convolutional neural network uses a stochastic gradient update algorithm (such as ADAM) that performs backward propagation of errors by means of gradient descent. One example of a sigmoid function based back propagation algorithm is described below:

$$\varphi = f(h) = \frac{1}{1 + e^{-h}}$$

In the sigmoid function above, h is the weighted sum computed by a neuron. The sigmoid function has the following derivative:

$$\frac{\partial \varphi}{\partial h} = \varphi(1 - \varphi)$$

The algorithm includes computing the activation of all neurons in the network, yielding an output for the forward pass. The activation of neuron m in the hidden layers is described as:

$$\varphi_m = \frac{1}{1 + e^{-hm}}$$

$$h_m = \sum_{n=1}^{N} a_n w_{nm}$$

This is done for all the hidden layers to get the activation described as:

$$\varphi_k = \frac{1}{1 + e^{hk}}$$

$$h_k = \sum_{m=1}^{M} \varphi_m v_{mk}$$

Then, the error and the correct weights are calculated per layer. The error at the output is computed as:

$$\delta_{ok} = (t_k - \varphi_k)\varphi_k(1-\varphi_k)$$

The error in the hidden layers is calculated as:

$$\delta_{hm} = \varphi_m(1 - \varphi_m)\sum_{k=1}^{K} v_{mk}\delta_{ok}$$

The weights of the output layer are updated as:

$$vmk \leftarrow vmk + \alpha\delta ok\varphi m$$

The weights of the hidden layers are updated using the learning rate $\alpha$ as:

$$vnm \leftarrow wnm + \alpha\delta hman$$

In one implementation, the convolutional neural network uses a gradient descent optimization to compute the error across all the layers. In such an optimization, for an input feature vector x and the predicted output $\hat{y}$, the loss function is defined as l for the cost of predicting $\hat{y}$ when the target is y, i.e. $l(\hat{y}, y)$. The predicted output $\hat{y}$ is transformed from the input feature vector x using function $f$. Function $f$ is parameterized by the weights of convolutional neural network, i.e. $\hat{y} = f_w(x)$. The loss function is described as $l(\hat{y}, y) = l(f_w(x), y)$, or $Q(z, w) = l(f_w(x), y)$ where z is an input and output data pair (x, y). The gradient descent optimization is performed by updating the weights according to:

$$v_{t+1} = \mu v_t - \alpha\frac{1}{n}\sum_{i=1}^{N} \nabla w_t Q(z_t, w_t)$$

$$w_{t+1} = w_t + v_{t+1}$$

In the equations above, $\alpha$ is the learning rate. Also, the loss is computed as the average over a set of N data pairs. The computation is terminated when the learning rate $\alpha$ is small enough upon linear convergence. In other implementations, the gradient is calculated using only selected data pairs fed to a Nesterov's accelerated gradient and an adaptive gradient to inject computation efficiency.

In one implementation, the convolutional neural network uses a stochastic gradient descent (SGD) to calculate the cost function. A SGD approximates the gradient with respect to the weights in the loss function by computing it from only one, randomized, data pair, $z_t$, described as:

$$v_{t+1} = \mu v - \alpha \nabla w Q(z_t, w_t)$$

$$W_{t+1} = W_t + V_{t+1}$$

In the equations above: $\alpha$ is the learning rate; $\mu$ is the momentum; and t is the current weight state before updating. The convergence speed of SGD is approximately $O(1/t)$ when the learning rate $\alpha$ are reduced both fast and slow enough. In other implementations, the convolutional neural network uses different loss functions such as Euclidean loss and softmax loss. In a further implementation, an Adam stochastic optimizer is used by the convolutional neural network.

Convolution Layers

The convolution layers of the convolutional neural network serve as feature extractors. Convolution layers act as adaptive feature extractors capable of learning and decomposing the input data into hierarchical features. In one implementation, the convolution layers take two images as input and produce a third image as output. In such an implementation, convolution operates on two images in two-dimension (2D), with one image being the input image and the other image, called the "kernel", applied as a filter on the input image, producing an output image. Thus, for an input vector $f$ of length n and a kernel g of length m, the convolution $f*g$ of $f$ and g is defined as:

$$(f^*g)(i) = \sum_{j=1}^{m} g(j) \cdot f(i - j + m/2)$$

The convolution operation includes sliding the kernel over the input image. For each position of the kernel, the overlapping values of the kernel and the input image are multiplied and the results are added. The sum of products is the value of the output image at the point in the input image where the kernel is centered. The resulting different outputs from many kernels are called feature maps.

Once the convolutional layers are trained, they are applied to perform recognition tasks on new inference data. Since the convolutional layers learn from the training data, they avoid explicit feature extraction and implicitly learn from the training data. Convolution layers use convolution filter kernel weights, which are determined and updated as part of the training process. The convolution layers extract different features of the input, which are combined at higher layers. The convolutional neural network uses a various number of convolution layers, each with different convolving parameters such as kernel size, strides, padding, number of feature maps and weights.

Non-Linear Layers

FIG. 12 shows one implementation of non-linear layers in accordance with one implementation of the technology disclosed. Non-linear layers use different non-linear trigger functions to signal distinct identification of likely features on each hidden layer. Non-linear layers use a variety of specific functions to implement the non-linear triggering, including the rectified linear units (ReLUs), hyperbolic tangent, absolute of hyperbolic tangent, sigmoid and continuous trigger (non-linear) functions. In one implementation, a ReLU activation implements the function y=max(x, 0) and keeps the input and output sizes of a layer the same. The advantage of using ReLU is that the convolutional neural network is trained many times faster. ReLU is a non-continuous, non-saturating activation function that is linear with respect to the input if the input values are larger than zero and zero otherwise. Mathematically, a ReLU activation function is described as:

$$\varphi(h) = \max(h, 0)$$

$$\varphi(h) = \begin{cases} h & \text{if } h > 0 \\ 0 & \text{if } h \le 0 \end{cases}$$

In other implementations, the convolutional neural network uses a power unit activation function, which is a continuous, non-saturating function described by:

$$\varphi(h) = (a+bh)^c$$

In the equation above, a, b and c are parameters controlling the shift, scale and power respectively. The power activation function is able to yield x and y-antisymmetric activation if c is odd and y-symmetric activation if c is even. In some implementations, the unit yields a non-rectified linear activation.

In yet other implementations, the convolutional neural network uses a sigmoid unit activation function, which is a continuous, saturating function described by the following logistic function:

$$\varphi(h) = \frac{1}{1 + e^{-\beta h}}$$

In the equation above, $\beta=1$. The sigmoid unit activation function does not yield negative activation and is only antisymmetric with respect to the y-axis.

Dilated Convolutions

Figure 13:
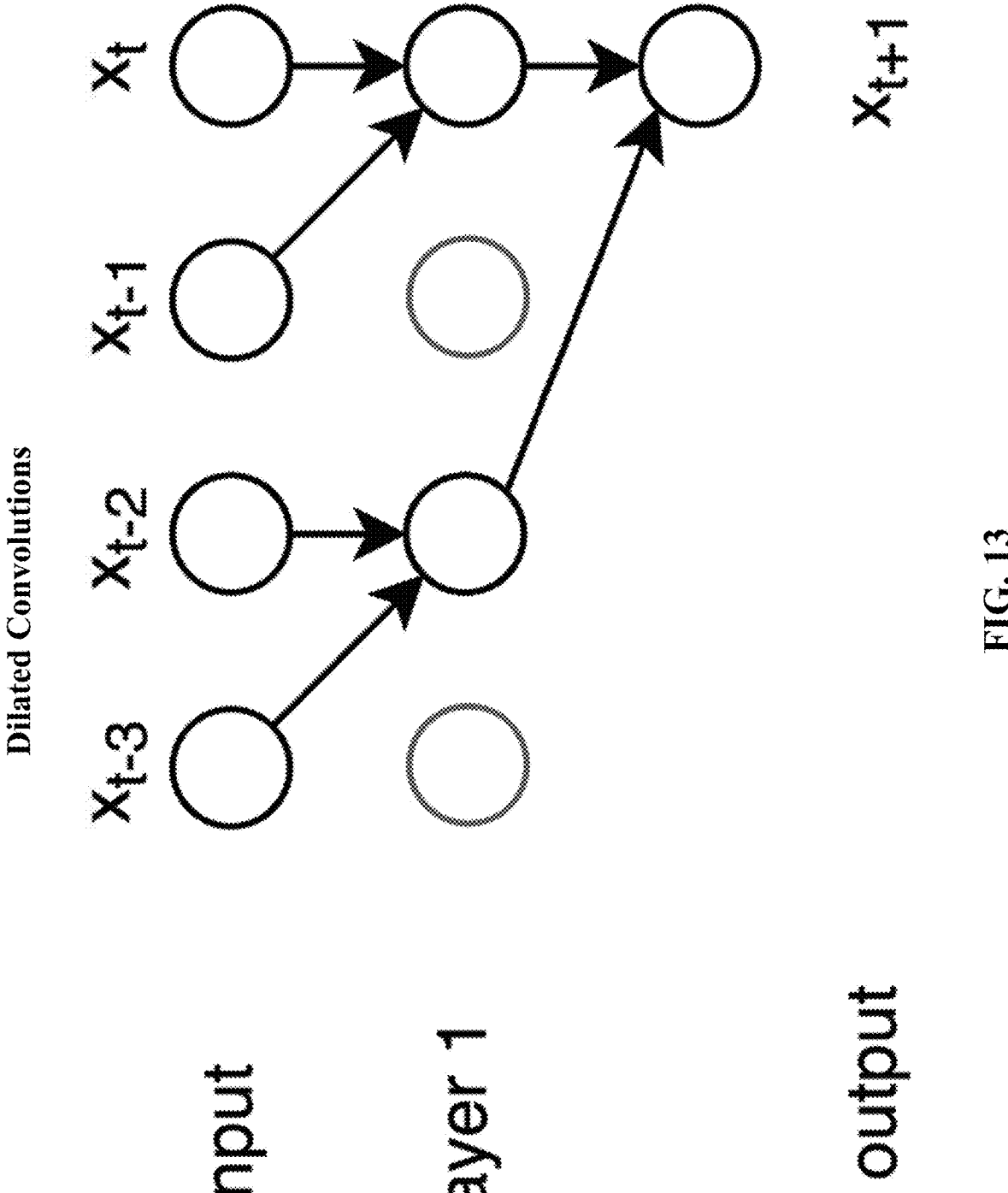
FIG. 13 illustrates dilated convolutions.

FIG. 13 illustrates dilated convolutions. Dilated convolutions, sometimes called atrous convolutions, which literally means with holes. The French name has its origins in the algorithme a trous, which computes the fast dyadic wavelet transform. In these type of convolutional layers, the inputs corresponding to the receptive field of the filters are not neighboring points. This is illustrated in FIG. 13. The distance between the inputs is dependent on the dilation factor.

Sub-Sampling Layers

Figure 14:
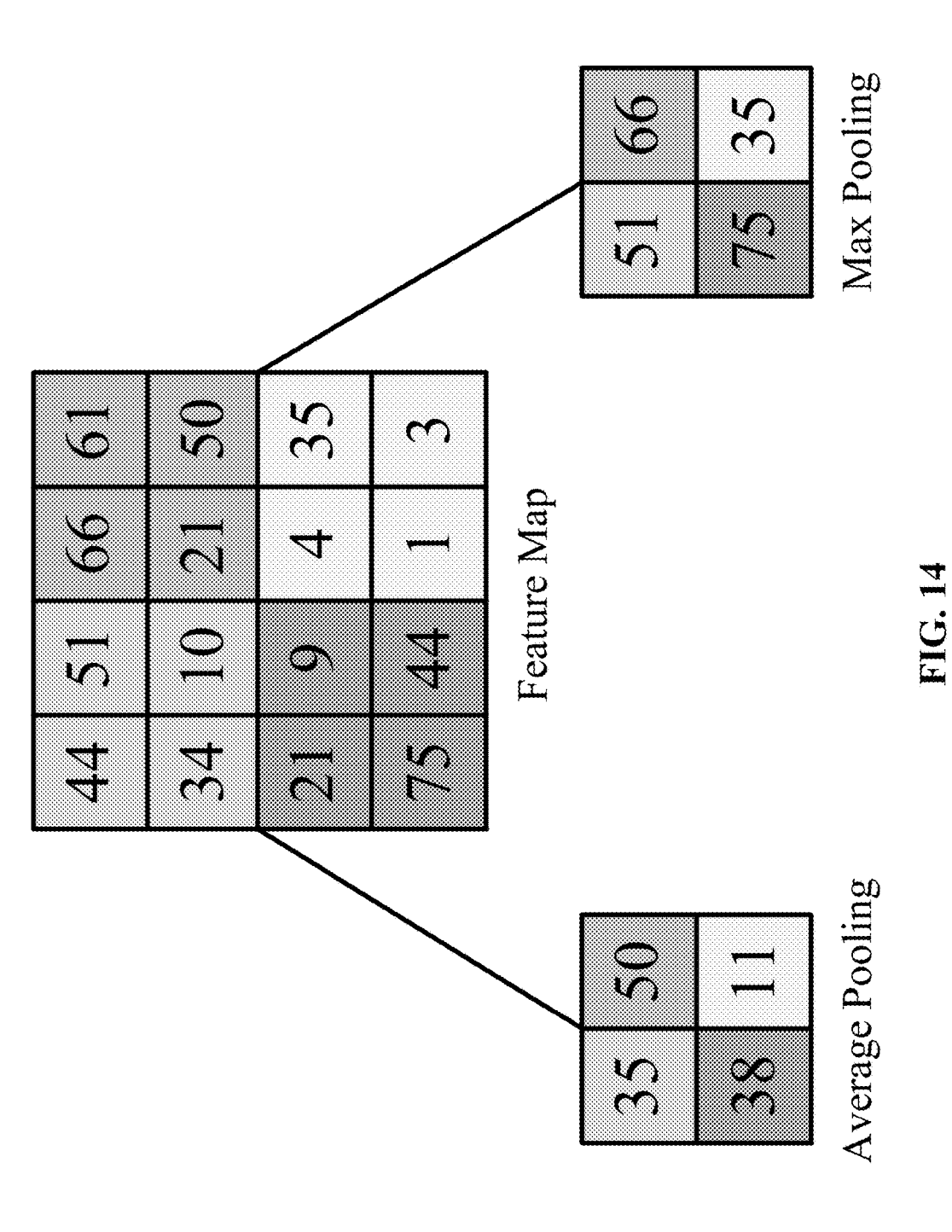
FIG. 14 is one implementation of sub-sampling layers (average/max pooling) in accordance with one implementation of the technology disclosed.

FIG. 14 is one implementation of sub-sampling layers in accordance with one implementation of the technology disclosed. Sub-sampling layers reduce the resolution of the features extracted by the convolution layers to make the extracted features or feature maps-robust against noise and distortion. In one implementation, sub-sampling layers employ two types of pooling operations, average pooling and max pooling. The pooling operations divide the input into non-overlapping two-dimensional spaces. For average pooling, the average of the four values in the region is calculated. For max pooling, the maximum value of the four values is selected.

In one implementation, the sub-sampling layers include pooling operations on a set of neurons in the previous layer by mapping its output to only one of the inputs in max pooling and by mapping its output to the average of the input in average pooling. In max pooling, the output of the pooling neuron is the maximum value that resides within the input, as described by:

$$\varphi_o = \max(\varphi_1, \varphi_2, \dots, \varphi_N)$$

In the equation above, N is the total number of elements within a neuron set.

In average pooling, the output of the pooling neuron is the average value of the input values that reside with the input neuron set, as described by:

$$\varphi_o = \frac{1}{N} \sum_{n=1}^{N} \varphi_n$$

In the equation above, N is the total number of elements within input neuron set.

In FIG. 14, the input is of size 4×4. For 2×2 sub-sampling, a 4×4 image is divided into four non-overlapping matrices of size 2×2. For average pooling, the average of the four values is the whole-integer output. For max pooling, the maximum value of the four values in the 2×2 matrix is the whole-integer output.

Convolution Examples

Figure 15:
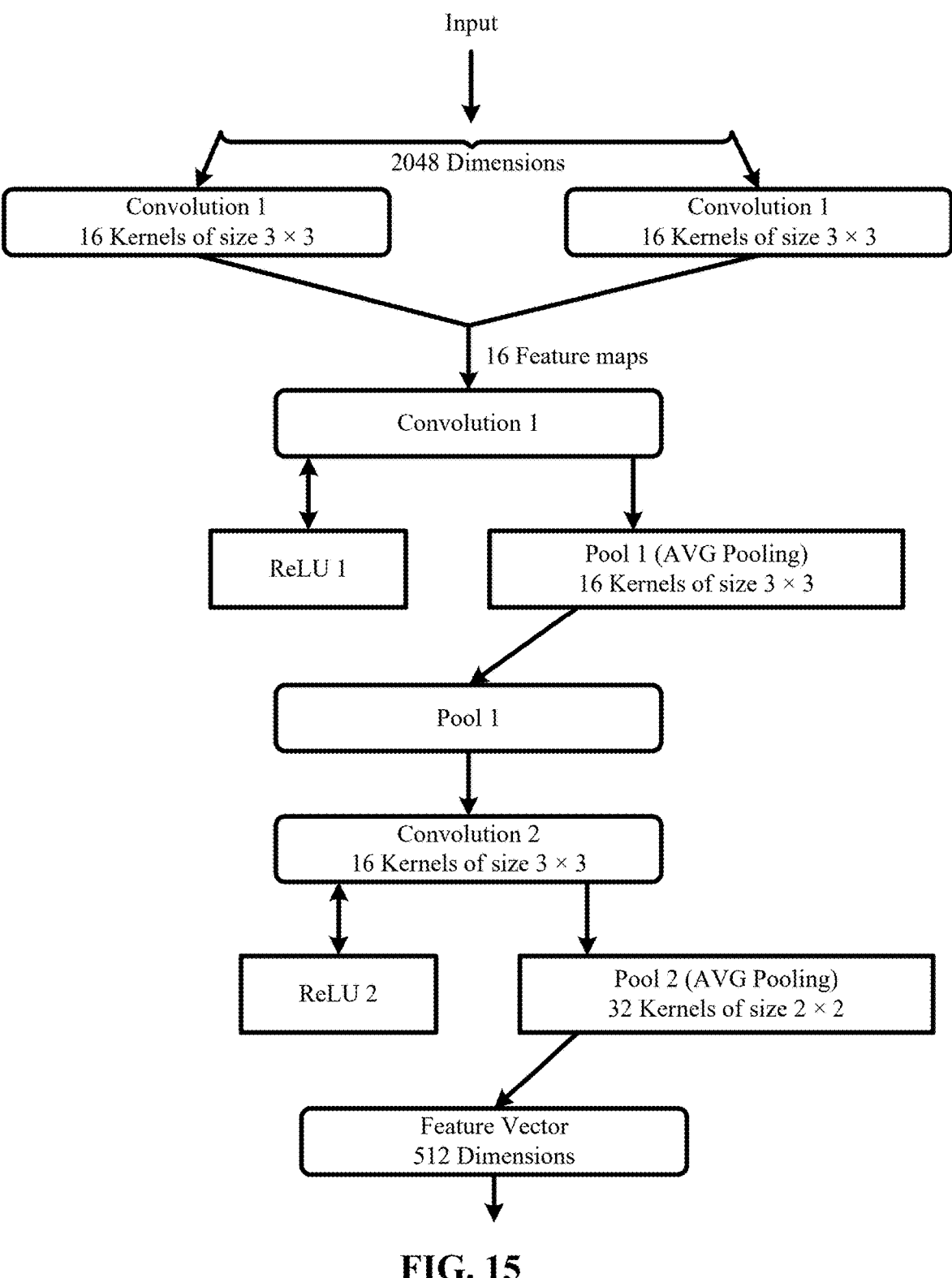
FIG. 15 depicts one implementation of a two-layer convolution of the convolution layers.

FIG. 15 depicts one implementation of a two-layer convolution of the convolution layers. In FIG. 15, an input of size 2048 dimensions is convolved. At convolution 1, the input is convolved by a convolutional layer comprising of two channels of sixteen kernels of size 3×3. The resulting sixteen feature maps are then rectified by means of the ReLU activation function at ReLU1 and then pooled in Pool 1 by means of average pooling using a sixteen channel pooling layer with kernels of size 3×3. At convolution 2, the output of Pool 1 is then convolved by another convolutional layer comprising of sixteen channels of thirty kernels with a size of 3×3. This is followed by yet another ReLU2 and average pooling in Pool 2 with a kernel size of 2×2. The convolution layers use varying number of strides and padding, for example, zero, one, two and three. The resulting feature vector is five hundred and twelve (512) dimensions, according to one implementation.

In other implementations, the convolutional neural network uses different numbers of convolution layers, sub-sampling layers, non-linear layers and fully connected layers. In one implementation, the convolutional neural network is a shallow network with fewer layers and more neurons per layer, for example, one, two or three fully connected layers with hundred (100) to two hundred (200) neurons per layer. In another implementation, the convolutional neural network is a deep network with more layers and fewer neurons per layer, for example, five (5), six (6) or eight (8) fully connected layers with thirty (30) to fifty (50) neurons per layer.

Forward Pass

The output of a neuron of row x, column y in the $l^{th}$ convolution layer and $k^{th}$ feature map for $f$ number of convolution cores in a feature map is determined by the following equation:

$$O_{x,y}^{(l,k)} = \tanh\left( \sum_{t=0}^{f-1} \sum_{r=0}^{k_h} \sum_{c=0}^{k_w} W_{(r,c)}^{(k,t)} O_{(x+r,x+c)}^{(l-1,t)} + \text{Bias}^{(l,k)} \right)$$

The output of a neuron of row x, column y in the $l^{th}$ sub-sample layer and $k^{th}$ feature map is determined by the following equation:

$$O_{x,y}^{(l,k)} = \tanh\left(W^{(k)}\sum_{r=0}^{S_h}\sum_{c=0}^{S_w} O_{(x\times S_h+r,y\times S_w+c)}^{(l-1,k)} + \text{Bias}^{(l,k)}\right)$$

The output of an $i^{th}$ neuron of the $l^{th}$ output layer is determined by the following equation:

$$O_{(l,i)} = \tanh\left(\sum_{j=0}^{H} O_{(l-1,j)} W_{(i,j)}^{l} + \text{Bias}^{(l,i)}\right)$$

Backpropagation

The output deviation of a $k^{th}$ neuron in the output layer is determined by the following equation:

$$d(O_k^o) = y_k - t_k$$

The input deviation of a $k^{th}$ neuron in the output layer is determined by the following equation:

$$d(I_k^o) = (y_k - t_k)\varphi'(v_k) = \varphi'(v_k)d(O_k^o)$$

The weight and bias variation of a $k^{th}$ neuron in the output layer is determined by the following equation:

$$\Delta W_{k,x}^o = d(I_k^o)y_{k,x}$$

$$\Delta\text{Bias}_k^o = d(I_k^o)$$

The output bias of a $k^{th}$ neuron in the hidden layer is determined by the following equation:

$$d(O_k^H) = \sum_{i=0}^{i<84} d(I_i^o)W_{i,k}$$

The input bias of a $k^{th}$ neuron in the hidden layer is determined by the following equation:

$$d(I_k^H) = \varphi'(v_k)d(O_k^H)$$

The weight and bias variation in row x, column y in a $m^{th}$ feature map of a prior layer receiving input from k neurons in the hidden layer is determined by the following equation:

$$\Delta W_{m,x,y}^{H,k} = d(I_k^H)y_{x,y}^m$$

$$\Delta\text{Bias}_k^H = d(I_k^H)$$

The output bias of row x, column y in a $m^{th}$ feature map of sub-sample layer S is determined by the following equation:

$$d(O_{x,y}^{S,m}) = \sum_{k}^{170} d(I_{m,x,y}^H)W_{m,x,y}^{H,k}$$

The input bias of row x, column y in a $m^{th}$ feature map of sub-sample layer S is determined by the following equation:

$$d(I_{x,y}^{S,m}) = \varphi'(v_k)d(O_{x,y}^{S,m})$$

The weight and bias variation in row x, column y in a $m^{th}$ feature map of sub-sample layer S and convolution layer C is determined by the following equation:

$$\Delta W^{S,m} = \sum_{x=0}^{fh}\sum_{y=0}^{fw} d(I_{[x/2],[y/2]}^{S,m})O_{x,y}^{C,m}$$

$$\Delta\text{Bias}^{S,m} = \sum_{x=0}^{fh}\sum_{y=0}^{fw} d(O_{x,y}^{S,m})$$

The output bias of row x, column y in a $k^{th}$ feature map of convolution layer C is determined by the following equation:

$$d(O_{x,y}^{C,k}) = d(I_{[x/2],[y/2]}^{S,k})W^k$$

The input bias of row x, column y in a $k^{th}$ feature map of convolution layer C is determined by the following equation:

$$d(I_{x,y}^{C,k}) = \varphi'(v_k)d(O_{x,y}^{C,k})$$

The weight and bias variation in row r, column c in an $m^{th}$ convolution core of a $k^{th}$ feature map of $l^{th}$ convolution layer C:

$$\Delta W_{r,c}^{k,m} = \sum_{x=0}^{fh}\sum_{y=0}^{fw} d(I_{x,y}^{C,k})O_{x+r,y+c}^{l-1,m}$$

$$\Delta\text{Bias}^{C,k} = \sum_{x=0}^{fh}\sum_{y=0}^{fw} d(I_{x,y}^{C,k})$$

Residual Connections

Figure 16:
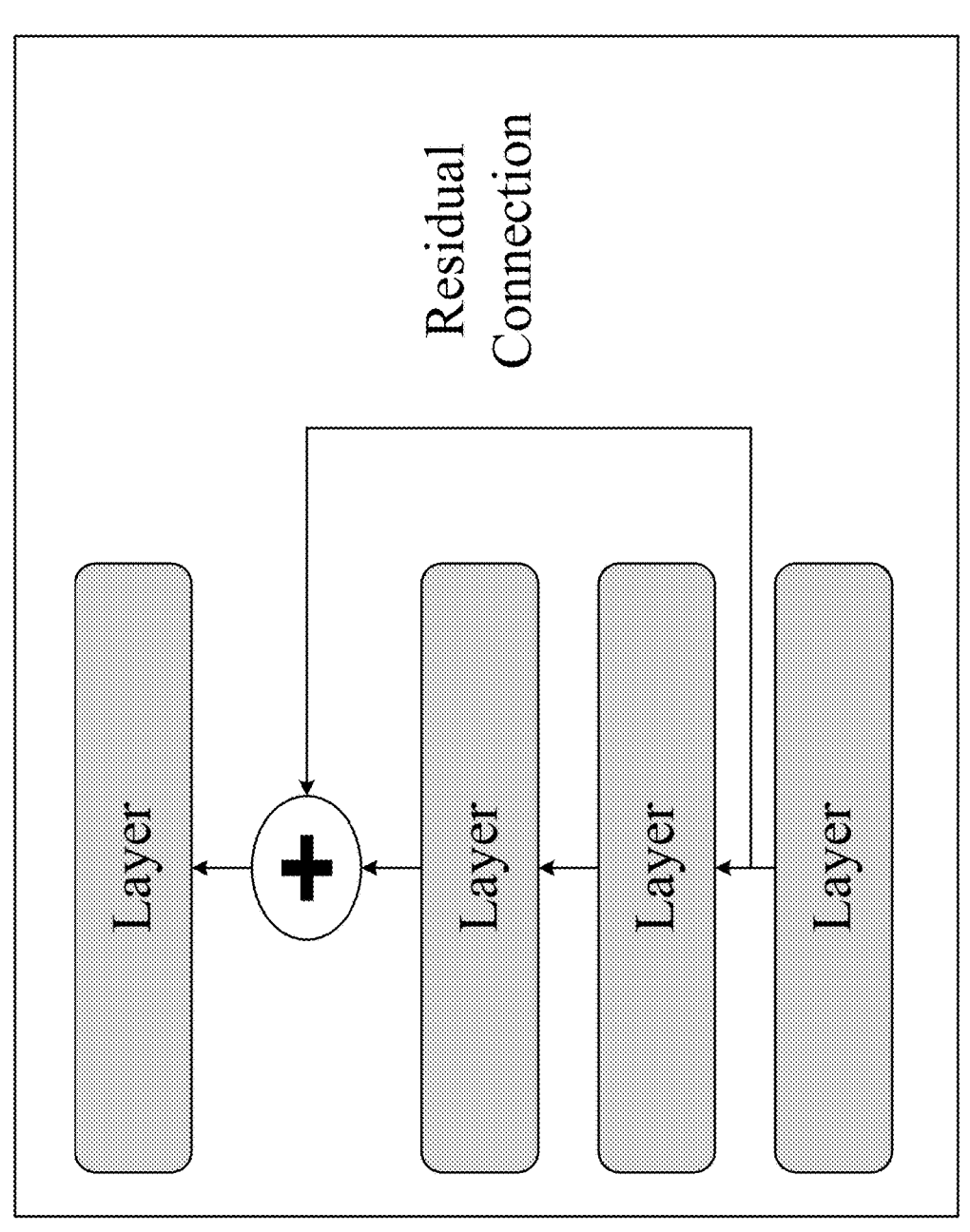
FIG. 16 depicts a residual connection that reinjects prior information downstream via feature-map addition.

FIG. 16 depicts a residual connection that reinjects prior information downstream via feature-map addition. A residual connection comprises reinjecting previous representations into the downstream flow of data by adding a past output tensor to a later output tensor, which helps prevent information loss along the data-processing flow. Residual connections tackle two common problems that plague any large-scale deep-learning model: vanishing gradients and representational bottlenecks. In general, adding residual connections to any model that has more than 10 layers is likely to be beneficial. As discussed above, a residual connection comprises making the output of an earlier layer available as input to a later layer, effectively creating a shortcut in a sequential network. Rather than being concatenated to the later activation, the earlier output is summed with the later activation, which assumes that both activations are the same size. If they are of different sizes, a linear transformation to reshape the earlier activation into the target shape can be used.

Residual Learning and Skip-Connections

Figure 17:
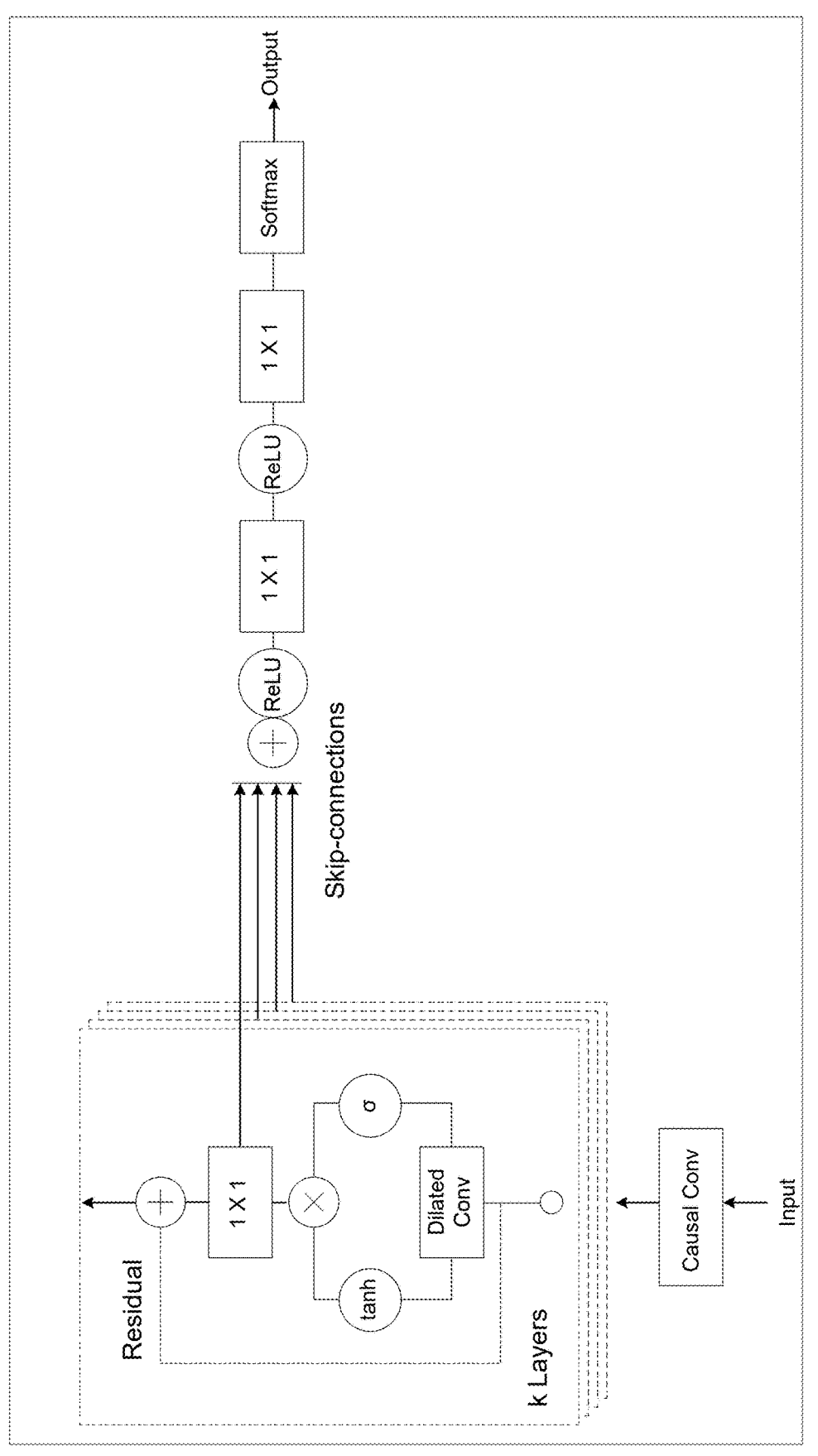
FIG. 17 depicts one implementation of residual blocks and skip-connections.

FIG. 17 depicts one implementation of residual blocks and skip-connections. The main idea of residual learning is that the residual mapping is much easier to be learned than the original mapping. Residual network stacks a number of residual units to alleviate the degradation of training accuracy. Residual blocks make use of special additive skip connections to combat vanishing gradients in deep neural networks. At the beginning of a residual block, the data flow is separated into two streams: the first carries the unchanged input of the block, while the second applies weights and non-linearities. At the end of the block, the two streams are merged using an element-wise sum. The main advantage of such constructs is to allow the gradient to flow through the network more easily.

Benefited from residual network, deep convolutional neural networks (CNNs) can be easily trained and improved accuracy has been achieved for image classification and object detection. Convolutional feed-forward networks connect the output of the $l^{th}$ layer as input to the $(l+1)^{th}$ layer, which gives rise to the following layer transition: $x_l = H_l(x_{l-1})$. Residual blocks add a skip-connection that bypasses the non-linear transformations with an identify function: $x_l = H_l(x_{l-1}) + x_{l-1}$. An advantage of residual blocks is that the gradient can flow directly through the identity function from later layers to the earlier layers. However, the identity function and the output of $H_l$ are combined by summation, which may impede the information flow in the network.

WaveNet

The WaveNet is a deep neural network for generating raw audio waveforms. The WaveNet distinguishes itself from other convolutional networks since it is able to take relatively large 'visual fields' at low cost. Moreover, it is able to add conditioning of the signals locally and globally, which allows the WaveNet to be used as a text to speech (TTS) engine with multiple voices, is the TTS gives local conditioning and the particular voice the global conditioning.

Figure 18:
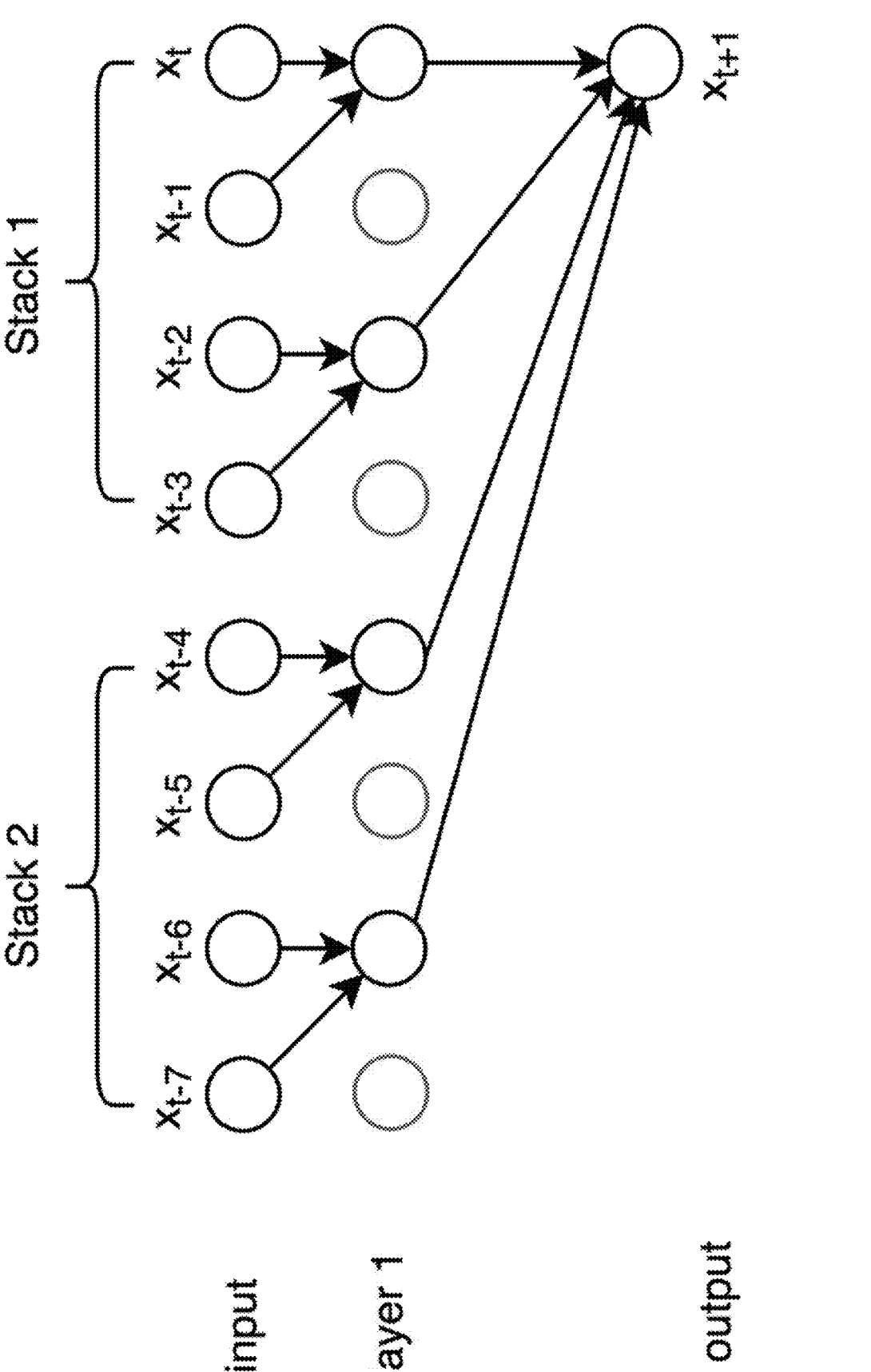
FIG. 18 shows one implementation of stacked dilated convolutions.

The main building blocks of the WaveNet are the causal dilated convolutions. As an extension on the causal dilated convolutions, theWaveNet also allows stacks of these convolutions, as shown in FIG. 18. To obtain the same receptive field with dilated convolutions in this figure, another dilation layer is required. The stacks are a repetition of the dilated convolutions, connecting the outputs of dilated convolution layer to a single output. This enables the WaveNet to get a large 'visual' field of one output node at a relatively low computational cost. For comparison, to get a visual field of 512 inputs, a fully convolutional network (FCN) would require 511 layers. In the case of a dilated convolutional network, we would need eight layers. The stacked dilated convolutions only need seven layers with two stacks or six layers with four stacks. To get an idea of the differences in computational power required for covering the same visual field, the following table shows the number of weights required in the network with the assumption of one filter per layer and a filter width of two. Furthermore, it is assumed that the network is using binary encoding of the 8 bits.

| Network type | No. stacks | No. weights per channel | Total No. of weights |
|---|---|---|---|
| FCN | 1 | $2.6 \cdot 10^5$ | $2.6 \cdot 10^6$ |
| WN | 1 | 1022 | 8176 |
| WN | 2 | 1022 | 8176 |
| WN | 4 | 508 | 4064 |

The WaveNet adds a skip connection before the residual connection is made, which bypasses all the following residual blocks. Each of these skip connections is summed before passing them through a series of activation functions and convolutions. Intuitively, this is the sum of the information extracted in each layer.

Batch Normalization

Batch normalization is a method for accelerating deep network training by making data standardization an integral part of the network architecture. Batch normalization can adaptively normalize data even as the mean and variance change over time during training. It works by internally maintaining an exponential moving average of the batch-wise mean and variance of the data seen during training. The main effect of batch normalization is that it helps with gradient propagation-much like residual connections- and thus allows for deep networks. Some very deep networks can only be trained if they include multiple Batch Normalization layers.

Batch normalization can be seen as yet another layer that can be inserted into the model architecture, just like the fully connected or convolutional layer. The BatchNormalization layer is typically used after a convolutional or densely connected layer. It can also be used before a convolutional or densely connected layer. Both implementations can be used by the technology disclosed and are shown in FIG. 22. The BatchNormalization layer takes an axis argument, which specifies the feature axis that should be normalized. This argument defaults to −1, the last axis in the input tensor. This is the correct value when using Dense layers, Conv1D layers, RNN layers, and Conv2D layers with data_format set to "channels last". But in the niche use case of Conv2D layers with data_format set to "channels_first", the features axis is axis 1; the axis argument in BatchNormalization can be set to 1.

Batch normalization provides a definition for feed-forwarding the input and computing the gradients with respect to the parameters and its own input via a backward pass. In practice, batch normalization layers are inserted after a convolutional or fully connected layer, but before the outputs are fed into an activation function. For convolutional layers, the different elements of the same feature map—i.e. the activations—at different locations are normalized in the same way in order to obey the convolutional property. Thus, all activations in a mini-batch are normalized over all locations, rather than per activation.

The internal covariate shift is the major reason why deep architectures have been notoriously slow to train. This stems from the fact that deep networks do not only have to learn a new representation at each layer, but also have to account for the change in their distribution.

The covariate shift in general is a known problem in the deep learning domain and frequently occurs in real-world problems. A common covariate shift problem is the difference in the distribution of the training and test set which can lead to suboptimal generalization performance. This problem is usually handled with a standardization or whitening preprocessing step. However, especially the whitening operation is computationally expensive and thus impractical in an online setting, especially if the covariate shift occurs throughout different layers.

The internal covariate shift is the phenomenon where the distribution of network activations change across layers due to the change in network parameters during training. Ideally, each layer should be transformed into a space where they have the same distribution but the functional relationship stays the same. In order to avoid costly calculations of covariance matrices to de-correlate and whiten the data at every layer and step, we normalize the distribution of each input feature in each layer across each mini-batch to have zero mean and a standard deviation of one.

Forward Pass

During the forward pass, the mini-batch mean and variance are calculated. With these mini-batch statistics, the data is normalized by subtracting the mean and dividing by the standard deviation. Finally, the data is scaled and shifted with the learned scale and shift parameters. The batch normalization forward pass $f_{BN}$ is depicted in FIG. 19.

In FIG. 19, $\mu_\beta$ is the batch mean and $$\sigma_\beta^2$$

is the batch variance, respectively. The learned scale and shift parameters are denoted by $\gamma$ and $\beta$, respectively. For clarity, the batch normalization procedure is described herein per activation and omit the corresponding indices.

Since normalization is a differentiable transform, the errors are propagated into these learned parameters and are thus able to restore the representational power of the network by learning the identity transform. Conversely, by learning scale and shift parameters that are identical to the corresponding batch statistics, the batch normalization transform would have no effect on the network, if that was the optimal operation to perform. At test time, the batch mean and variance are replaced by the respective population statistics since the input does not depend on other samples from a mini-batch. Another method is to keep running averages of the batch statistics during training and to use these to compute the network output at test time. At test time, the batch normalization transform can be expressed as illustrated in FIG. 20. In FIG. 20, $\mu_D$ and $$\sigma_D^2$$

denote the population mean and variance, rather than the batch statistics, respectively.

Backward Pass

Since normalization is a differentiable operation, the backward pass can be computed as depicted in FIG. 21.

Figure 23:
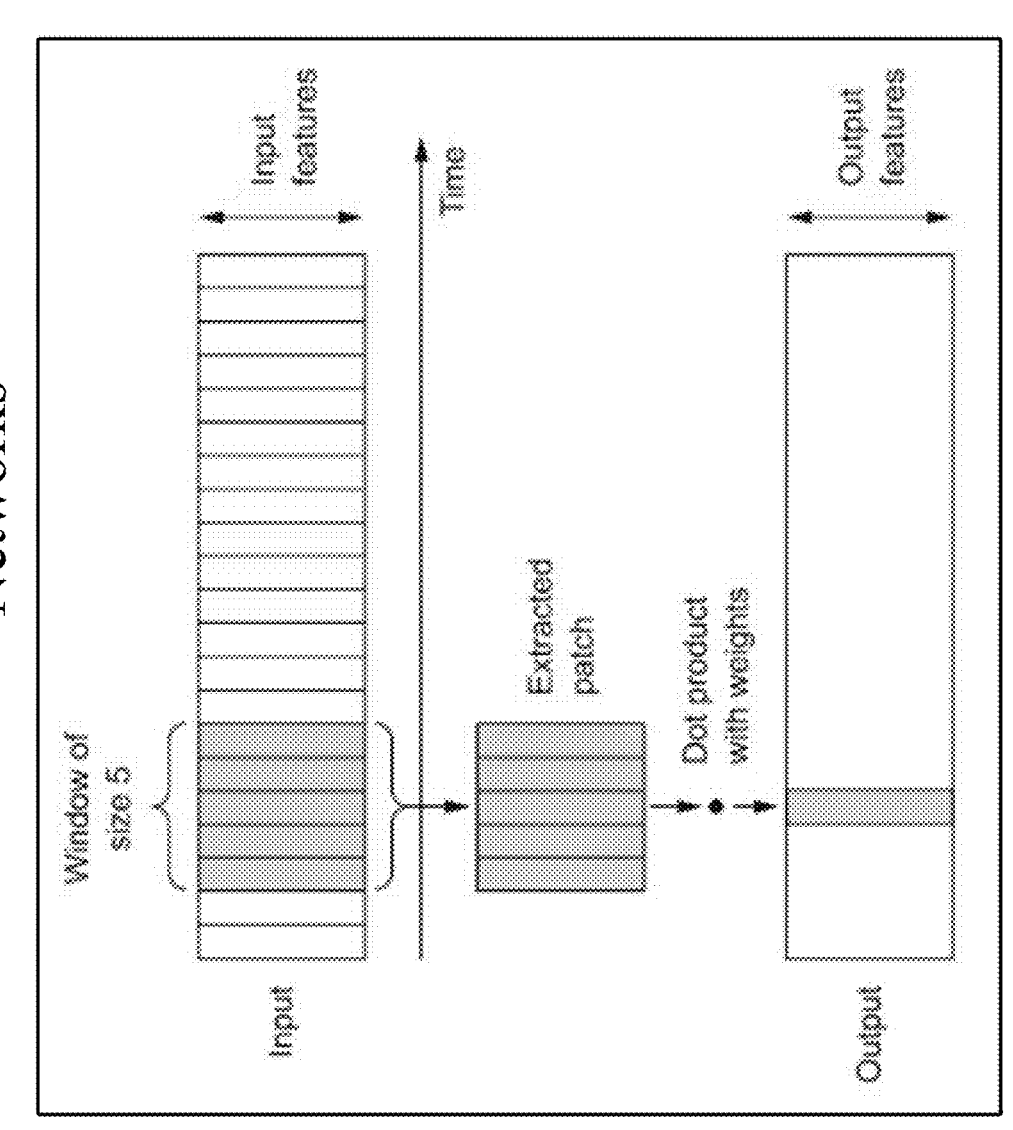
FIG. 23 shows one implementation of 1D convolution.

1D Convolution 1D convolutions extract local 1D patches or subsequences from sequences, as shown in FIG. 23. 1D convolution obtains each output timestep from a temporal patch in the input sequence. 1D convolution layers recognize local patterns in a sequence. Because the same input transformation is performed on every patch, a pattern learned at a certain position in the input sequences can be later recognized at a different position, making 1D convolution layers translation invariant for temporal translations. For instance, a 1D convolution layer processing sequences of bases using convolution windows of size 5 should be able to learn bases or base sequences of length 5 or less, and it should be able to recognize the base motifs in any context in an input sequence. A base-level 1D convolution is thus able to learn about base morphology.

Global Average Pooling

Figure 24:
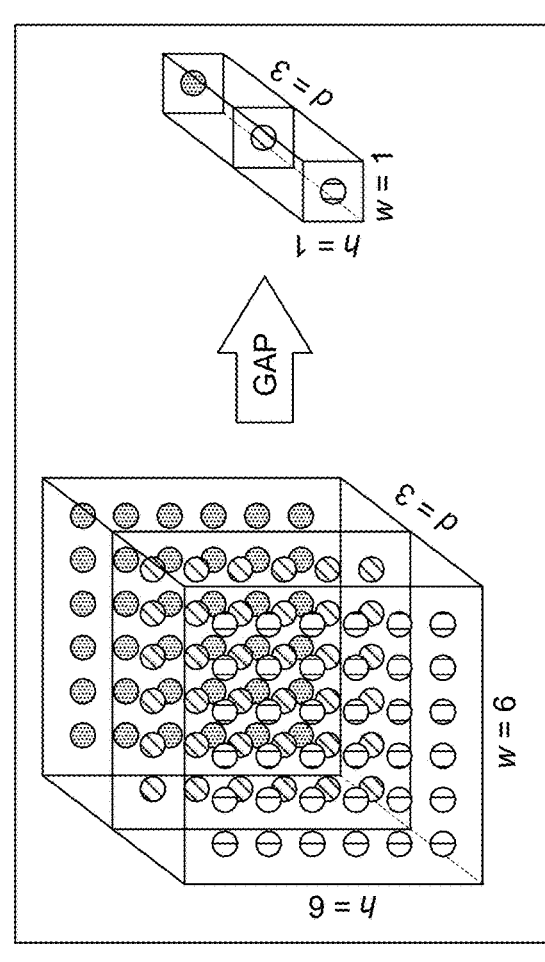
FIG. 24 illustrates how global average pooling (GAP) works.

FIG. 24 illustrates how global average pooling (GAP) works. Global average pooling can be use used to replace fully connected (FC) layers for classification, by taking the spatial average of features in the last layer for scoring. The reduces the training load and bypasses overfitting issues. Global average pooling applies a structural prior to the model and it is equivalent to linear transformation with predefined weights. Global average pooling reduces the number of parameters and eliminates the fully connected layer. Fully connected layers are typically the most parameter and connection intensive layers, and global average pooling provides much lower-cost approach to achieve similar results. The main idea of global average pooling is to generate the average value from each last layer feature map as the confidence factor for scoring, feeding directly into the softmax layer.

Global average pooling have three benefits: (1) there are no extra parameters in global average pooling layers thus overfitting is avoided at global average pooling layers; (2) since the output of global average pooling is the average of the whole feature map, global average pooling will be more robust to spatial translations; and (3) because of the huge number of parameters in fully connected layers which usually take over 50% in all the parameters of the whole network, replacing them by global average pooling layers can significantly reduce the size of the model, and this makes global average pooling very useful in model compression.

Global average pooling makes sense, since stronger features in the last layer are expected to have a higher average value. In some implementations, global average pooling can be used as a proxy for the classification score. The feature maps under global average pooling can be interpreted as confidence maps, and force correspondence between the feature maps and the categories. Global average pooling can be particularly effective if the last layer features are at a sufficient abstraction for direct classification; however, global average pooling alone is not enough if multilevel features should be combined into groups like parts models, which is best performed by adding a simple fully connected layer or other classifier after the global average pooling.

Particular Implementations

Implementations of a training system and methods for preparing neural network systems that in conjunction with a modularized robot enable the robot to recognize home healthcare events and to trigger applications by the robot that take responsive remedial actions. Select embodiments implement the deep learning trained classifiers to guide the robot's actions and responses to sensory input and commands in one or more applications in home health care and monitoring of the elderly and/or infirm, providing entertainment for the family, providing environmental and safety monitoring coupled with mechanisms to clean the air and remedy indoor climates such as humidity and temperature, and/or provide a mechanism for caring for pets left at home when the owner is away.

By way of example and without limitation, one representative method includes generating at a time t0, a training data set comprising 50,000 to 1 billion home healthcare events. Each home healthcare event labelled with sensed home environment information, and corresponding ground truth responsive remedial actions. The method includes subdividing the sensed home environment information into one or more overlapping categories. A first set of classifier neural networks are trained with the categories and identifiers identifying the home healthcare events. A first set of response classifier neural networks are trained with the sensed information, home healthcare events information, identifiers information, home healthcare events category information, and corresponding ground truth responsive remedial actions. Parameters from training are saved for recurrent neural networks comprising the first set of classifier neural networks and the first set of response classifier neural networks in tangible machine readable memory for use in reporting or responding to home healthcare events by a home healthcare robot.

One implementation of training the classifier includes generating a second training data set at a time t1, later in time than t0, including additional home healthcare events reported after time t0; and using the second training data set, performing the subdividing, training and saving steps to retrain the recurrent neural networks comprising the first set of classifier neural networks and the first set of response classifier neural networks, thereby enabling the classifiers to learn from observed outcomes of subsequent remedial actions.

One implementation of training the classifier includes training the classifier with home healthcare events selected from one or more of a medicine is due to be administered, a medicine does not appear to be taken, a patient experiencing stressful or dangerous situation, a patient who has fallen, a board or lonely patient, a patient making a request, and others. The ground truth responsive remedial actions include one or more selected from triggering the robot to administer a medicine, triggering the robot to gather data about a stressful or dangerous situation being experienced by a patient, triggering the robot to call for help for a patient who has fallen, triggering the robot to offer a game or video to a bored or lonely patient, and triggering the robot to send a message to a healthcare provider conveying a patient request, and triggering the robot to send a message to emergency personnel.

One implementation of training the classifier includes generating in the training data set, images of patients in various states and conditions. A multilayer convolution and pooling processor are applied to produce reduced dimensionality images from the images of the patients. A first set of convolutional neural networks is trained using the reduced dimensionality images and ground truth data indicating whether the images correspond to the various states and conditions.

In one example implementation, the classifier neural networks and the response classifier neural networks are recursive neural networks (RNN) based on long short term memory (LSTM).

In one example implementation, the classifier neural networks and the response classifier neural networks are trained using a combination of current home healthcare events and additional noise data.

By way of example and without limitation, one representative method of recognizing home healthcare events in patient images in various states and to trigger applications that take remedial actions includes applying a multilayer convolution to a plurality of images of patients and producing reduced dimensionality images, including first and second reduced dimensionality images, from the plurality of patient images including a patient image of the patient in a distressed state and a patient image of the patient in a non-distressed state. The method further includes processing a pair of first and second reduced dimensionality images using a first neural network to produce estimated classification parameters, using pairs of first and second reduced dimensionality images, estimated classification parameters for the first and second reduced dimensionality images, image data for presentation, and labeled ground truth conclusions indicating whether the classification parameters correspond to a patient in a distressed state and a patient image of the patient in a non-distressed state. The parameters are saved in a tangible machine readable memory for use by a robot conducting patient image recognition. Patient images of patients in a distressed state and a patient image of the patient in a non-distressed state can be captured or obtained from a source providing such images.

For example, the parameters are selected from body position, facial expression parameters, skin color and skin lividity.

System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

Other implementations may include a non-transitory computer readable storage medium storing instructions executable by a processor to perform actions of the system described above. Each of the features discussed in the particular implementation section for other implementations apply equally to this implementation. As indicated above, all the other features are not repeated here and should be considered repeated by reference.

Module: As used herein, the term "module" (or node) refers to a processor that receives information characterizing input data and generates an alternative representation and/or characterization of the input data. A neural network is an example of a module. Other examples of a module include a multilayer perceptron, a feed-forward neural network, a recursive neural network, a recurrent neural network, a deep neural network, a shallow neural network, a fully-connected neural network, a sparsely-connected neural network, a convolutional neural network that comprises a fully-connected neural network, a fully convolutional network without a fully-connected neural network, a deep stacking neural network, a deep belief network, a residual network, echo state network, liquid state machine, highway network, maxout network, long short-term memory (LSTM) network, recursive neural network grammar (RNNG), gated recurrent unit (GRU), pre-trained and frozen neural networks, and so on. Yet other examples of a module include individual components of a convolutional neural network, such as a one-dimensional (1D) convolution module, a two-dimensional (2D) convolution module, a three-dimensional (3D) convolution module, a feature extraction module, a dimensionality reduction module, a pooling module, a subsampling module, a batch normalization module, a concatenation module, a classification module, a regularization module, and so on. In implementations, a module comprises learnable submodules, parameters, and hyperparameters that can be trained by back-propagating the errors using an optimization algorithm. The optimization algorithm can be based on stochastic gradient descent (or other variations of gradient descent like batch gradient descent and mini-batch gradient descent). Some examples of optimization algorithms used by the technology disclosed include Momentum, Nesterov accelerated gradient, Adagrad, Adadelta, RMSprop, and Adam. In implementations, a module is an activation module that applies a non-linearity function. Some examples of non-linearity functions used by the technology disclosed include a sigmoid function, rectified linear units (ReLUs), hyperbolic tangent function, absolute of hyperbolic tangent function, leaky ReLUs (LReLUs), and parametrized ReLUs (PRELUs). In implementations, a module is a classification module. Some examples of classifiers used by the technology disclosed include a multi-class support vector machine (SVM), a Softmax classifier, and a multinomial logistic regressor. Other examples of classifiers used by the technology disclosed include a rule-based classifier. In implementations, a module is a pre-processing module, such as an input module, a normalization module, a patch-extraction module, and a noise-addition module. In implementations, a module is a post-processing module, such as an output module, an estimation module, and a modelling module. Two modules differ in "type" if they differ in at least one submodule, parameter, or hyperparameter. In some implementations, certain modules are fixed topology modules in which a certain set of submodules are not evolved/modified and/or only evolved/modified in certain generations, and only the interconnections and interconnection weights between the submodules are evolved.

Any other conventional or future-developed neural networks or components thereof or used therein, are considered to be modules. Such implementations will be readily apparent to those skilled in the art without departing from the spirit and scope of the technology disclosed.

Submodule: As used herein, the term "submodule" refers to a processing element of a module. For example, in the case of a fully-connected neural network, a submodule is a neuron of the neural network. In another example, a layer of neurons, i.e., a neuron layer, is considered a submodule of the fully-connected neural network module. In other examples, in the case of a convolutional neural network, a kernel, a filter, a feature extractor, an activation function, a pooling operation, a subsampling operation, and a regularization operation, are each considered submodules of the convolutional neural network module. In some implementations, the submodules are considered as modules, and vice-versa.

A system implementation of the technology disclosed includes one or more processors coupled to the memory. The memory is loaded with computer instructions which, when executed on the processors, cause evolution of a deep neural network structure.

The deep neural network structure disclosed herein includes a plurality of modules and interconnections among the modules. Examples of deep neural network structures include: AlexNet, ResNet, Inception, WaveNet, PixelCNN, GoogLeNet, ENet, U-Net, BN-NIN, VGG, LeNet, DeepSEA, DeepChem, DeepBind, DeepMotif, FIDDLE, DeepLNC, DeepCpG, DeepCyTOF, SPINDLE, and others.

CLAUSES

Clause number 1, a method of preparing a plurality of neural network systems to recognize home healthcare events and to trigger applications resident on, or available via cloud node 312 to, a robot that take responsive remedial actions, the method including: generating at a time t0, a training data set comprising 50,000 to 1 billion home healthcare events, each home healthcare event labelled with sensed home environment information, and corresponding ground truth responsive remedial actions; subdividing the sensed home environment information into one or more overlapping categories; training a first set of classifier neural networks with the categories and identifiers identifying the home healthcare events; training a first set of response classifier neural networks with the sensed information, home healthcare events information, identifiers information, home healthcare events category information, and corresponding ground truth responsive remedial actions; and saving parameters from training recurrent neural networks comprising the first set of classifier neural networks and the first set of response classifier neural networks in tangible machine readable memory for use in reporting or responding to home healthcare events by a home healthcare robot.

Clause number 2, the method of clause 1, further including: generating a second training data set at a time t1, later in time than t0, including additional home healthcare events reported after time t0; and using the second training data set, performing the subdividing, training and saving steps to retrain the recurrent neural networks comprising the first set of classifier neural networks and the first set of response classifier neural networks, thereby enabling the classifiers to learn from subsequent remedial actions.

Clause 3, the method of clause 1, the generating further including retrieving the home healthcare events and sensed home environment information from an events dataset.

Clause 4, the method of clause 1, wherein the categories include one or more selected from an elderly patient at home, a patient experiencing onset dementia, a patient with limited mobility, a cardiac patient, a patient requiring diabetes medication.

Clause 5, the method of clause 1, wherein the home healthcare events include one or more selected from a medicine is due to be administered, a patient experiencing stressful or dangerous situation, a patient who has fallen, a lonely patient, a patient making a request.

Clause 6, the method of clause 5, wherein ground truth responsive remedial actions include one or more selected from triggering the robot to administer a medicine, triggering the robot to gather data about a stressful or dangerous situation being experienced by a patient, triggering the robot to call for help for a patient who has fallen, triggering the robot to offer a game or video to a lonely patient, and triggering the robot to send a message to a healthcare provider conveying a patient request.

Clause 7, the method of clause 1, wherein the classifier neural networks and the response classifier neural networks are recursive neural networks (RNN) based on long short term memory (LSTM).

Clause 8, the method of clause 1, wherein the classifier neural networks and the response classifier neural networks are trained using a combination of current home healthcare events and additional noise data.

Clause 9, the method of clause 1, further including: generating in the training data set, images of patients in various states and conditions; applying a multilayer convolution and pooling processor and producing reduced dimensionality images from the images of the patients; and training a first set of convolutional neural networks using the reduced dimensionality images and ground truth data indicating whether the images correspond to the various states and conditions.

Clause 10, a method of recognizing home healthcare events in patient images in various states and to trigger applications that take remedial actions, the method including: applying a multilayer convolution to a plurality of images of patients and producing reduced dimensionality images, including first and second reduced dimensionality images, from the plurality of patient images including a patient image of the patient in a distressed state and a patient image of the patient in a non-distressed state; processing a pair of first and second reduced dimensionality images using a first neural network to produce estimated classification parameters, using pairs of first and second reduced dimensionality images, estimated classification parameters for the first and second reduced dimensionality images, image data for presentation, and labeled ground truth conclusions indicating whether the classification parameters correspond to a patient in a distressed state and a patient image of the patient in a non-distressed state; and saving the parameters in a tangible machine readable memory for use by a robot conducting patient image recognition.

Clause 11, the method of clause 10, wherein the parameters are selected from body position, facial expression parameters, skin color and skin lividity.

Clause 12, the method of clause 10, capturing patient images of patients in a distressed state and a patient image of the patient in a non-distressed state.

Clause 13, a non-transitory computer readable storage medium impressed with computer program instructions, the instructions, when executed on a processor, implement a method of clause 10.

Clause 14, a system, comprising a computer readable medium storing instructions for configuring one or more processors to execute the stored instructions to perform a method of clause 10.

Clause 15, a non-transitory computer readable medium storing instructions for implementing preparing a plurality of neural network systems to recognize home healthcare events and to trigger applications resident on a robot that take responsive remedial actions, including: generating at a time t0, a training data set comprising 50,000 to 1 billion home healthcare events, each home healthcare event labelled with sensed home environment information, and corresponding ground truth responsive remedial actions; subdividing the sensed home environment information into one or more overlapping categories; training a first set of classifier neural networks with the categories and identifiers identifying the home healthcare events; training a first set of response classifier neural networks with the sensed information, home healthcare events information, identifiers information, home healthcare events category information, and the corresponding ground truth responsive remedial actions; and saving parameters from training recurrent neural networks comprising the first set of classifier neural networks and the first set of response classifier neural networks in tangible machine readable memory for use in reporting or responding to home healthcare events by a home healthcare robot.

Clause 16, a system, comprising a computer readable medium storing instructions for implementing preparing a plurality of neural network systems to recognize home healthcare events and to trigger applications resident on, or available via cloud node 312 to, a robot that take responsive remedial actions, including: generating at a time to, a training data set comprising 50,000 to 1 billion home healthcare events, each home healthcare event labelled with sensed home environment information, and corresponding ground truth responsive remedial actions; subdividing the sensed home environment information into one or more overlapping categories; training a first set of classifier neural networks with the categories and identifiers identifying the home healthcare events; and training a first set of response classifier neural networks with the sensed information, home healthcare events information, identifiers information, home healthcare events category information, and the corresponding ground truth responsive remedial actions; and saving parameters from training recurrent neural networks comprising the first set of classifier neural networks and the first set of response classifier neural networks in tangible machine readable memory for use in reporting or responding to home healthcare events by a home healthcare robot.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:
1. A robot system, including:
a mobile base having:
    a platform,
    a drive mechanism mounted to the platform,
    a housing,
    two or more sensors rigidly coupled to the platform and directed outwardly from the platform to detect obstacles present,
    a communications interface to send and receive information using a wireless network,
    a plurality of modularized components, wherein each modularized component of the plurality of modularized components implements a specific functionality, and wherein the plurality of modularized components includes an elderly care modularized component, an entertainment modularized component, an environment modularized component, and a pet sitter modularized component;
    a coupling mechanism to accept at most one modularized component of the plurality of modularized components, wherein each modularized component of the plurality of modularized components is inter- changeably couplable with an electrical connector of the coupling mechanism; and a controller including one or more processors coupled to a memory storing instructions that when executed by the processor perform:

sensing the at most one modularized component coupled via the coupling mechanism as a sensed modularized component of the plurality of modularized components coupled via the electrical connector;

controlling (i) the mobile base and (ii) the sensed modularized component using a neural network classifier from a plurality of neural network classifiers, the neural network classifier corresponding to the sensed modularized component, wherein each neural network classifier of the plurality of neural network classifiers is trained to control a corresponding modularized component of the plurality of modularized components; and initiating robot behaviors triggered by outputs of the neural network classifier, based upon inputs of (i) the two or more sensors rigidly coupled to the platform and (ii) one or more sensors of the sensed modularized component.

2. The robot system of claim 1, wherein at least one of the two or more sensors includes a camera, the robot system further including:

one or more gaps in the housing which light can pass through to the camera.

3. The robot system of claim 2, wherein the camera is at least one selected from an infrared (IR) camera, a visible light (Red-Green-Blue, RGB) sensing camera, and a time of flight camera.

4. The robot system of claim 2, further including a second camera positioned relative to the camera of the at least one of the two or more sensors to form a pair of cameras capable of stereoscopic imaging.

5. The robot system of claim 1, further including a third sensor, wherein three sensors positioned approximately 120 degrees apart from one another around directed outward from a center of the platform; thereby providing sensory input around the robot system substantially contemporaneously.

6. The robot system of claim 1, further including:

a microphone and a speaker configured to collect audio and speech from users for input to the neural network classifier and output audio and speech from the neural network classifier respectively, and wherein at least some input and output are received from or transmitted to applications and devices via the wireless network.

7. The robot system of claim 1, wherein the platform is substantially round.

8. The robot system of claim 1, wherein the platform is approximately triangular.

9. The robot system of claim 1, wherein the platform is approximately quadrilateral.

10. The robot system of claim 1, wherein the elderly care modularized component has an adjustable height handle, and when coupled to the mobile base, enables an elderly person to hold the elderly care modularized component while the robot system, under control of instructions based upon output from the neural network classifier corresponding to the elderly care modularized component, guides the elderly person.

11. The robot system of claim 10, further including a medication dispenser and a monitor for dispensing medication to the elderly person and monitoring that the elderly person has taken their medication.

12. The robot system of claim 1, wherein the entertainment modularized component has a projection mechanism, and when coupled to the mobile base and controlled by the controller under control of instructions based upon output from the neural network classifier, the entertainment modularized component projects an augmented reality presentation, senses bodily motions of users, and reflects sensed bodily motions in changes to the augmented reality presentation.

13. The robot system of claim 12, further including projecting presentations selected from a set comprising of games, movies, educational activities, and entertainment activities.

14. The robot system of claim 1, wherein the environment modularized component has an air quality sensor, a humidification system and a purification system, and when coupled to the mobile base and controlled by the controller under control of instructions based upon output from the neural network classifier corresponding to the environment modularized component, senses air quality parameters including humidity and pollution, activates the humidification system when humidity sensed is outside a settable level, and activates the purification system when pollution sensed is outside a settable level.

15. The robot system of claim 14, further including the robot system under control of instructions based upon output from the neural network classifier travelling from room to room substantially contemporaneously with sensing air quality, activating the humidification system when humidity sensed is outside a settable level and activating the purification system when pollution sensed is outside a settable level.

16. The robot system of claim 1, wherein the pet sitter modularized component has a pet food dispenser to dispense food and a pet toy launcher to launch a toy, and when coupled to the mobile base and controlled by the controller under control of instructions based upon output from the neural network classifier, administers food to a pet and launches a toy into space to entertain the pet.

17. The robot system of claim 16, further including tracking position and motions of the pet.

18. A method of configuring a home robot, the method including:

sensing at most one sensed modularized component from a plurality of modularized components, wherein each modularized component of the plurality of modularized components implements a specific functionality, and wherein the plurality of modularized components includes an elderly care modularized component, an entertainment modularized component, an environment modularized component, and a pet sitter modularized component, and wherein the at most one sensed modularized component is coupled with the home robot via a coupling connector;

controlling (i) the home robot and (ii) the sensed modularized component using a neural network classifier from a plurality of neural network classifiers, the neural network classifier corresponding to the sensed modularized component, wherein each neural network classifier of the plurality of neural network classifiers is trained to control a corresponding modularized component of the plurality of modularized components; and initiating robot behaviors triggered by outputs of the neural network classifier corresponding to the at most one sensed modularized component, including triggering a drive mechanism of the home robot, obtaining information from two or more sensors to detect obstacles present, and sending and receiving information using a wireless network, based upon inputs of one or more sensors of the at most one sensed modularized component.

19. A non-transitory computer readable medium storing instructions for configuring a home robot, which instructions, when executed by one or more processors perform tasks including:

sensing at most one sensed modularized component from a plurality of modularized components, wherein each modularized component of the plurality of modularized components implements a specific functionality, and wherein the plurality of modularized components includes an elderly care modularized component, an entertainment modularized component, an environment modularized component, and a pet sitter modularized component, and wherein the at most one sensed modularized component is coupled with the home robot via a coupling connector;

controlling (i) the home robot and (ii) the sensed modularized component using a trained neural network classifier from a plurality of trained neural network classifiers, the trained neural network classifier corresponding to the sensed modularized component, wherein each trained neural network classifier of the plurality of trained neural network classifiers is trained to control a corresponding modularized component of the plurality of modularized components; and initiating robot behaviors triggered by outputs of the trained neural network classifier corresponding to the at most one sensed modularized component, including triggering a drive mechanism of the home robot, obtaining information from two or more sensors to detect obstacles present, and sending and receiving information using a wireless network, based upon inputs of one or more sensors of the at most one sensed modularized component.

20. The non-transitory computer readable medium of claim 19, wherein each modularized component of the plurality of modularized components when coupled with a robot base implements a different robot configuration from a set of mutually exclusive possible robot configurations.

* * * * *